(12) United States Patent
Tillotson et al.

(10) Patent No.: US 11,066,149 B2
(45) Date of Patent: Jul. 20, 2021

(54) AIRFLOW-DEPENDENT DEPLOYABLE FENCES FOR AIRCRAFT WINGS

(71) Applicant: The Boeing Company, Chicago, IL (US)

(72) Inventors: Brian Tillotson, Kent, WA (US); Chris Kettering, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 301 days.

(21) Appl. No.: 16/197,920

(22) Filed: Nov. 21, 2018

(65) Prior Publication Data

US 2020/0156760 A1  May 21, 2020

(51) Int. Cl.
  *B64C 3/58* (2006.01)
  *B64C 5/10* (2006.01)
(52) U.S. Cl.
  CPC . *B64C 3/58* (2013.01); *B64C 5/10* (2013.01)
(58) Field of Classification Search
  CPC ........... B64C 3/58; B64C 9/932; B64C 9/326; B64C 9/34; B64C 9/36; B64C 5/10; B64C 9/323; F15D 1/0025; F15D 1/003; F15D 1/0035; F15D 1/004; F15D 1/0045; F15D 1/006; F15D 1/0065; F15D 1/007
  See application file for complete search history.

(56) References Cited

U.S. PATENT DOCUMENTS 2,120,760 A * 6/1938 Lumiere ................... B64C 9/18
  244/213
2,885,161 A   5/1959 Kerker et al.
5,570,859 A   11/1996 Quandt
5,895,015 A   4/1999 Saiz
6,105,904 A   8/2000 Lisy et al.
6,695,252 B1  2/2004 Dryer
9,789,956 B2  10/2017 Bordoley et al.
(Continued)

FOREIGN PATENT DOCUMENTS

EP  3053826  8/2016
EP  3150486  4/2017
(Continued)

OTHER PUBLICATIONS

European Patent Office, "Extended European Search Report," issued in connection with European Patent Application No. 19210293.7, dated Apr. 21, 2020, 5 pages.
(Continued)

*Primary Examiner* — Joshua J Michener
*Assistant Examiner* — Cindi M Curry
(74) *Attorney, Agent, or Firm* — Hanley, Flight & Zimmerman, LLC

(57) ABSTRACT

Airflow-dependent deployable fences for aircraft wings are described. An example apparatus includes a fence coupled to a wing of an aircraft. The fence is movable relative to the wing between a stowed position in which a panel of the fence extends along a skin of the wing, and a deployed position in which the panel extends at an upward angle away from the skin. The panel is configured to impede a spanwise airflow along the wing when the fence is in the deployed position. The fence is configured to move from the deployed position to the stowed position in response to an aerodynamic force exerted on the panel.

20 Claims, 37 Drawing Sheets

(STOWED)

(56) References Cited

U.S. PATENT DOCUMENTS

| | | | |
|---|---|---|---|
| 2004/0129838 A1* | 7/2004 | Lisy | B64C 3/58 |
| | | | 244/204.1 |
| 2007/0018056 A1* | 1/2007 | Narramore | B64C 23/06 |
| | | | 244/200.1 |
| 2007/0152097 A1 | 7/2007 | Melkers et al. | |
| 2008/0315623 A1 | 12/2008 | Khalighi | |
| 2010/0038492 A1 | 2/2010 | Sclafani et al. | |
| 2012/0261518 A1 | 10/2012 | Brewer et al. | |
| 2013/0209255 A1 | 8/2013 | Pesetsky | |
| 2015/0360768 A1 | 12/2015 | Woodland | |
| 2016/0053620 A1 | 2/2016 | Gianfranceschi | |
| 2016/0229526 A1 | 8/2016 | Hegenbart et al. | |
| 2018/0118332 A1* | 5/2018 | Bordoley | B64C 13/02 |
| 2018/0155013 A1* | 6/2018 | Elbracht | B64C 21/08 |
| 2018/0162521 A1* | 6/2018 | Langenbacher | B64C 21/04 |
| 2018/0370613 A1 | 12/2018 | Van Pelt et al. | |
| 2019/0002036 A1 | 1/2019 | Stablo | |
| 2020/0055585 A1 | 2/2020 | Hung | |
| 2020/0156761 A1 | 5/2020 | Tillotson et al. | |
| 2020/0156762 A1 | 5/2020 | Tillotson et al. | |
| 2020/0156763 A1 | 5/2020 | Tillotson et al. | |

FOREIGN PATENT DOCUMENTS

| | | |
|---|---|---|
| EP | 3323716 | 5/2018 |
| WO | 9950141 | 10/1999 |

OTHER PUBLICATIONS

European Patent Office, "Extended European Search Report," issued in connection with European Patent Application No. 19210284.6, dated Apr. 21, 2020, 8 pages.

United States Patent and Trademark Office, "Requirement for Restriction," issued in connection with U.S. Appl. No. 16/197,927, dated Jan. 11, 2021, 6 pages.

United States Patent and Trademark Office, "Non-Final Office Action," issued in connection with U.S. Appl. No. 16/197,927, dated Mar. 19, 2021, 12 pages.

United States Patent and Trademark Office, "Requirement for Restriction," issued in connection with U.S. Appl. No. 16/197,933, dated Feb. 2, 2021, 6 pages. (Withdrawn).

United States Patent and Trademark Office, "Requirement for Restriction," issued in connection with U.S. Appl. No. 16/197,933, dated Feb. 9, 2021, 6 pages.

United States Patent and Trademark Office, "Requirement for Restriction," issued in connection with U.S. Appl. No. 16/197,946, dated Feb. 9, 2021, 6 pages.

European Patent Office, "Communication pursuant to Article 94(3) EPC," issued in connection with European Patent Application No. 19 210 293.7, dated Mar. 15, 2021, 3 pages.

United States Patent and Trademark Office, "Non-Final Office Action," issued in connection with U.S. Appl. No. 16/197,933, dated Apr. 12, 2021, 11 pages.

United States Patent and Trademark Office, "Non-Final Office Action," issued in connection with U.S. Appl. No. 16/197,946, dated Apr. 13, 2021, 11 pages.

United States Patent and Trademark Office, "Notice of Allowance and Fee(s) Due," issued in connection with U.S. Appl. No. 16/197,927, dated May 7, 2021, 8 pages.

United States Patent and Trademark Office, "Notice of Allowance and Fee(s) Due," issued in connection with U.S. Appl. No. 16/197,933, dated May 28, 2021, 8 pages.

* cited by examiner (STOWED)

(DEPLOYED)

(STOWED)

(STOWED)

(DEPLOYED)

(DEPLOYED)

(DEPLOYED)

(DEPLOYED)

(STOWED)

(DEPLOYED)

(STOWED)

(STOWED)

(STOWED)

(STOWED)

(DEPLOYED)

(DEPLOYED)

(DEPLOYED)

FIG. 20 (DEPLOYED)

(STOWED)

(DEPLOYED)

(DEPLOYED)

(DEPLOYED)

(DEPLOYED)

(STOWED)

(DEPLOYED)

(STOWED)

(STOWED)

(DEPLOYED)

(STOWED)

(STOWED)

(DEPLOYED)

(STOWED)

(DEPLOYED)

AIRFLOW-DEPENDENT DEPLOYABLE FENCES FOR AIRCRAFT WINGS

FIELD OF THE DISCLOSURE

This disclosure relates generally to fences for aircraft wings and, more specifically, to airflow-dependent deployable fences for aircraft wings.

BACKGROUND

Fences can be implemented on the wings of an aircraft (e.g., a swept-wing aircraft) to impede (e.g., block) spanwise airflows along the wings, thereby improving the handling of the aircraft at reduced speeds (e.g., a lower speed during a takeoff and/or landing operation of the aircraft relative to a higher speed during a cruise operation of the aircraft). Conventional fences are located on and/or arranged in a generally chordwise direction along the topsides of the wings of the aircraft.

Some conventional fences are fixed in place on and/or non-movably coupled to the wings of the aircraft, thereby causing such conventional fences to generate and/or produce drag during the entirety of a flight of the aircraft (e.g., during a takeoff operation, during a cruise operation, and during a landing operation). Other conventional fences are deployable and/or retractable between a vertical deployed position extending upwardly from the wings of the aircraft and a vertical stowed position within the airfoils of the wings of the aircraft, but typically require space-consuming mechanical linkages to actuate such movements of the fences, with such mechanical linkages being under the control of a pilot of the aircraft.

SUMMARY

Example airflow-dependent deployable fences for aircraft wings are disclosed herein. In some examples, an apparatus is disclosed. In some disclosed examples, the apparatus comprises a fence coupled to a wing of an aircraft. In some disclosed examples, the fence is movable relative to the wing between a stowed position in which a panel of the fence extends along a skin of the wing, and a deployed position in which the panel extends at an upward angle away from the skin. In some disclosed examples, the panel is configured to impede a spanwise airflow along the wing when the fence is in the deployed position. In some disclosed examples, the fence is configured to move from the deployed position to the stowed position in response to an aerodynamic force exerted on the panel.

In some examples, a method for moving a fence coupled to a wing of an aircraft is disclosed. In some disclosed examples, the method comprises moving the fence between a stowed position in which a panel of the fence extends along a skin of the wing, and a deployed position in which the panel extends at an upward angle away from the skin. In some disclosed examples, the panel impedes a spanwise airflow along the wing when the fence is in the deployed position. In some disclosed examples, the moving includes moving the fence from the deployed position to the stowed position in response to an aerodynamic force exerted on the panel.

Figure 1:
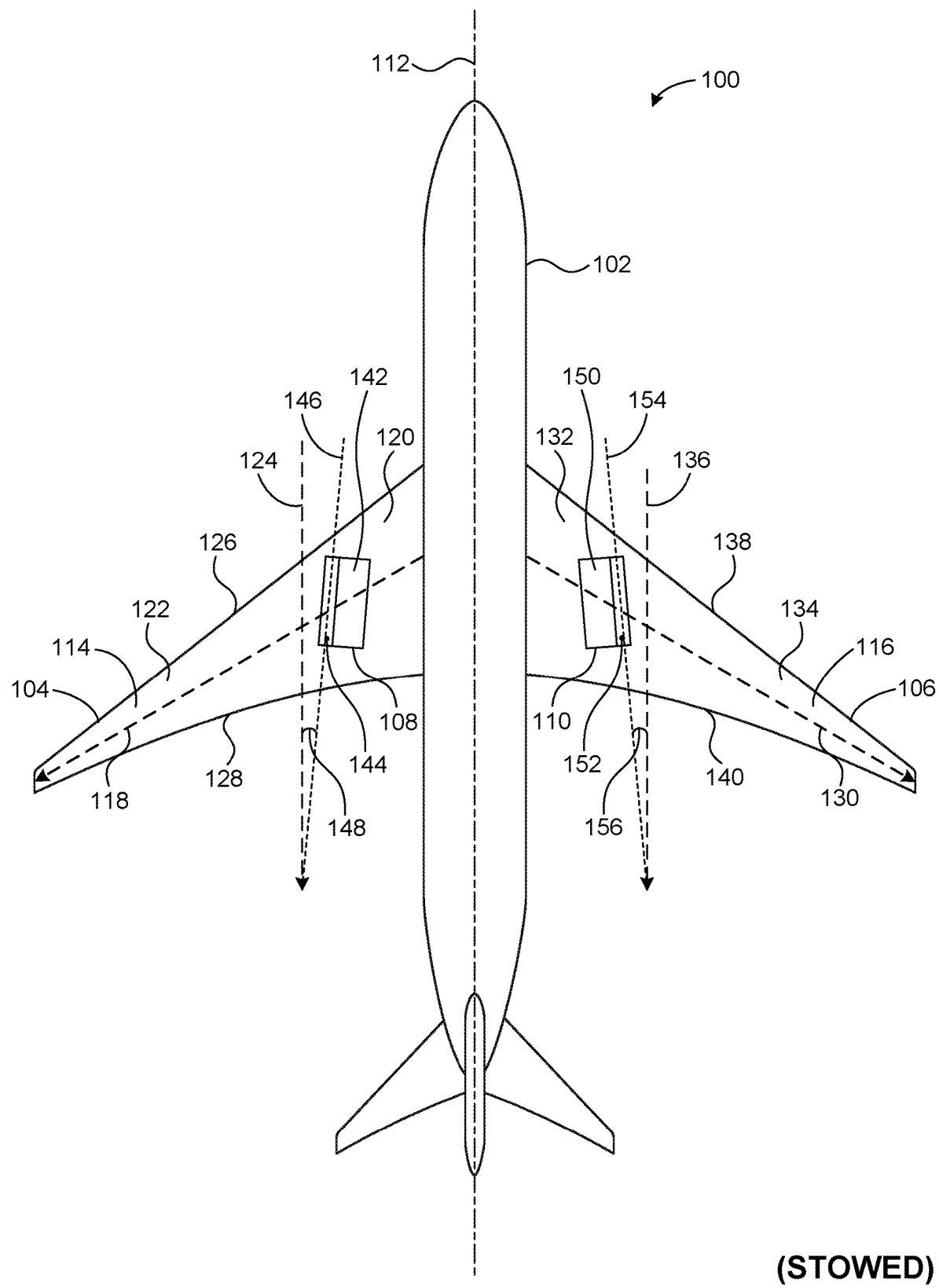
FIG. 1 illustrates an example aircraft in which example airflow-dependent deployable fences can be implemented in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Fences can be implemented on the wings of an aircraft (e.g., a swept-wing aircraft) to impede (e.g., block) spanwise airflows along the wings, thereby improving the handling of the aircraft at reduced speeds (e.g., a lower speed during a takeoff and/or landing operation of the aircraft relative to a higher speed during a cruise operation of the aircraft). Conventional fences implemented on the wings of an aircraft typically have substantial wetted areas that generate and/or produce drag while the aircraft is in flight.

Some conventional fences are fixed in place on and/or non-movably coupled to the wings of the aircraft, thereby causing such conventional fences to generate and/or produce drag during the entirety of a flight of the aircraft (e.g., during a takeoff operation, during a cruise operation, and during a landing operation). While implementing such conventional fences on the wings of an aircraft to impede spanwise airflows along the wings can advantageously improve the handling of the aircraft during low-speed operation (e.g., during takeoff and/or landing), this advantage does not come without drawbacks. For example, the presence of such conventional fences can give rise to undesirable aerodynamic performance penalties (e.g., drag) during high-speed operation of the aircraft (e.g., during cruise).

Other conventional fences are movable (e.g., deployable and/or retractable) between a vertical deployed position extending upwardly from the wings of the aircraft and a vertical stowed position within the airfoils of the wings of the aircraft. While implementing such movable conventional fences on the wings of an aircraft to impede spanwise airflows along the wings can advantageously improve the handling of the aircraft during low-speed operation (e.g., during takeoff and/or landing), this advantage again does not come without drawbacks. For example, such movable conventional fences typically require space-consuming in-wing mechanical linkages to actuate and/or move the fences between their respective deployed and stowed positions, with such mechanical linkages being under the control of a pilot of the aircraft.

Absent the implementation of conventional fences as described above, an aircraft typically requires the implementation of one or more other countermeasure(s) to mitigate spanwise airflows along the wings of the aircraft during low-speed operation. Known countermeasures undesirably increase the costs associated with designing, testing, installing and/or otherwise implementing the wings and/or, more generally, the aircraft.

Unlike the conventional fences and/or other countermeasures described above, example deployable fences disclosed herein are aerodynamically activated and/or airflow dependent. In some disclosed examples, a deployable fence is coupled (e.g., rotatably coupled) to a wing of an aircraft such that the fence is advantageously movable relative to the wing between a stowed position in which a panel of the fence extends along a skin of the wing, and a deployed position in which the panel extends at an upward angle away from the skin. The panel is configured to impact the airflow around the aircraft when the fence is in the deployed position. For example, the panel can impede a spanwise airflow along the wing when the fence is in the deployed position. As another example, the panel can initiate and/or generate a vortex along the wing when the fence is in the deployed position. The fence is advantageously configured to move between the stowed position and the deployed position in response to an aerodynamic force exerted on the fence. In some disclosed examples, the fence is configured to move from the deployed position to the stowed position in response to an aerodynamic force exerted on the panel. In other disclosed examples, the fence is configured to move from the stowed position to the deployed position in response to an aerodynamic force exerted on a deployment vane of the fence.

The example airflow-dependent deployable fences disclosed herein provide numerous advantages over the conventional fences described above. For example, the movability (e.g., movement from a deployed position to a stowed position) of the airflow-dependent deployable fences disclosed herein advantageously reduces undesirable aerodynamic performance penalties (e.g., drag) during high-speed operation of the aircraft (e.g., during cruise). As another example, the airflow-dependent deployable fences disclosed herein provide a stowed position for the fence whereby the fence extends along the skin of the wing (as opposed to vertically within the wing), thereby advantageously increasing the amount of unused space within the wing relative to the amount of space that may otherwise be consumed by the in-wing mechanical linkages associated with the above-described vertically-deployable conventional fences. As yet another example, the airflow-dependent deployable fences disclosed herein facilitate pilot-free operation (e.g., deployment and retraction) of the fences, which advantageously ensures that the fences are deployed and/or retracted at the appropriate time(s) and/or under the appropriate flight condition(s).

Figure 2:
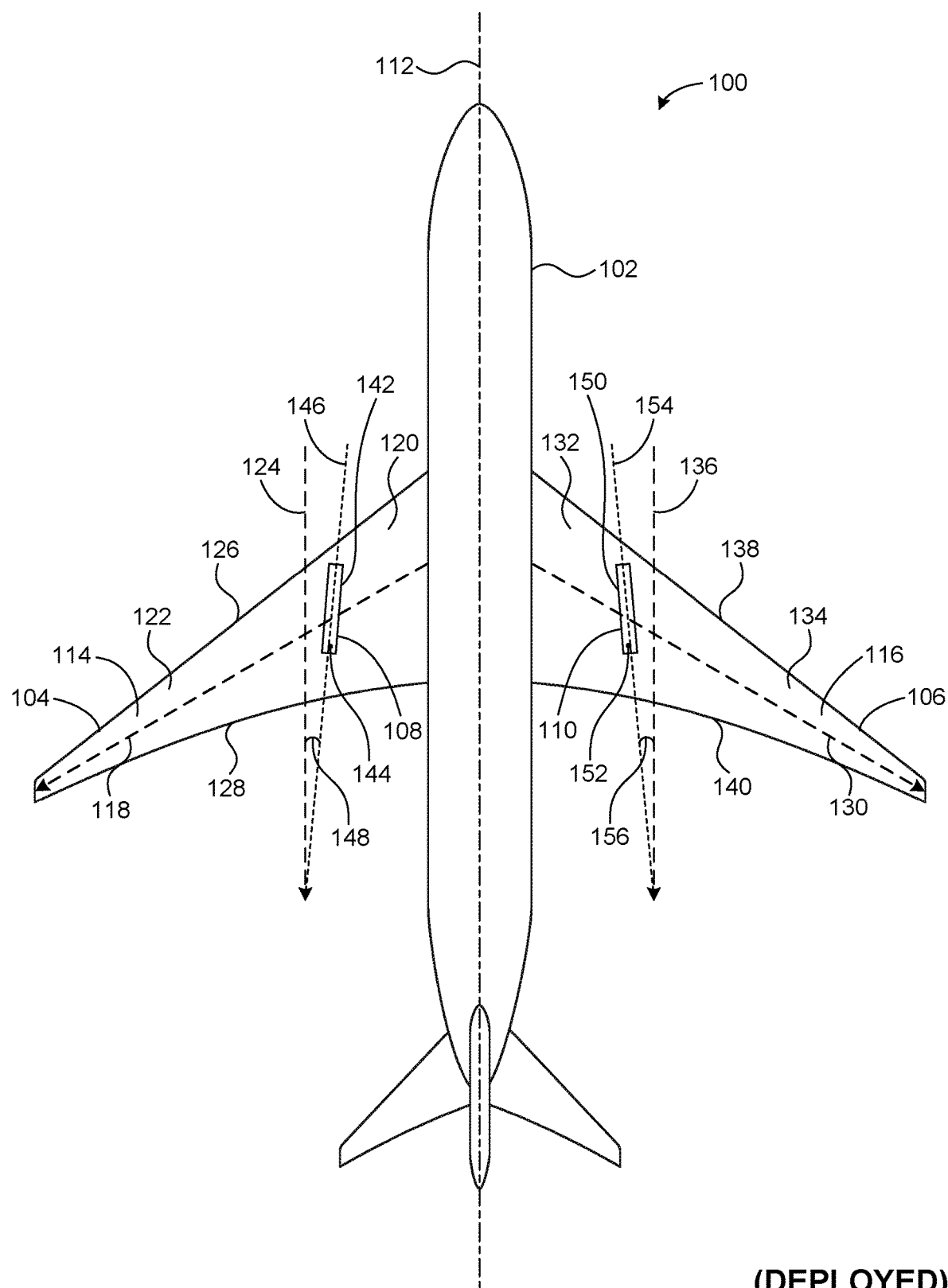
FIG. 2 illustrates the example aircraft of FIG. 1 with the example airflow-dependent deployable fences of FIG. 1 deployed.

FIG. 1 illustrates an example aircraft 100 in which example airflow-dependent deployable fences can be implemented in accordance with teachings of this disclosure. FIG. 1 illustrates the example aircraft 100 of FIG. 1 with the example airflow-dependent deployable fences of FIG. 1 stowed. FIG. 2 illustrates the example aircraft 100 of FIG. 1 with the example airflow-dependent deployable fences of FIG. 1 deployed. The aircraft 100 can be any form and/or type of aircraft including, for example, a civil (e.g., business or commercial) aircraft, a military aircraft, a manned (e.g., piloted) aircraft, an unmanned aircraft (e.g., a drone), etc. In the illustrated example of FIGS. 1 and 2, the aircraft 100 includes an example fuselage 102, a first example wing 104 (e.g., a left-side wing), a second example wing 106 (e.g., a right-side wing), a first example fence 108 (e.g., a left-side fence), and a second example fence 110 (e.g., a right-side fence). Although the illustrated example of FIGS. 1 and 2 depicts only a single fence located on each wing of the aircraft 100 (e.g., the first fence 108 located on the first wing 104, and the second fence 110 located on the second wing 106), other example implementations can include multiple (e.g., 2, 3, 4, etc.) fences located on each wing of the aircraft 100. In some examples, the location(s), size(s), and/or shape(s) of respective ones of the fences (e.g., the first fence 108 and the second fence 110) of the aircraft 100 can differ relative to the location(s), size(s) and/or shape(s) of the fences shown in FIGS. 1 and 2.

The fuselage 102 of FIGS. 1 and 2 has a generally cylindrical shape that defines an example longitudinal axis 112 of the aircraft 100. The first wing 104 and the second wing 106 of FIGS. 1 and 2 are respectively coupled to the fuselage 102 and swept in a rearward direction of the aircraft 100. The first wing 104 includes an example skin 114 forming (e.g., forming all or part of) an outer surface of the first wing 104, and the second wing 106 includes an example skin 116 forming (e.g., forming all or part of) an outer surface of the second wing 106.

The first wing 104 of FIGS. 1 and 2 defines an example spanwise direction 118 moving from an example inboard portion 120 (e.g., inboard relative to the spanwise location of the first fence 108) of the first wing 104 toward an example outboard portion 122 (e.g., outboard relative to the spanwise location of the first fence 108) of the first wing 104. The spanwise direction 118 defined by the first wing 104 is representative of a direction of a spanwise airflow that may occur along the first wing 104. The first wing 104 also defines an example chordwise direction 124 moving from an example leading edge 126 of the first wing 104 toward an example trailing edge 128 of the first wing 104. The chordwise direction 124 defined by the first wing 104 is representative of a direction of a chordwise airflow (e.g., a cruise airflow) that may occur along the first wing 104.

The second wing 106 of FIGS. 1 and 2 defines an example spanwise direction 130 moving from an example inboard portion 132 (e.g., inboard relative to the spanwise location of the second fence 110) of the second wing 106 toward an example outboard portion 134 (e.g., outboard relative to the spanwise location of the second fence 110) of the second wing 106. The spanwise direction 130 defined by the second wing 106 is representative of a direction of a spanwise airflow that may occur along the second wing 106. The second wing 106 also defines an example chordwise direction 136 moving from an example leading edge 138 of the second wing 106 toward an example trailing edge 140 of the second wing 106. The chordwise direction 136 defined by the second wing 106 is representative of a direction of a chordwise airflow (e.g., a cruise airflow) that may occur along the second wing 106.

The first fence 108 of FIGS. 1 and 2 is rotatably coupled to the first wing 104 such that the first fence 108 is movable (e.g., rotatable) between the stowed position shown in FIG. 1 and the deployed position shown in FIG. 2. The first fence 108 includes an example panel 142. The panel 142 of the first fence 108 extends (e.g., in an inboard direction toward the longitudinal axis 112) along the skin 114 of the first wing 104 when the first fence 108 is in the stowed position shown in FIG. 1. In some examples, the panel 142 of the first fence 108 extends along and is positioned over and/or on top of the skin 114 of the first wing 104 when the first fence 108 is in the stowed position shown in FIG. 1. In other examples, the panel 142 of the first fence 108 extends along and is recessed (e.g., fully or partially recessed) relative to the skin 114 of the first wing 104 when the first fence 108 is in the stowed position shown in FIG. 1. The panel 142 of the first fence 108 extends at an upward angle (e.g., vertically) away from the skin 114 of the first wing 104 when the first fence 108 is in the deployed position shown in FIG. 2. The panel 142 of the first fence 108 is configured to impact the airflow around the aircraft 100 when the first fence 108 is in the deployed position shown in FIG. 2. For example, the panel 142 can impede a spanwise airflow occurring along the spanwise direction 118 of the first wing 104 when the first fence 108 is in the deployed position shown in FIG. 2. As another example, the panel 142 can initiate and/or generate a vortex along the first wing 104 when the first fence 108 is in the deployed position shown in FIG. 2.

The panel 142 and/or, more generally, the first fence 108 of FIGS. 1 and 2 is rotatably coupled to the first wing 104 of FIGS. 1 and 2 via an example axle 144 having an example central axis 146. In the illustrated example of FIGS. 1 and 2, the central axis 146 of the axle 144 is canted (e.g., oriented at an angle) relative to the chordwise direction 124 of the first wing 104. For example, as shown in FIGS. 1 and 2, the central axis 146 of the axle 144 is canted at an example toe-in angle 148 relative to the chordwise direction 124 of the first wing 104 such that a first end of the axle 144 positioned toward the leading edge 126 of the first wing 104 is located closer to the longitudinal axis 112 of the aircraft 100 than is a second end of the axle 144 positioned toward the trailing edge 128 of the first wing 104. The example toe-in angle 148 shown in FIGS. 1 and 2 is exaggerated for clarity. When implemented, the toe-in angle 148 preferably has a value ranging from one to fifteen degrees.

The first fence 108 of FIGS. 1 and 2 is configured to move from the deployed position shown in FIG. 2 to the stowed position shown in FIG. 1 in response to an aerodynamic force exerted on the panel 142 of the first fence 108. In some examples, the aerodynamic force may be generated via a chordwise airflow (e.g., a cruise airflow) occurring along the chordwise direction 124 of the first wing 104. In some examples, an actuator operatively coupled to the first fence 108 biases and/or maintains the first fence 108 in the deployed position shown in FIG. 2 in response to the aerodynamic force exerted on the panel 142 of the first fence 108 being less than a threshold force value (e.g., less than the biasing force generated by the actuator). Example means for implementing the actuator are discussed below in connection with FIGS. 3-10. In some disclosed examples, the first fence 108 moves from the deployed position shown in FIG. 2 to the stowed position shown in FIG. 1 in response to the aerodynamic force exerted on the panel 142 of the first fence 108 being greater than the threshold force value (e.g., greater than the biasing force generated by the actuator). In some disclosed examples, the first fence 108 is configured to move from the deployed position shown in FIG. 2 to the stowed position shown in FIG. 1 during a cruise operation of the aircraft 100 having a first speed, and the first fence 108 is further configured to move from the stowed position shown in FIG. 1 to the deployed position shown in FIG. 2 during a reduced speed operation (e.g., a takeoff or landing operation) of the aircraft 100 having a second speed less than the first speed.

The second fence 110 of FIGS. 1 and 2 is rotatably coupled to the second wing 106 such that the second fence 110 is movable (e.g., rotatable) between the stowed position shown in FIG. 1 and the deployed position shown in FIG. 2. The second fence 110 includes an example panel 150. The panel 150 of the second fence 110 extends (e.g., in an inboard direction toward the longitudinal axis 112) along the skin 116 of the second wing 106 when the second fence 110 is in the stowed position shown in FIG. 1. In some examples, the panel 150 of the second fence 110 extends along and is positioned over and/or on top of the skin 116 of the second wing 106 when the second fence 110 is in the stowed position shown in FIG. 1. In other examples, the panel 150 of the second fence 110 extends along and is recessed (e.g., fully or partially recessed) relative to the skin 116 of the second wing 106 when the second fence 110 is in the stowed position shown in FIG. 1. The panel 150 of the second fence 110 extends at an upward angle (e.g., vertically) away from the skin 116 of the second wing 106 when the second fence 110 is in the deployed position shown in FIG. 2. The panel 150 of the second fence 110 is configured to impact the airflow around the aircraft 100 when the second fence 110 is in the deployed position shown in FIG. 2. For example, the panel 150 can impede a spanwise airflow occurring along the spanwise direction 130 of the second wing 106 when the second fence 110 is in the deployed position shown in FIG. 2. As another example, the panel 150 can initiate and/or generate a vortex along the second wing 106 when the second fence 110 is in the deployed position shown in FIG. 2.

The panel 150 and/or, more generally, the second fence 110 of FIGS. 1 and 2 is rotatably coupled to the second wing 106 of FIGS. 1 and 2 via an example axle 152 having an example central axis 154. In the illustrated example of FIGS. 1 and 2, the central axis 154 of the axle 152 is canted (e.g., oriented at an angle) relative to the chordwise direction 136 of the second wing 106. For example, as shown in FIGS. 1 and 2, the central axis 154 of the axle 152 is canted at an example toe-in angle 156 relative to the chordwise direction 136 of the second wing 106 such that a first end of the axle 152 positioned toward the leading edge 138 of the second wing 106 is located closer to the longitudinal axis 112 of the aircraft 100 than is a second end of the axle 152 positioned toward the trailing edge 140 of the second wing 106. The example toe-in angle 156 shown in FIGS. 1 and 2 is exaggerated for clarity. When implemented, the toe-in angle 156 preferably has a value ranging from one to fifteen degrees.

The second fence 110 of FIGS. 1 and 2 is configured to move from the deployed position shown in FIG. 2 to the stowed position shown in FIG. 1 in response to an aerodynamic force exerted on the panel 150 of the second fence 110. In some examples, the aerodynamic force may be generated via a chordwise airflow (e.g., a cruise airflow) occurring along the chordwise direction 136 of the second wing 106. In some examples, an actuator operatively coupled to the second fence 110 biases and/or maintains the second fence 110 in the deployed position shown in FIG. 2 in response to the aerodynamic force exerted on the panel 150 of the second fence 110 being less than a threshold force value (e.g., less than the biasing force generated by the actuator). Example means for implementing the actuator are discussed below in connection with FIGS. 3-10. In some disclosed examples, the second fence 110 moves from the deployed position shown in FIG. 2 to the stowed position shown in FIG. 1 in response to the aerodynamic force exerted on the panel 150 of the second fence 110 being greater than the threshold force value (e.g., greater than the biasing force generated by the actuator). In some disclosed examples, the second fence 110 is configured to move from the deployed position shown in FIG. 2 to the stowed position shown in FIG. 1 during a cruise operation of the aircraft 100 having a first speed, and the second fence 110 is further configured to move from the stowed position shown in FIG. 1 to the deployed position shown in FIG. 2 during a reduced speed operation (e.g., a takeoff or landing operation) of the aircraft 100 having a second speed less than the first speed.

Figure 3:
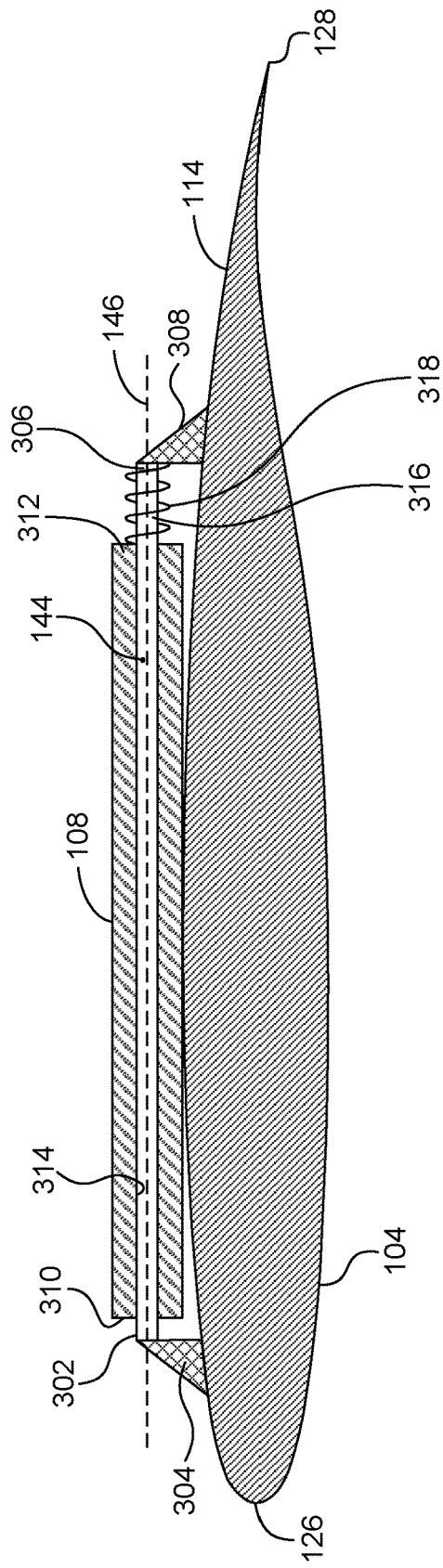
FIG. 3 is a cross-sectional view of the first example fence of FIGS. 1 and 2 looking inboard and taken across the example central axis of the example axle, with the first fence in the example stowed position of FIG. 1.
Figure 4:
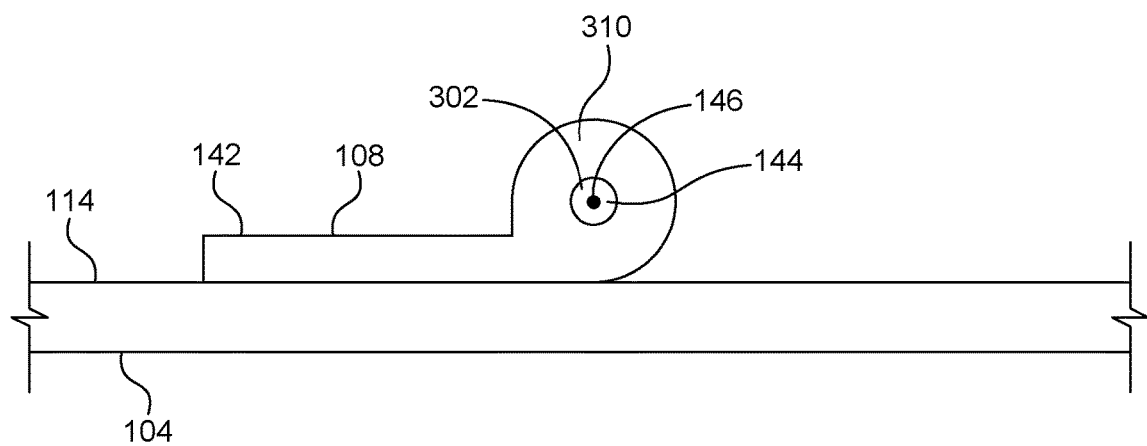
FIG. 4 is a frontal view of the first example fence of FIGS. 1-3 looking rearward along the example central axis of the example axle, with the first fence in the example stowed position of FIGS. 1 and 3.
Figure 5:
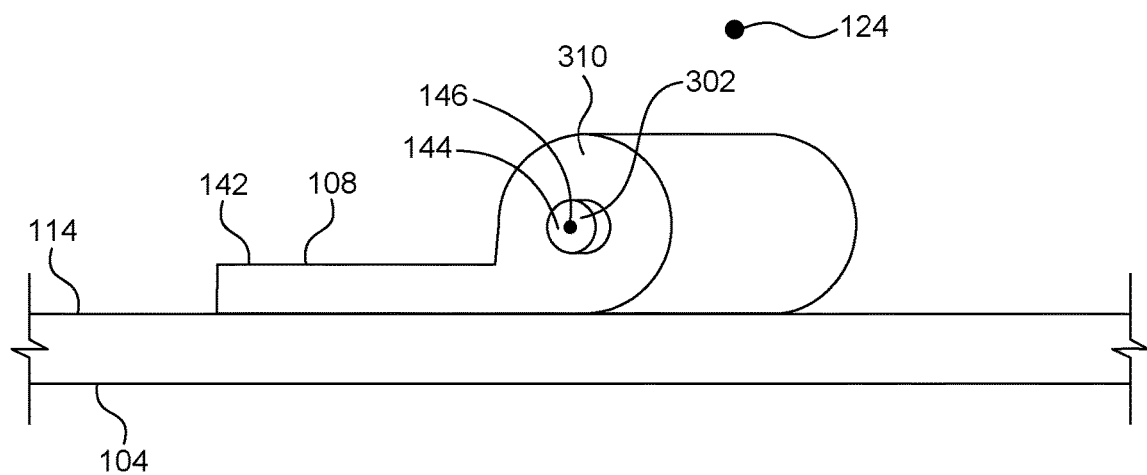
FIG. 5 is a frontal view of the first example fence of FIGS. 1-4 looking rearward along the example chordwise direction of the first example wing, with the first fence in the example stowed position of FIGS. 1, 3 and 4.
Figure 6:
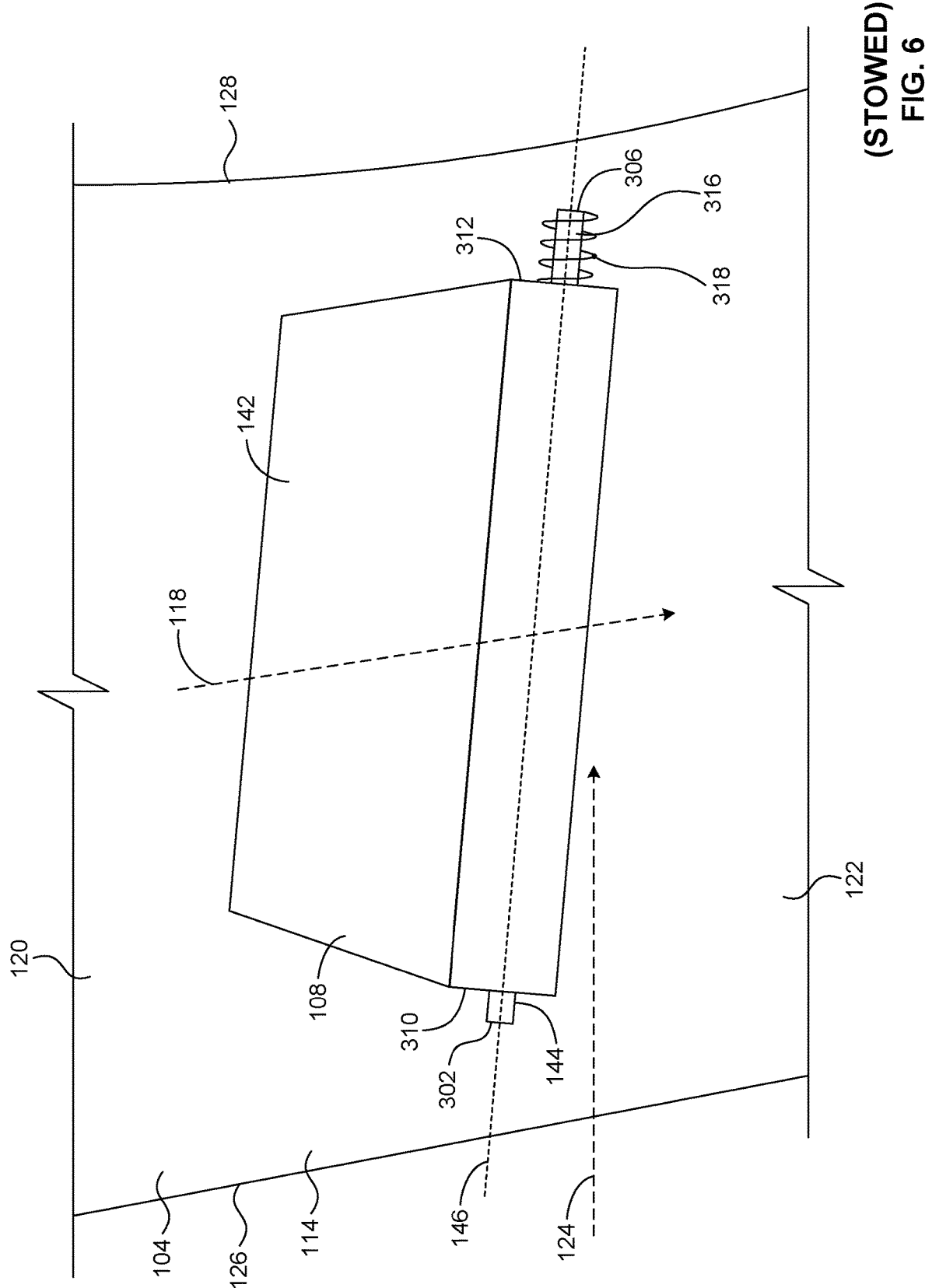
FIG. 6 is a plan view of the first example fence of FIGS. 1-5 in the example stowed position of FIGS. 1 and 3-5.
Figure 7:
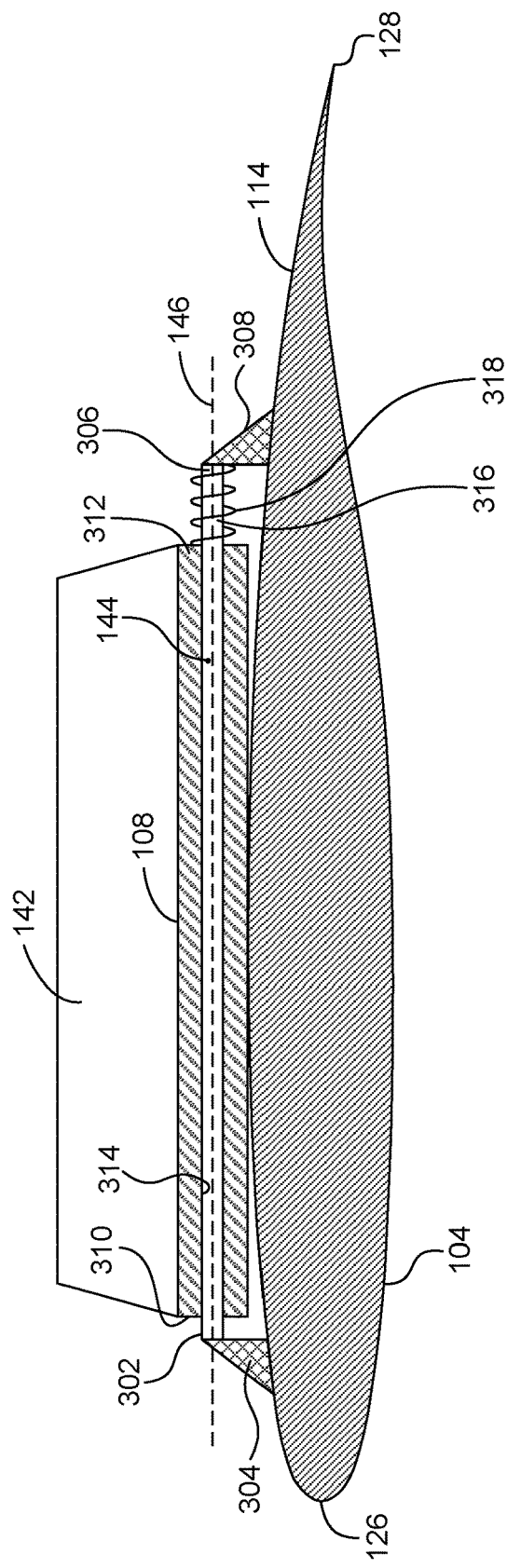
FIG. 7 is a cross-sectional view of the first example fence of FIGS. 1-6 looking inboard and taken across the example central axis of the example axle, with the first fence in the example deployed position of FIG. 2.
Figure 8:
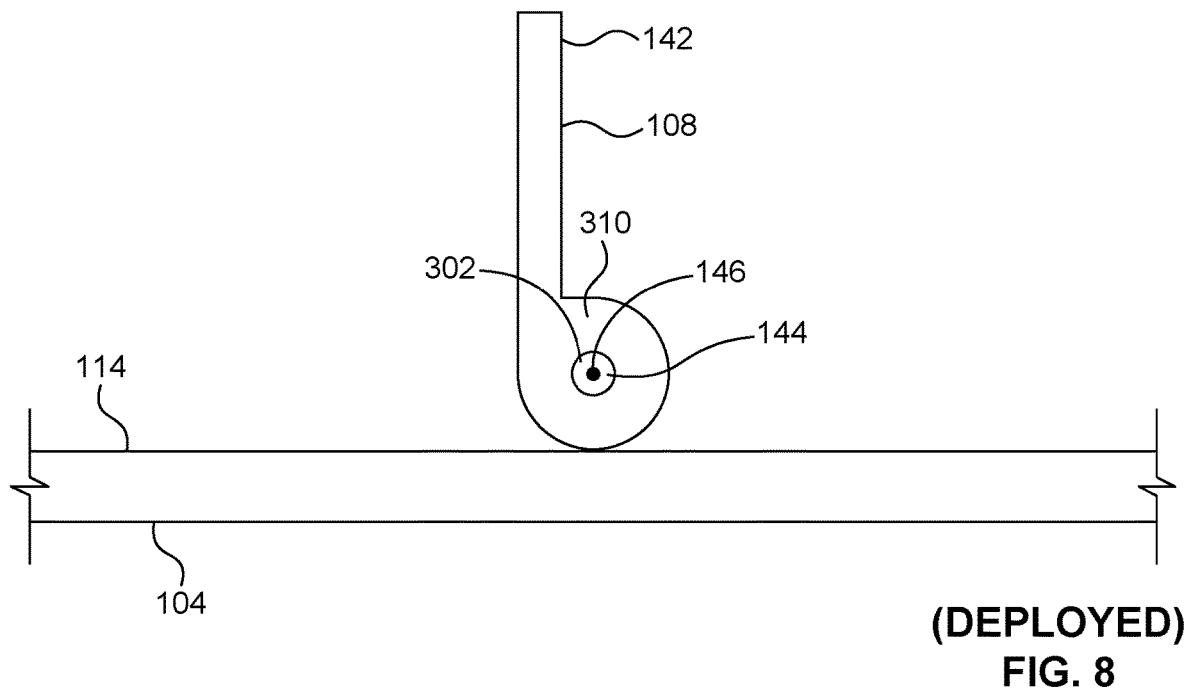
FIG. 8 is a frontal view of the first example fence of FIGS. 1-7 looking rearward along the example central axis of the example axle, with the first fence in the example deployed position of FIGS. 2 and 7.
Figure 9:
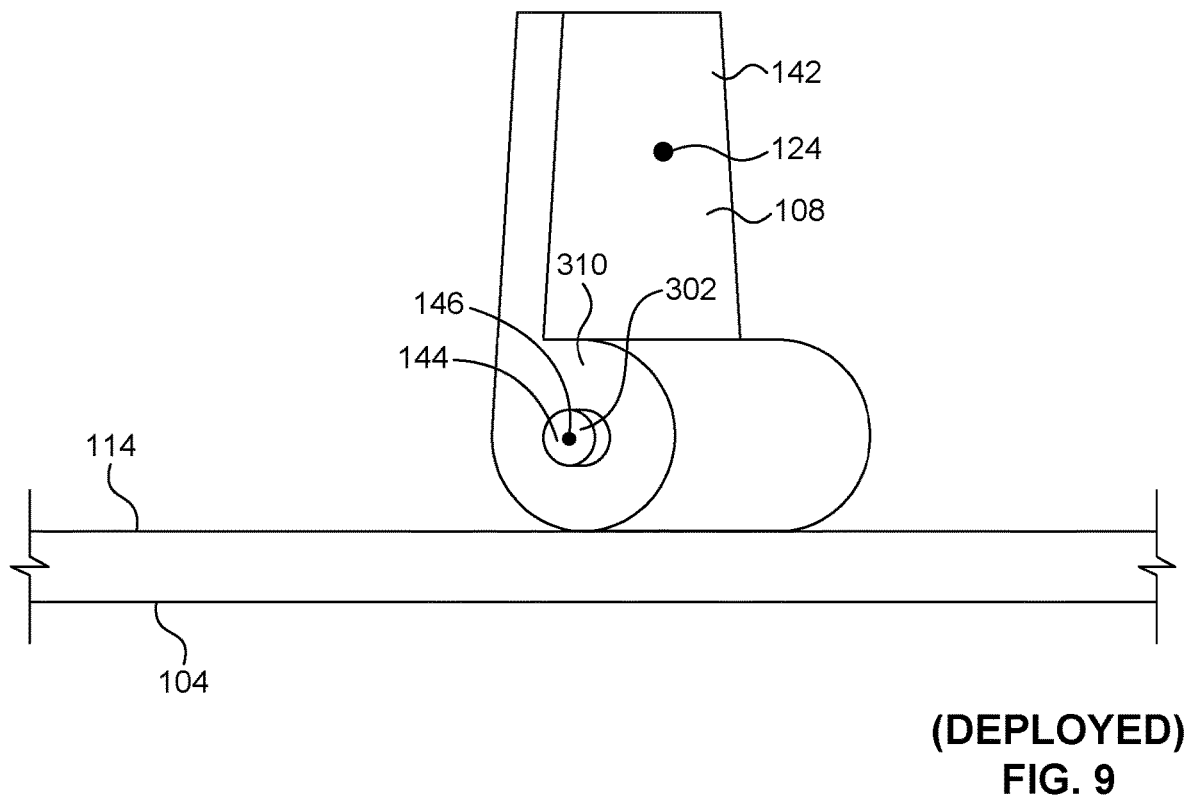
FIG. 9 is a frontal view of the first example fence of FIGS. 1-8 looking rearward along the example chordwise direction of the first example wing, with the first fence in the example deployed position of FIGS. 2, 7 and 8.
Figure 10:
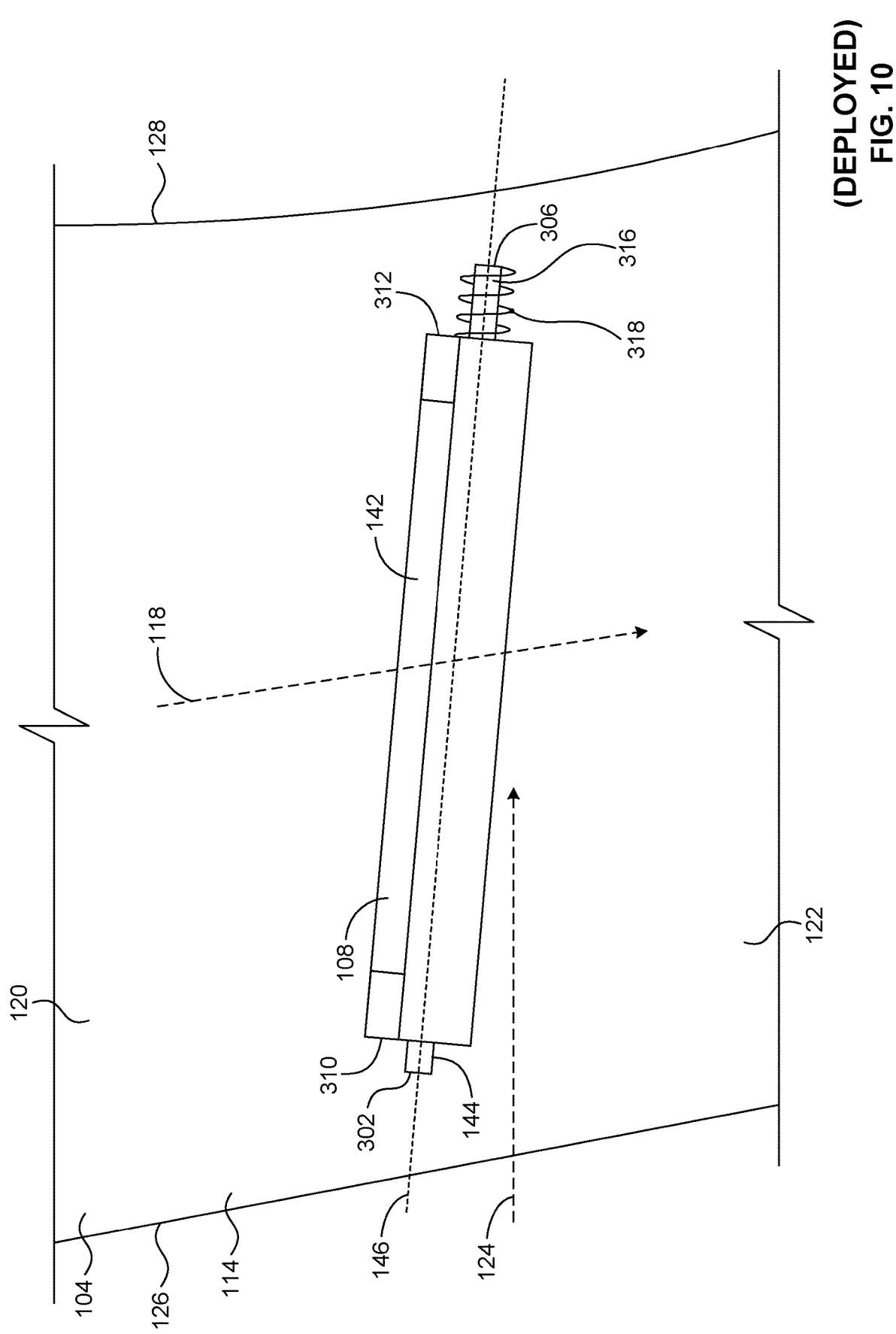
FIG. 10 is a plan view of the first example fence of FIGS. 1-9 in the example deployed position of FIGS. 2 and 7-9.

FIGS. 3-10 provide additional views of the first example fence 108 of FIGS. 1 and 2 rotatably coupled to the first example wing 104 of FIGS. 1 and 2. More specifically, FIG. 3 is a cross-sectional view of the first example fence 108 of FIGS. 1 and 2 looking inboard and taken across the example central axis 146 of the example axle 144, with the first fence 108 in the example stowed position of FIG. 1. FIG. 4 is a frontal view of the first example fence 108 of FIGS. 1-3 looking rearward along the example central axis 146 of the example axle 144, with the first fence 108 in the example stowed position of FIGS. 1 and 3. FIG. 5 is a frontal view of the first example fence 108 of FIGS. 1-4 looking rearward along the example chordwise direction 124 of the first example wing 104, with the first fence 108 in the example stowed position of FIGS. 1, 3 and 4. FIG. 6 is a plan view of the first example fence 108 of FIGS. 1-5 in the example stowed position of FIGS. 1 and 3-5. FIG. 7 is a cross-sectional view of the first example fence 108 of FIGS. 1-6 looking inboard and taken across the example central axis 146 of the example axle 144, with the first fence 108 in the example deployed position of FIG. 2. FIG. 8 is a frontal view of the first example fence 108 of FIGS. 1-7 looking rearward along the example central axis 146 of the example axle 144, with the first fence 108 in the example deployed position of FIGS. 2 and 7. FIG. 9 is a frontal view of the first example fence 108 of FIGS. 1-8 looking rearward along the example chordwise direction 124 of the first example wing 104, with the first fence 108 in the example deployed position of FIGS. 2, 7 and 8. FIG. 10 is a plan view of the first example fence 108 of FIGS. 1-9 in the example deployed position of FIGS. 2 and 7-9.

In the illustrated example of FIGS. 3-10, the first fence 108 is rotatably coupled to the first wing 104 via the axle 144. The axle 144 includes a first example end 302 coupled to the first wing 104 via a first example axle mount 304, and further includes a second example end 306 located opposite the first end 302 and coupled to the first wing 104 via a second example axle mount 308. The first end 302 of the axle 144 is positioned toward the leading edge 126 of the first wing 104 and/or toward the first axle mount 304, and the second end 306 of the axle 144 is positioned toward the trailing edge 128 of the first wing 104 and/or toward the second axle mount 308.

The first fence 108 includes a first example end 310, a second example end 312 located opposite the first end 310, and an example through hole 314 extending between the first end 310 and the second end 312 of the first fence 108. The first end 310 of the first fence 108 is positioned toward the leading edge 126 of the first wing 104 and/or toward the first axle mount 304, and the second end 312 of the first fence 108 is positioned toward the trailing edge 128 of the first wing 104 and/or toward the second axle mount 308. The axle 144 passes and/or extends through the through hole 314 of the first fence 108 such that the axle 144 and the through hole 314 are parallel and/or coaxially located, and such that the first fence 108 is secured to the axle 144 via the first axle mount 304 and the second axle mount 308. The first axle mount 304 and the second axle mount 308 accordingly secure both the axle 144 and the first fence 108 to the first wing 104. The first fence 108 is rotatable about the axle 144, and is also rotatable relative to the first wing 104. For example, the first fence 108 is rotatable about the axle 144 relative to the first wing 104 between the stowed position shown in FIGS. 1 and 3-6 and the deployed position shown in FIGS. 2 and 7-10.

In the illustrated example of FIGS. 3-10, the panel 142 of the first fence 108 extends in an inboard direction (e.g., toward the longitudinal axis 112 of the aircraft 100) along the skin 114 of the first wing 104 when the first fence 108 is in the stowed position shown in FIGS. 3-6. As shown in FIGS. 3-6, the panel 142 of the first fence 108 extends along and is positioned over and/or on top of the skin 114 of the first wing 104 when the first fence 108 is in the stowed position. In other examples, the panel 142 of the first fence 108 can extend along and be recessed (e.g., fully or partially recessed) relative to the skin 114 of the first wing 104 when the first fence 108 is in the stowed position. As shown in FIGS. 7-10, the panel 142 of the first fence 108 extends at an upward angle (e.g., vertically) away from the skin 114 of the first wing 104 when the first fence 108 is in the deployed position. The panel 142 of the first fence 108 is configured to impact the airflow around the aircraft 100 when the first fence 108 is in the deployed position shown in FIGS. 7-10. For example, the panel 142 can impede a spanwise airflow occurring along the spanwise direction 118 of the first wing 104 when the first fence 108 is in the deployed position shown in FIGS. 7-10. As another example, the panel 142 can initiate and/or generate a vortex along the first wing 104 when the first fence 108 is in the deployed position shown in FIGS. 7-10.

In the illustrated example of FIGS. 3-10, the panel 142 of the first fence 108 is planar. In other examples, the panel 142 of the first fence 108 can be non-planar. For example, the panel 142 of the first fence 108 can have a non-planar (e.g., curved) aerodynamic shape. In some examples, the non-planar aerodynamic shape can be configured to match and/or mimic a non-planar (e.g., curved) aerodynamic shape of the first wing 104. In the illustrated example of FIGS. 3-10, the panel 142 of the first fence 108 has a trapezoidal shape between the first end 310 of the first fence 108 and the second end 312 of the first fence 108. In other examples, the panel 142 of the first fence 108 can have a different (e.g., non-trapezoidal) shape between the first end 310 of the first fence 108 and the second end 312 of the first fence 108. For example, the panel 142 of the first fence 108 can have any of a rectangular shape, a square shape, a triangular shape, a semicircular shape, a circular shape, or an elliptical shape, among others, between the first end 310 of the first fence 108 and the second end 312 of the first fence 108.

In the illustrated example of FIGS. 3-10, an example spring-loaded axle 316 is formed via the axle 144 and an example spring 318 coiled around a portion of the axle 144. As further described below, the spring 318 and/or, more generally, the spring-loaded axle 316 function(s) and/or operate(s) as an actuator configured to move the first fence 108 between the stowed position shown in FIGS. 3-6 and the deployed position shown in FIGS. 7-10, dependent upon the direction and/or strength of airflows caught by and/or received at the panel 142 of the first fence 108. In the illustrated example of FIGS. 3-10, the spring 318 of the spring-loaded axle 316 is located between the second end 312 of the first fence 108 and the second axle mount 308. The spring 318 and/or, more generally, the spring-loaded axle 316 is/are operatively coupled to the first fence 108 such that the spring 318 and/or the spring-loaded axle 316 bias(es) the first fence 108 to the deployed position shown in FIGS. 7-10. For example, the spring 318 of the spring-loaded axle 316 generates a restoring force (e.g., a biasing force) having a restoring force value. In the absence of a deflecting force (e.g., a counter-biasing force, as may be generated via a chordwise and/or cruise airflow) opposing the restoring force and having a deflecting force value that is greater than the restoring force value, the restoring force generated via the spring 318 moves (e.g., rotates) the first fence 108 to, and/or maintains the first fence 108 in, the deployed position shown in FIGS. 7-10.

In the illustrated example of FIGS. 3-10, the spring 318 is in a relatively more wound state when the first fence 108 is in the stowed position shown in FIGS. 3-6 compared to when the first fence 108 is in the deployed position shown in FIGS. 7-10. Conversely, the spring 318 is in a relatively more unwound state when the first fence 108 is in the deployed position shown in FIGS. 7-10 compared to when the first fence 108 is in the stowed position shown in FIGS. 3-6. Stated differently, the spring 318 winds around the spring-loaded axle 316 as the first fence 108 moves from the deployed position shown in FIGS. 7-10 to the stowed position shown in FIGS. 3-6, and the spring 318 conversely unwinds around the spring-loaded axle 316 as the first fence 108 moves from the stowed position shown in FIGS. 3-6 to the deployed position shown in FIGS. 7-10. In the illustrated example of FIGS. 3-10, the spring 318 is implemented via one or more torsion spring(s). In other examples, the spring 318 may additionally or alternatively be implemented via one or more (e.g., individually or in combination) suitably arranged leaf spring(s), compression spring(s), and/or tension spring(s).

Movement (e.g., rotation) of the first fence 108 relative to the first wing 104 is airflow dependent. For example, as described above in connection with FIGS. 1 and 2 and further shown in FIGS. 3-10, the central axis 146 of the axle 144 is canted at the toe-in angle 148 relative to the chordwise direction 124 of the first wing 104. Positioning and/or orienting the central axis 146 of the axle 144 at the toe-in angle 148 causes the panel 142 of the first fence 108 to be positioned and/or oriented in a similar manner. When the first fence 108 is in the deployed position shown in FIGS. 7-10 (e.g., as may be caused by the restoring force generated by the spring 318 of the spring-loaded axle 316), the panel 142 of the first fence 108 is positioned to catch, receive and/or react to a chordwise airflow (e.g., a cruise airflow) occurring along the chordwise direction 124 of the first wing 104. As a result of the toe-in angle 148 at which the central axis 146 of the axle 144 is canted, the chordwise airflow occurring along the chordwise direction 124 of the first wing 104 carries a deflecting force component that counteracts (e.g., opposes) the restoring force generated by the spring 318 of the spring-loaded axle 316.

If the deflecting force component of the chordwise airflow received at, applied to, and/or exerted on the panel 142 of the first fence 108 is greater than the restoring force generated by the spring 318 of the spring-loaded axle 316, the chordwise airflow moves the first fence 108 from the deployed position shown in FIGS. 7-10 to the stowed position shown in FIGS. 3-6. If the deflecting force component of the chordwise airflow received at, applied to, and/or exerted on the panel 142 of the first fence 108 is instead less than the restoring force generated by the spring 318 of the spring-loaded axle 316, the spring 318 maintains the first fence 108 in the deployed position shown in FIGS. 7-10, and/or moves the first fence 108 from the stowed position shown in FIGS. 3-6 to the deployed position shown in FIGS. 7-10. Movement of the first fence 108 relative to the first wing 104 is accordingly dependent on the presence or absence of the chordwise airflow, and on the relative strength (e.g., force) of such airflow.

In some examples, the first fence 108 is configured to move from the deployed position shown in FIGS. 7-10 to the stowed position shown in FIGS. 3-6 during a cruise operation of the aircraft 100 having a first speed, and the first fence 108 is further configured to move from the stowed position of FIGS. 3-6 to the deployed position of FIGS. 7-10 during a reduced speed operation (e.g., a takeoff or landing operation) of the aircraft 100 having a second speed less than the first speed. For example, the spring 318 of the spring-loaded axle 316 may be configured and/or implemented to have a spring constant that causes the spring 318 to generate a restoring force sufficient to move the first fence 108 to, and/or sufficient to maintain the first fence 108 in, the deployed position shown in FIGS. 7-10 when the aircraft 100 is traveling at a speed less than a speed threshold (e.g., less than a cruise speed). When the aircraft 100 is traveling at a speed above or equal to the speed threshold, the restoring force generated by the spring 318 of the spring-loaded axle 316 is overcome via a deflecting force, and the first fence 108 accordingly moves from the deployed position shown in FIGS. 7-10 to the stowed position shown in FIGS. 3-6.

While FIGS. 3-10 and the descriptions thereof provided above are directed to the actuator of the first fence 108 being implemented as a spring-loaded axle (e.g., spring-loaded axle 316) configured to bias and/or move the first fence 108 from the stowed position shown in FIGS. 3-6 to the deployed position shown in FIGS. 7-10, the actuator of the first fence 108 can be implemented in other forms including, for example, electrical, hydraulic, pneumatic, motor-driven, and/or shape memory alloy actuators. Furthermore, while FIGS. 3-10 and the descriptions thereof provided above are directed to the first fence 108 of FIGS. 1 and 2 that is rotatably coupled to the first wing 104 of FIGS. 1 and 2, the informed reader will recognize that the second fence 110 of FIGS. 1 and 2 that is rotatably coupled to the second wing 106 of FIGS. 1 and 2 can be similarly implemented (e.g., in a manner that is mirrored about the longitudinal axis 112 of the aircraft 100). Moreover, while FIGS. 3-10 and the descriptions thereof provided above are directed to the first fence 108 of FIGS. 1 and 2 that is rotatably coupled to the first wing 104 of FIGS. 1 and 2, the informed reader will recognize that any number of additional fences can be similarly implemented on the first wing 104.

Figure 11:
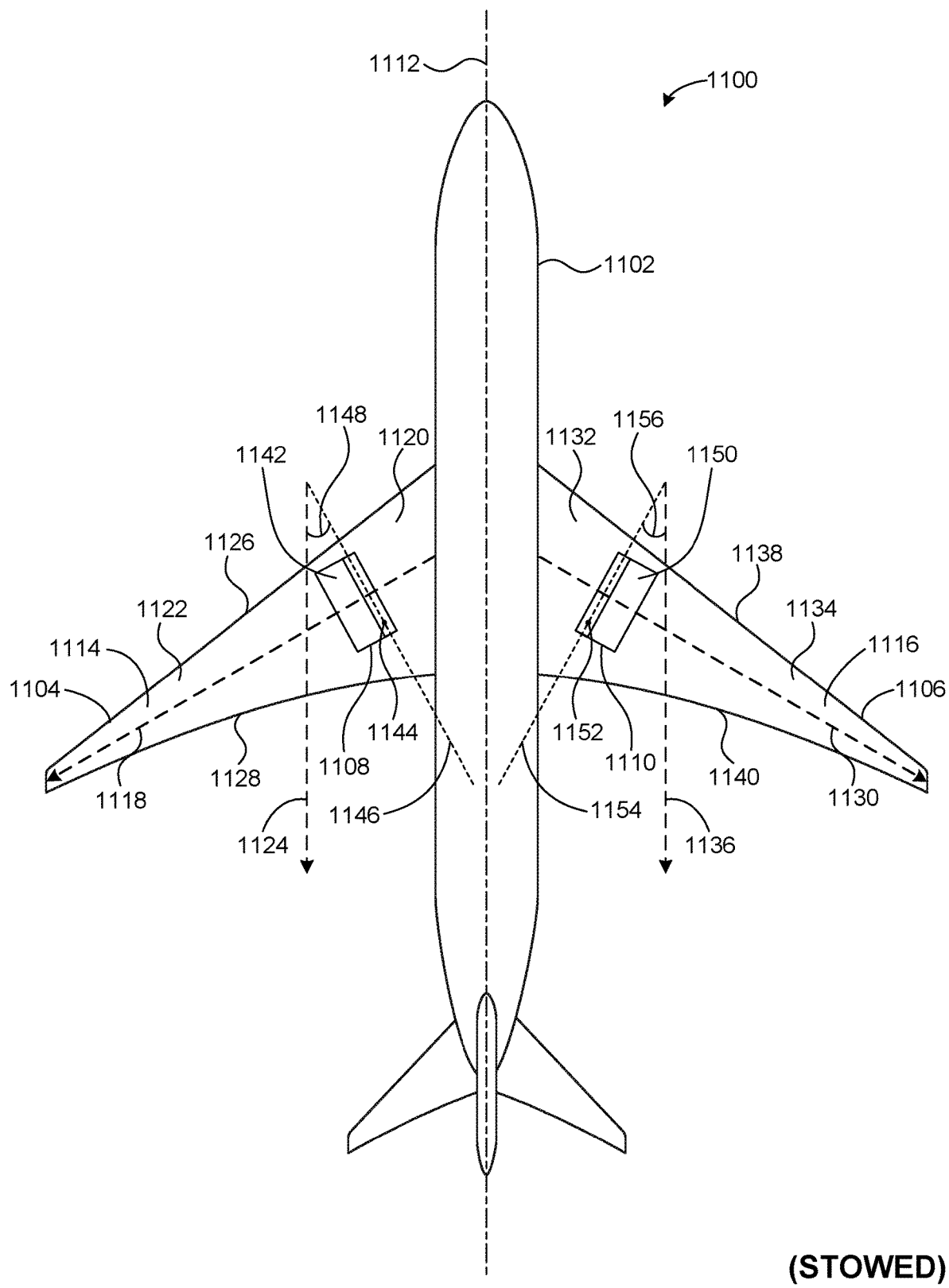
FIG. 11 illustrates another example aircraft in which example airflow-dependent deployable fences can be implemented in accordance with teachings of this disclosure.
Figure 12:
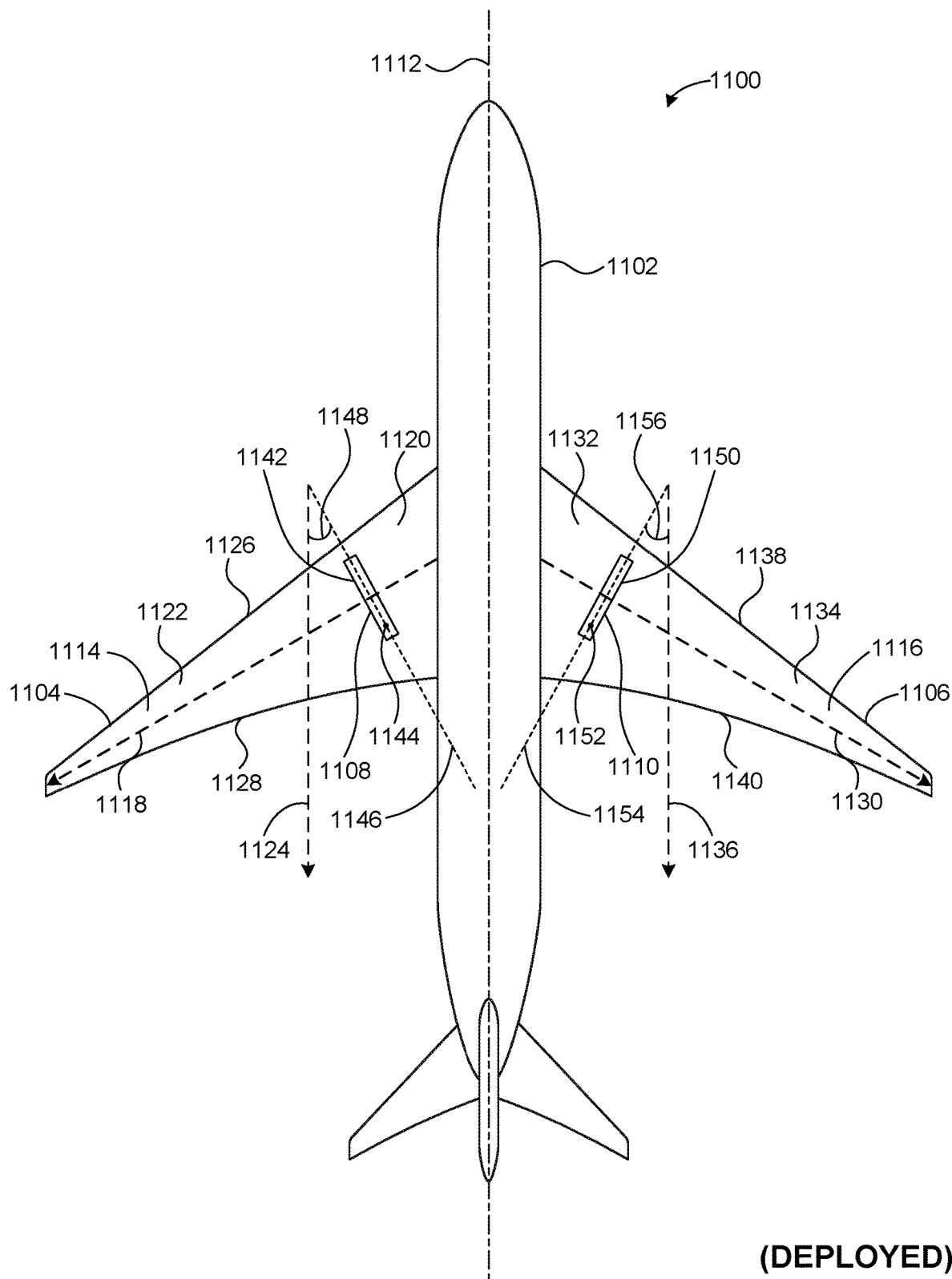
FIG. 12 illustrates the example aircraft of FIG. 11 with the example airflow-dependent deployable fences of FIG. 11 deployed.

FIG. 11 illustrates another example aircraft 1100 in which example airflow-dependent deployable fences can be implemented in accordance with teachings of this disclosure. FIG. 11 illustrates the example aircraft 1100 of FIG. 11 with the example airflow-dependent deployable fences of FIG. 11 stowed. FIG. 12 illustrates the example aircraft 1100 of FIG. 11 with the example airflow-dependent deployable fences of FIG. 11 deployed. The aircraft 1100 can be any form and/or type of aircraft including, for example, a civil (e.g., business or commercial) aircraft, a military aircraft, a manned (e.g., piloted) aircraft, an unmanned aircraft (e.g., a drone), etc. In the illustrated example of FIGS. 11 and 12, the aircraft 1100 includes an example fuselage 1102, a first example wing 1104 (e.g., a left-side wing), a second example wing 1106 (e.g., a right-side wing), a first example fence 1108 (e.g., a left-side fence), and a second example fence 1110 (e.g., a right-side fence). Although the illustrated example of FIGS. 11 and 12 depicts only a single fence located on each wing of the aircraft 1100 (e.g., the first fence 1108 located on the first wing 1104, and the second fence 1110 located on the second wing 1106), other example implementations can include multiple (e.g., 2, 3, 4, etc.) fences located on each wing of the aircraft 1100. In some examples, the location(s), size(s), and/or shape(s) of respective ones of the fences (e.g., the first fence 1108 and the second fence 1110) of the aircraft 1100 can differ relative to the location(s), size(s) and/or shape(s) of the fences shown in FIGS. 11 and 12.

The fuselage 1102 of FIGS. 11 and 12 has a generally cylindrical shape that defines an example longitudinal axis 1112 of the aircraft 1100. The first wing 1104 and the second wing 1106 of FIGS. 11 and 12 are respectively coupled to the fuselage 1102 and swept in a rearward direction of the aircraft 1100. The first wing 1104 includes an example skin 1114 forming (e.g., forming all or part of) an outer surface of the first wing 1104, and the second wing 1106 includes an example skin 1116 forming (e.g., forming all or part of) an outer surface of the second wing 1106.

The first wing 1104 of FIGS. 11 and 12 defines an example spanwise direction 1118 moving from an example inboard portion 1120 (e.g., inboard relative to the spanwise location of the first fence 1108) of the first wing 1104 toward an example outboard portion 1122 (e.g., outboard relative to the spanwise location of the first fence 1108) of the first wing 1104. The spanwise direction 1118 defined by the first wing 1104 is representative of a direction of a spanwise airflow that may occur along the first wing 1104. The first wing 1104 also defines an example chordwise direction 1124 moving from an example leading edge 1126 of the first wing 1104 toward an example trailing edge 1128 of the first wing 1104. The chordwise direction 1124 defined by the first wing 1104 is representative of a direction of a chordwise airflow (e.g., a cruise airflow) that may occur along the first wing 1104.

The second wing 1106 of FIGS. 11 and 12 defines an example spanwise direction 1130 moving from an example inboard portion 1132 (e.g., inboard relative to the spanwise location of the second fence 1110) of the second wing 1106 toward an example outboard portion 1134 (e.g., outboard relative to the spanwise location of the second fence 1110) of the second wing 1106. The spanwise direction 1130 defined by the second wing 1106 is representative of a direction of a spanwise airflow that may occur along the second wing 1106. The second wing 1106 also defines an example chordwise direction 1136 moving from an example leading edge 1138 of the second wing 1106 toward an example trailing edge 1140 of the second wing 1106. The chordwise direction 1136 defined by the second wing 1106 is representative of a direction of a chordwise airflow (e.g., a cruise airflow) that may occur along the second wing 1106.

The first fence 1108 of FIGS. 11 and 12 is rotatably coupled to the first wing 1104 such that the first fence 1108 is movable (e.g., rotatable) between the stowed position shown in FIG. 11 and the deployed position shown in FIG. 12. The first fence 1108 includes an example panel 1142. The panel 1142 of the first fence 1108 extends (e.g., in an outboard direction away from the longitudinal axis 112) along the skin 1114 of the first wing 1104 when the first fence 1108 is in the stowed position shown in FIG. 11. In some examples, the panel 1142 of the first fence 1108 extends along and is positioned over and/or on top of the skin 1114 of the first wing 1104 when the first fence 1108 is in the stowed position shown in FIG. 11. In other examples, the panel 1142 of the first fence 1108 extends along and is recessed (e.g., fully or partially recessed) relative to the skin 1114 of the first wing 1104 when the first fence 1108 is in the stowed position shown in FIG. 11. The panel 1142 of the first fence 1108 extends at an upward angle (e.g., vertically) away from the skin 1114 of the first wing 1104 when the first fence 1108 is in the deployed position shown in FIG. 12. The panel 1142 of the first fence 1108 is configured to impact the airflow around the aircraft 1100 when the first fence 1108 is in the deployed position shown in FIG. 12. For example, the panel 1142 can impede a spanwise airflow occurring along the spanwise direction 1118 of the first wing 1104 when the first fence 1108 is in the deployed position shown in FIG. 12. As another example, the panel 1142 can initiate and/or generate a vortex along the first wing 1104 when the first fence 1108 is in the deployed position shown in FIG. 12.

The panel 1142 and/or, more generally, the first fence 1108 of FIGS. 11 and 12 is rotatably coupled to the first wing 1104 of FIGS. 11 and 12 via an example axle 1144 having an example central axis 1146. In the illustrated example of FIGS. 11 and 12, the central axis 1146 of the axle 1144 is canted (e.g., oriented at an angle) relative to the chordwise direction 1124 of the first wing 1104. For example, as shown in FIGS. 11 and 12, the central axis 1146 of the axle 1144 is canted at an example toe-out angle 1148 relative to the chordwise direction 1124 of the first wing 1104 such that a first end of the axle 1144 positioned toward the leading edge 1126 of the first wing 1104 is located further away from the longitudinal axis 1112 of the aircraft 1100 than is a second end of the axle 1144 positioned toward the trailing edge 1128 of the first wing 1104. The example toe-out angle 1148 shown in FIGS. 11 and 12 is exaggerated for clarity. When implemented, the toe-out angle 1148 preferably has a value ranging from one to fifteen degrees.

The first fence 1108 of FIGS. 11 and 12 is configured to move from the deployed position shown in FIG. 12 to the stowed position shown in FIG. 11 in response to an aerodynamic force exerted on the panel 1142 of the first fence 1108. In some examples, the aerodynamic force may be generated via a chordwise airflow (e.g., a cruise airflow) occurring along the chordwise direction 1124 of the first wing 1104. In some examples, an actuator operatively coupled to the first fence 1108 biases and/or maintains the first fence 1108 in the deployed position shown in FIG. 12 in response to the aerodynamic force exerted on the panel 1142 of the first fence 1108 being less than a threshold force value (e.g., less than the biasing force generated by the actuator). Example means for implementing the actuator are discussed below in connection with FIGS. 13-20. In some disclosed examples, the first fence 1108 moves from the deployed position shown in FIG. 12 to the stowed position shown in FIG. 11 in response to the aerodynamic force exerted on the panel 1142 of the first fence 1108 being greater than the threshold force value (e.g., greater than the biasing force generated by the actuator). In some disclosed examples, the first fence 1108 is configured to move from the deployed position shown in FIG. 12 to the stowed position shown in FIG. 11 during a cruise operation of the aircraft 1100 having a first speed, and the first fence 1108 is further configured to move from the stowed position shown in FIG. 11 to the deployed position shown in FIG. 12 during a reduced speed operation (e.g., a takeoff or landing operation) of the aircraft 1100 having a second speed less than the first speed.

The second fence 1110 of FIGS. 11 and 12 is rotatably coupled to the second wing 1106 such that the second fence 1110 is movable (e.g., rotatable) between the stowed position shown in FIG. 11 and the deployed position shown in FIG. 12. The second fence 1110 includes an example panel 1150. The panel 1150 of the second fence 1110 extends (e.g., in an outboard direction away from the longitudinal axis 1112) along the skin 1116 of the second wing 1106 when the second fence 1110 is in the stowed position shown in FIG. 11. In some examples, the panel 1150 of the second fence 1110 extends along and is positioned over and/or on top of the skin 1116 of the second wing 1106 when the second fence 1110 is in the stowed position shown in FIG. 11. In other examples, the panel 1150 of the second fence 1110 extends along and is recessed (e.g., fully or partially recessed) relative to the skin 1116 of the second wing 1106 when the second fence 1110 is in the stowed position shown in FIG. 11. The panel 1150 of the second fence 1110 extends at an upward angle (e.g., vertically) away from the skin 1116 of the second wing 1106 when the second fence 1110 is in the deployed position shown in FIG. 12. The panel 1150 of the second fence 1110 is configured to impact the airflow around the aircraft 1100 when the second fence 1110 is in the deployed position shown in FIG. 12. For example, the panel 1150 can impede a spanwise airflow occurring along the spanwise direction 1130 of the second wing 1106 when the second fence 1110 is in the deployed position shown in FIG. 12. As another example, the panel 1150 can initiate and/or generate a vortex along the second wing 1106 when the second fence 1110 is in the deployed position shown in FIG. 12.

The panel 1150 and/or, more generally, the second fence 1110 of FIGS. 11 and 12 is rotatably coupled to the second wing 1106 of FIGS. 11 and 12 via an example axle 1152 having an example central axis 1154. In the illustrated example of FIGS. 11 and 12, the central axis 1154 of the axle 1152 is canted (e.g., oriented at an angle) relative to the chordwise direction 1136 of the second wing 1106. For example, as shown in FIGS. 11 and 12, the central axis 1154 of the axle 1152 is canted at an example toe-out angle 1156 relative to the chordwise direction 1136 of the second wing 1106 such that a first end of the axle 1152 positioned toward the leading edge 1138 of the second wing 1106 is located further away from the longitudinal axis 1112 of the aircraft 1100 than is a second end of the axle 1152 positioned toward the trailing edge 1140 of the second wing 1106. The example toe-out angle 1156 shown in FIGS. 11 and 12 is exaggerated for clarity. When implemented, the toe-out angle 1156 preferably has a value ranging from one to fifteen degrees.

The second fence 1110 of FIGS. 11 and 12 is configured to move from the deployed position shown in FIG. 12 to the stowed position shown in FIG. 11 in response to an aerodynamic force exerted on the panel 1150 of the second fence 1110. In some examples, the aerodynamic force may be generated via a chordwise airflow (e.g., a cruise airflow) occurring along the chordwise direction 1136 of the second wing 1106. In some examples, an actuator operatively coupled to the second fence 1110 biases and/or maintains the second fence 1110 in the deployed position shown in FIG. 12 in response to the aerodynamic force exerted on the panel 1150 of the second fence 1110 being less than a threshold force value (e.g., less than the biasing force generated by the actuator). Example means for implementing the actuator are discussed below in connection with FIGS. 13-20. In some disclosed examples, the second fence 1110 moves from the deployed position shown in FIG. 12 to the stowed position shown in FIG. 11 in response to the aerodynamic force exerted on the panel 1150 of the second fence 1110 being greater than the threshold force value (e.g., greater than the biasing force generated by the actuator). In some disclosed examples, the second fence 1110 is configured to move from the deployed position shown in FIG. 12 to the stowed position shown in FIG. 11 during a cruise operation of the aircraft 1100 having a first speed, and the second fence 1110 is further configured to move from the stowed position shown in FIG. 11 to the deployed position shown in FIG. 12 during a reduced speed operation (e.g., a takeoff or landing operation) of the aircraft 1100 having a second speed less than the first speed.

Figure 13:
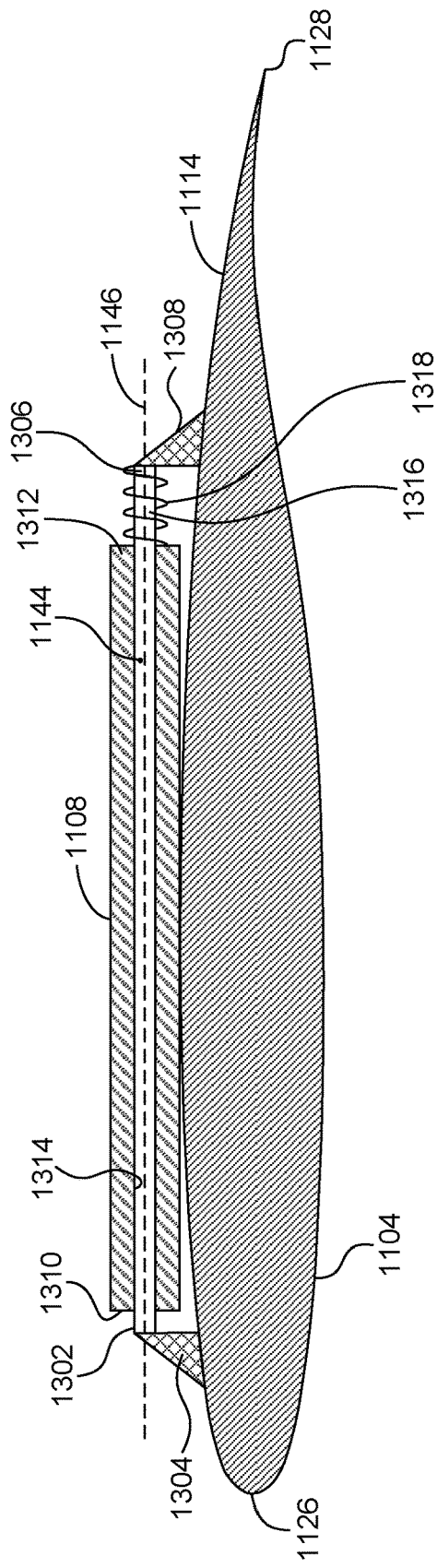
FIG. 13 is a cross-sectional view of the first example fence of FIGS. 11 and 12 looking inboard and taken across the example central axis of the example axle, with the first fence in the example stowed position of FIG. 11.
Figure 14:
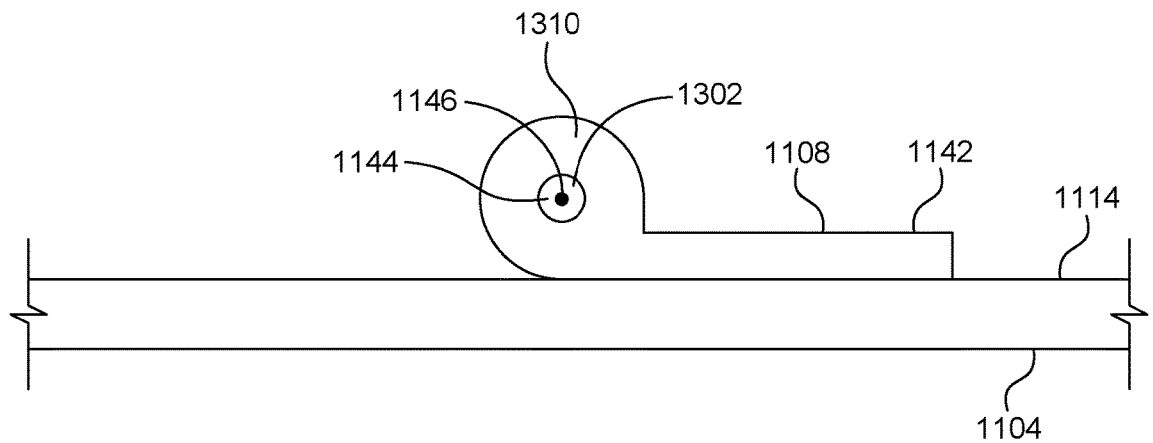
FIG. 14 is a frontal view of the first example fence of FIGS. 11-13 looking rearward along the example central axis of the example axle, with the first fence in the example stowed position of FIGS. 11 and 13.
Figure 15:
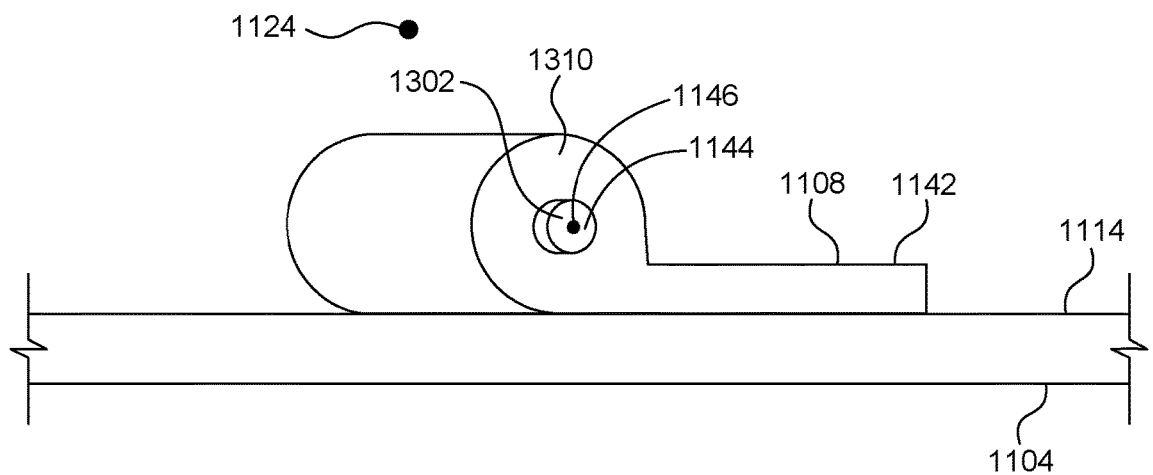
FIG. 15 is a frontal view of the first example fence of FIGS. 11-14 looking rearward along the example chordwise direction of the first example wing, with the first fence in the example stowed position of FIGS. 11, 13 and 14.
Figure 16:
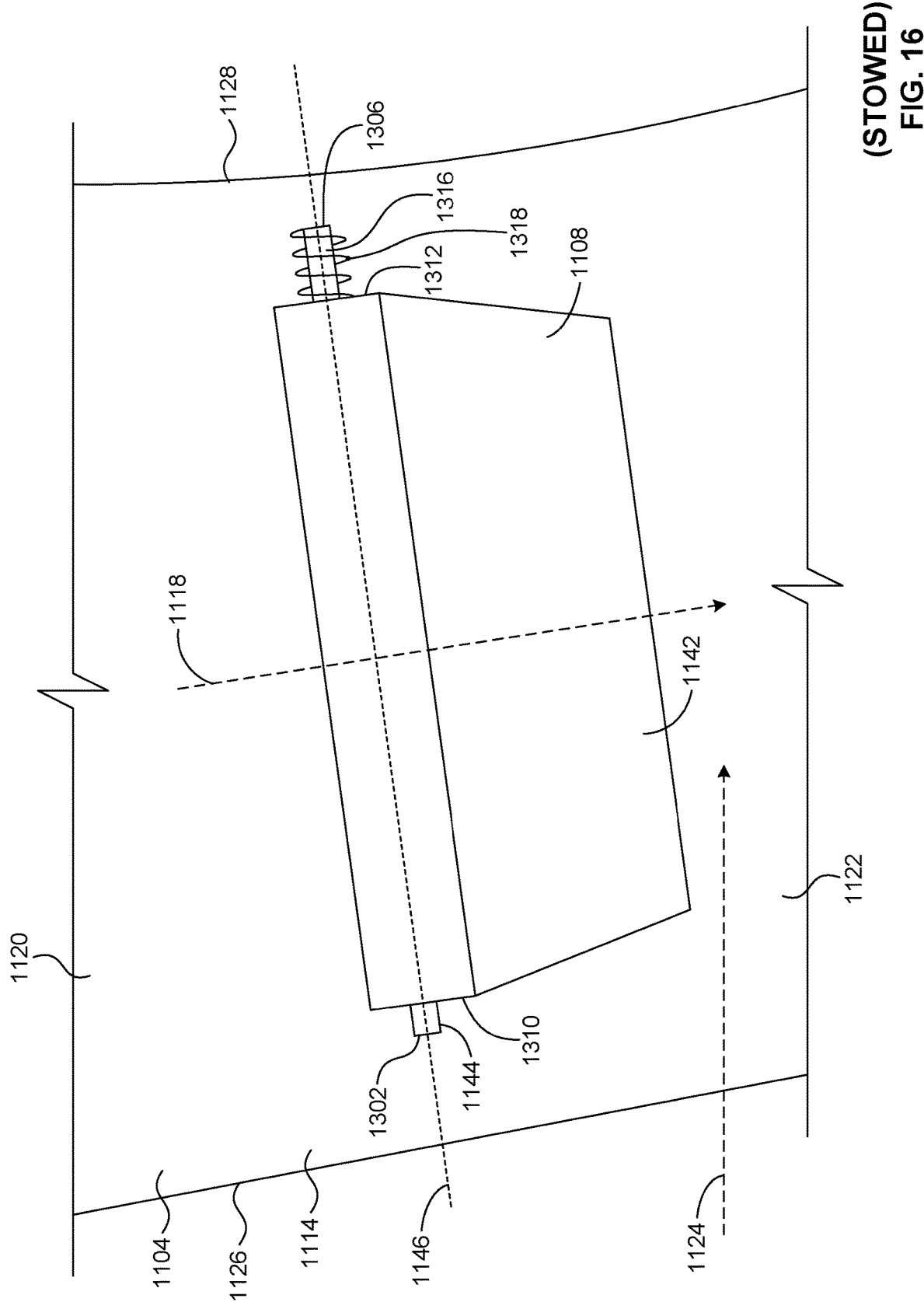
FIG. 16 is a plan view of the first example fence of FIGS. 11-15 in the example stowed position of FIGS. 11 and 13-15.
Figure 17:
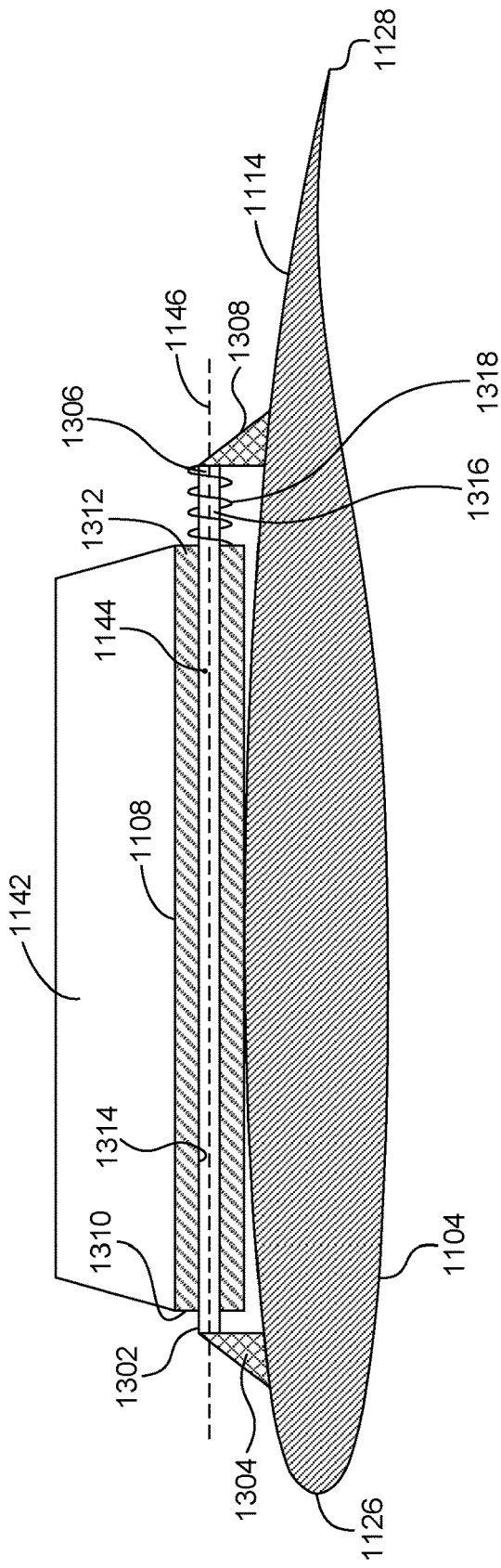
FIG. 17 is a cross-sectional view of the first example fence of FIGS. 11-16 looking inboard and taken across the example central axis of the example axle, with the first fence in the example deployed position of FIG. 12.
Figure 18:
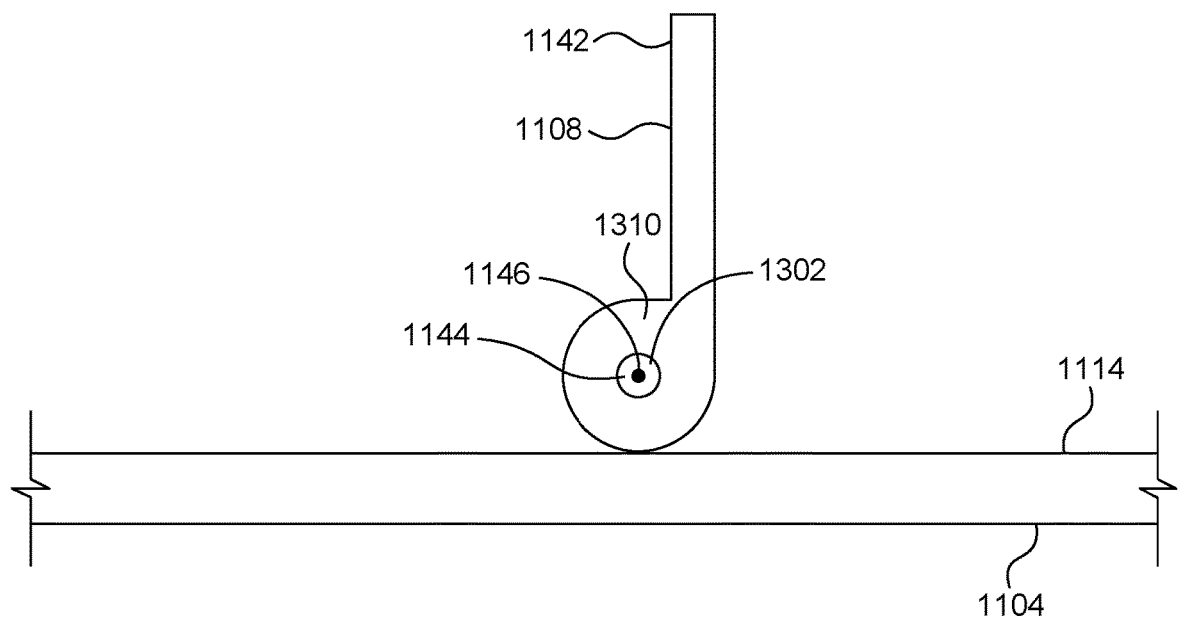
FIG. 18 is a frontal view of the first example fence of FIGS. 11-17 looking rearward along the example central axis of the example axle, with the first fence in the example deployed position of FIGS. 12 and 17.
Figure 19:
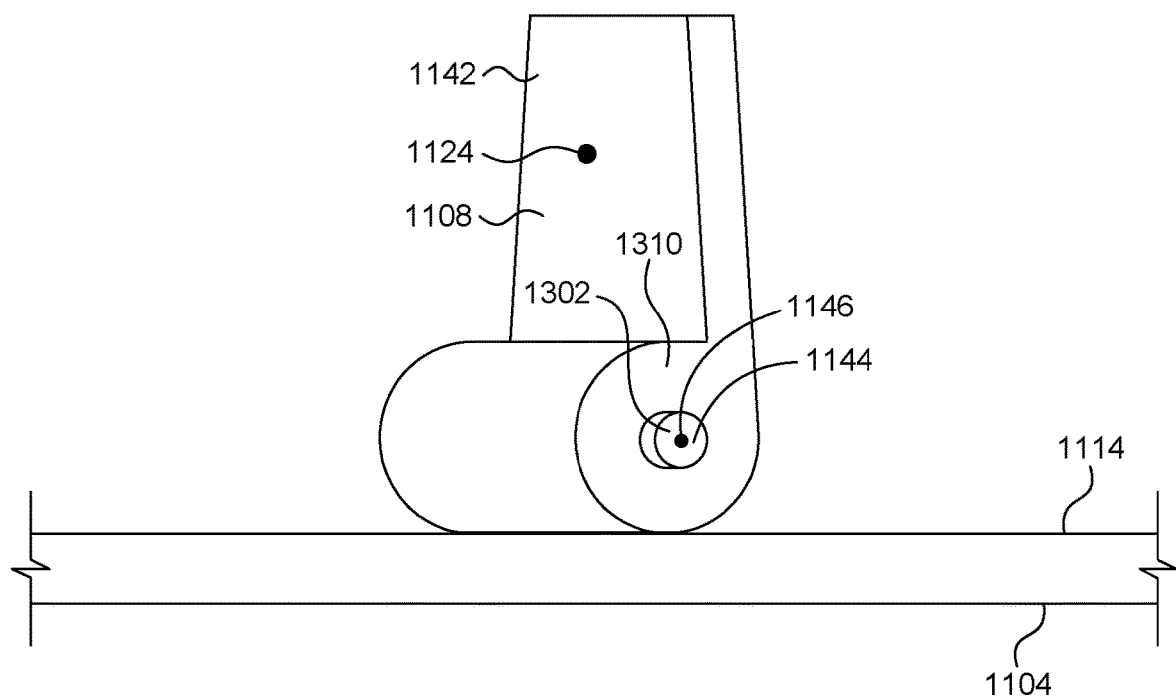
FIG. 19 is a frontal view of the first example fence of FIGS. 11-18 looking rearward along the example chordwise direction of the first example wing, with the first fence in the example deployed position of FIGS. 12, 17 and 18.
Figure 20:
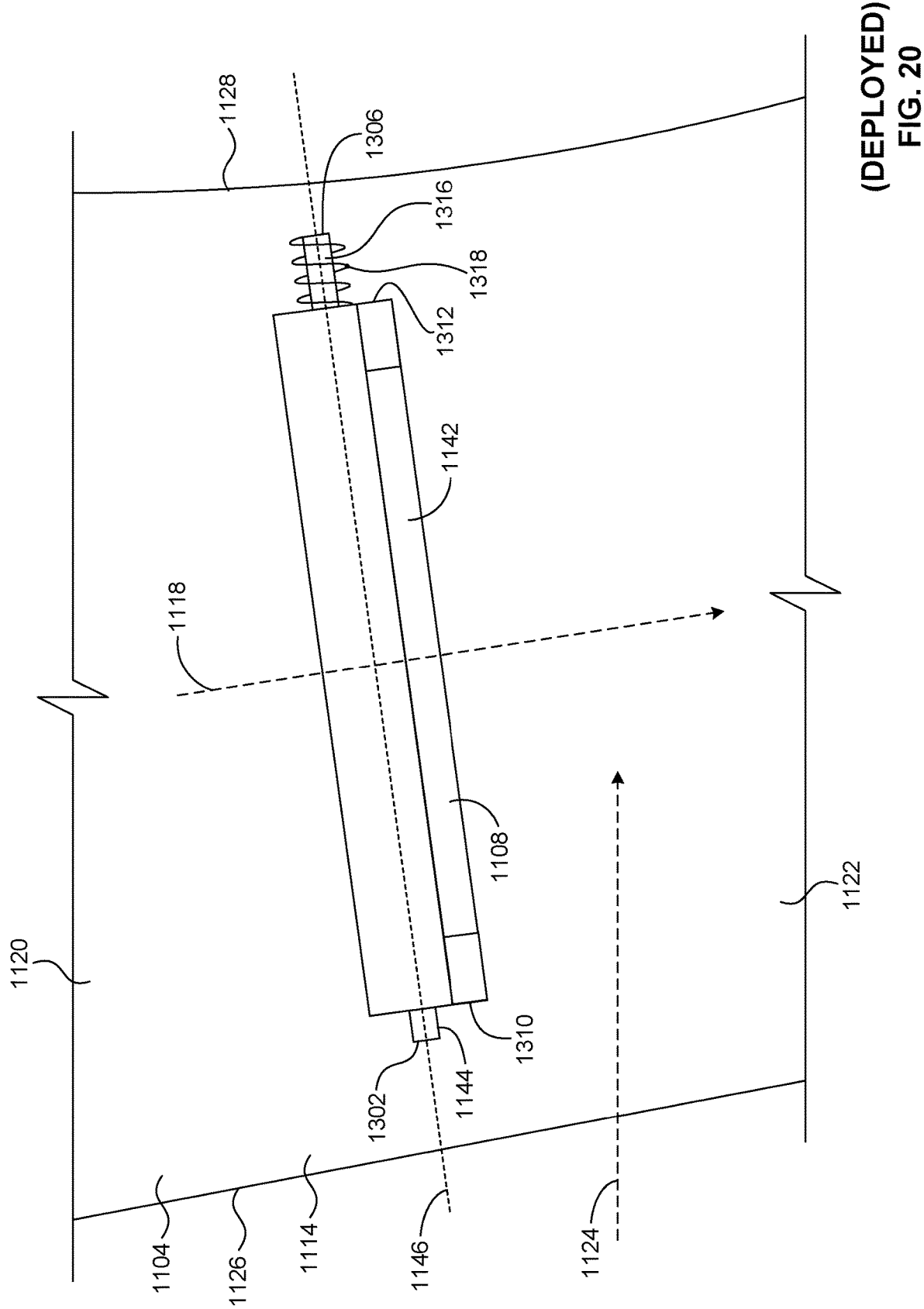
FIG. 20 is a plan view of the first example fence of FIGS. 11-19 in the example deployed position of FIGS. 12 and 17-19.

FIGS. 13-20 provide additional views of the first example fence 1108 of FIGS. 11 and 12 rotatably coupled to the first example wing 1104 of FIGS. 11 and 12. More specifically, FIG. 13 is a cross-sectional view of the first example fence 1108 of FIGS. 11 and 12 looking inboard and taken across the example central axis 1146 of the example axle 1144, with the first fence 1108 in the example stowed position of FIG. 11. FIG. 14 is a frontal view of the first example fence 1108 of FIGS. 11-13 looking rearward along the example central axis 1146 of the example axle 1144, with the first fence 1108 in the example stowed position of FIGS. 11 and 13. FIG. 15 is a frontal view of the first example fence 1108 of FIGS. 11-14 looking rearward along the example chordwise direction 1124 of the first example wing 1104, with the first fence 1108 in the example stowed position of FIGS. 11, 13 and 14. FIG. 16 is a plan view of the first example fence 1108 of FIGS. 11-15 in the example stowed position of FIGS. 11 and 13-15. FIG. 17 is a cross-sectional view of the first example fence 1108 of FIGS. 11-16 looking inboard and taken across the example central axis 1146 of the example axle 1144, with the first fence 1108 in the example deployed position of FIG. 12. FIG. 18 is a frontal view of the first example fence 1108 of FIGS. 11-17 looking rearward along the example central axis 1146 of the example axle 1144, with the first fence 1108 in the example deployed position of FIGS. 12 and 17. FIG. 19 is a frontal view of the first example fence 1108 of FIGS. 11-18 looking rearward along the example chordwise direction 1124 of the first example wing 1104, with the first fence 1108 in the example deployed position of FIGS. 12, 17 and 18. FIG. 20 is a plan view of the first example fence 1108 of FIGS. 11-19 in the example deployed position of FIGS. 12 and 17-19.

In the illustrated example of FIGS. 13-20, the first fence 1108 is rotatably coupled to the first wing 1104 via the axle 1144. The axle 1144 includes a first example end 1302 coupled to the first wing 1104 via a first example axle mount 1304, and further includes a second example end 1306 located opposite the first end 1302 and coupled to the first wing 1104 via a second example axle mount 1308. The first end 1302 of the axle 1144 is positioned toward the leading edge 1126 of the first wing 1104 and/or toward the first axle mount 1304, and the second end 1306 of the axle 1144 is positioned toward the trailing edge 1128 of the first wing 1104 and/or toward the second axle mount 1308.

The first fence 1108 includes a first example end 1310, a second example end 1312 located opposite the first end 1310, and an example through hole 1314 extending between the first end 1310 and the second end 1312 of the first fence 1108. The first end 1310 of the first fence 1108 is positioned toward the leading edge 1126 of the first wing 1104 and/or toward the first axle mount 1304, and the second end 1312 of the first fence 1108 is positioned toward the trailing edge 1128 of the first wing 1104 and/or toward the second axle mount 1308. The axle 1144 passes and/or extends through the through hole 1314 of the first fence 1108 such that the axle 1144 and the through hole 1314 are parallel and/or coaxially located, and such that the first fence 1108 is secured to the axle 1144 via the first axle mount 1304 and the second axle mount 1308. The first axle mount 1304 and the second axle mount 1308 accordingly secure both the axle 1144 and the first fence 1108 to the first wing 1104. The first fence 1108 is rotatable about the axle 1144, and is also rotatable relative to the first wing 1104. For example, the first fence 1108 is rotatable about the axle 1144 relative to the first wing 1104 between the stowed position shown in FIGS. 11 and 13-16 and the deployed position shown in FIGS. 12 and 17-20.

In the illustrated example of FIGS. 13-20, the panel 1142 of the first fence 1108 extends in an outboard direction (e.g., away from the longitudinal axis 1112 of the aircraft 1100) along the skin 1114 of the first wing 1104 when the first fence 1108 is in the stowed position shown in FIGS. 13-16. As shown in FIGS. 13-16, the panel 1142 of the first fence 1108 extends along and is positioned over and/or on top of the skin 1114 of the first wing 1104 when the first fence 1108 is in the stowed position. In other examples, the panel 1142 of the first fence 1108 can extend along and be recessed (e.g., fully or partially recessed) relative to the skin 1114 of the first wing 1104 when the first fence 1108 is in the stowed position. As shown in FIGS. 17-20, the panel 1142 of the first fence 1108 extends at an upward angle (e.g., vertically) away from the skin 1114 of the first wing 1104 when the first fence 1108 is in the deployed position. The panel 1142 of the first fence 1108 is configured to impact the airflow around the aircraft 1100 when the first fence 1108 is in the deployed position shown in FIGS. 17-20. For example, the panel 1142 can impede a spanwise airflow occurring along the spanwise direction 1118 of the first wing 1104 when the first fence 1108 is in the deployed position shown in FIGS. 17-20. As another example, the panel 1142 can initiate and/or generate a vortex along the first wing 1104 when the first fence 1108 is in the deployed position shown in FIGS. 17-20.

In the illustrated example of FIGS. 13-20, the panel 1142 of the first fence 1108 is planar. In other examples, the panel 1142 of the first fence 1108 can be non-planar. For example, the panel 1142 of the first fence 1108 can have a non-planar (e.g., curved) aerodynamic shape. In some examples, the non-planar aerodynamic shape can be configured to match and/or mimic a non-planar (e.g., curved) aerodynamic shape of the first wing 1104. In the illustrated example of FIGS. 13-20, the panel 1142 of the first fence 1108 has a trapezoidal shape between the first end 1310 of the first fence 1108 and the second end 1312 of the first fence 1108. In other examples, the panel 1142 of the first fence 1108 can have a different (e.g., non-trapezoidal) shape between the first end 1310 of the first fence 1108 and the second end 1312 of the first fence 1108. For example, the panel 1142 of the first fence 1108 can have any of a rectangular shape, a square shape, a triangular shape, a semicircular shape, a circular shape, or an elliptical shape, among others, between the first end 1310 of the first fence 1108 and the second end 1312 of the first fence 1108.

In the illustrated example of FIGS. 13-20, an example spring-loaded axle 1316 is formed via the axle 1144 and an example spring 1318 coiled around a portion of the axle 1144. As further described below, the spring 1318 and/or, more generally, the spring-loaded axle 1316 function(s) and/or operate(s) as an actuator configured to move the first fence 1108 between the stowed position shown in FIGS. 13-16 and the deployed position shown in FIGS. 17-20, dependent upon the direction and/or strength of airflows caught by and/or received at the panel 1142 of the first fence 1108. In the illustrated example of FIGS. 13-20, the spring 1318 of the spring-loaded axle 1316 is located between the second end 1312 of the first fence 1108 and the second axle mount 1308. The spring 1318 and/or, more generally, the spring-loaded axle 1316 is/are operatively coupled to the first fence 1108 such that the spring 1318 and/or the spring-loaded axle 1316 bias(es) the first fence 1108 to the deployed position shown in FIGS. 17-20. For example, the spring 1318 of the spring-loaded axle 1316 generates a restoring force (e.g., a biasing force) having a restoring force value. In the absence of a deflecting force (e.g., a counter-biasing force, as may be generated via a chordwise and/or cruise airflow) opposing the restoring force and having a deflecting force value that is greater than the restoring force value, the restoring force generated via the spring 1318 moves (e.g., rotates) the first fence 1108 to, and/or maintains the first fence 1108 in, the deployed position shown in FIGS. 17-20.

In the illustrated example of FIGS. 13-20, the spring 1318 is in a relatively more wound state when the first fence 1108 is in the stowed position shown in FIGS. 13-16 compared to when the first fence 1108 is in the deployed position shown in FIGS. 17-20. Conversely, the spring 1318 is in a relatively more unwound state when the first fence 1108 is in the deployed position shown in FIGS. 17-20 compared to when the first fence 1108 is in the stowed position shown in FIGS. 13-16. Stated differently, the spring 1318 winds around the spring-loaded axle 1316 as the first fence 1108 moves from the deployed position shown in FIGS. 17-20 to the stowed position shown in FIGS. 13-16, and the spring 1318 conversely unwinds around the spring-loaded axle 1316 as the first fence 1108 moves from the stowed position shown in FIGS. 13-16 to the deployed position shown in FIGS. 17-20. In the illustrated example of FIGS. 13-20, the spring 1318 is implemented via one or more torsion spring(s). In other examples, the spring 1318 may additionally or alternatively be implemented via one or more (e.g., individually or in combination) suitably arranged leaf spring(s), compression spring(s), and/or tension spring(s).

Movement (e.g., rotation) of the first fence 1108 relative to the first wing 1104 is airflow dependent. For example, as described above in connection with FIGS. 11 and 12 and further shown in FIGS. 13-20, the central axis 1146 of the axle 1144 is canted at the toe-out angle 1148 relative to the chordwise direction 1124 of the first wing 1104. Positioning and/or orienting the central axis 1146 of the axle 1144 at the toe-out angle 1148 causes the panel 1142 of the first fence 1108 to be positioned and/or oriented in a similar manner. When the first fence 1108 is in the deployed position shown in FIGS. 17-20 (e.g., as may be caused by the restoring force generated by the spring 1318 of the spring-loaded axle 1316), the panel 1142 of the first fence 1108 is positioned to catch, receive and/or react to a chordwise airflow (e.g., a cruise airflow) occurring along the chordwise direction 1124 of the first wing 1104. As a result of the toe-out angle 1148 at which the central axis 1146 of the axle 1144 is canted, the chordwise airflow occurring along the chordwise direction 1124 of the first wing 1104 carries a deflecting force component that counteracts (e.g., opposes) the restoring force generated by the spring 1318 of the spring-loaded axle 1316.

If the deflecting force component of the chordwise airflow received at, applied to, and/or exerted on the panel 1142 of the first fence 1108 is greater than the restoring force generated by the spring 1318 of the spring-loaded axle 1316, the chordwise airflow moves the first fence 1108 from the deployed position shown in FIGS. 17-20 to the stowed position shown in FIGS. 13-16. If the deflecting force component of the chordwise airflow received at, applied to, and/or exerted on the panel 1142 of the first fence 1108 is instead less than the restoring force generated by the spring 1318 of the spring-loaded axle 1316, the spring 1318 maintains the first fence 1108 in the deployed position shown in FIGS. 17-20, and/or moves the first fence 1108 from the stowed position shown in FIGS. 13-16 to the deployed position shown in FIGS. 17-20. Movement of the first fence 1108 relative to the first wing 1104 is accordingly dependent on the presence or absence of the chordwise airflow, and on the relative strength (e.g., force) of such airflow.

In some examples, the first fence 1108 is configured to move from the deployed position shown in FIGS. 17-20 to the stowed position shown in FIGS. 13-16 during a cruise operation of the aircraft 1100 having a first speed, and the first fence 1108 is further configured to move from the stowed position of FIGS. 13-16 to the deployed position of FIGS. 17-20 during a reduced speed operation (e.g., a takeoff or landing operation) of the aircraft 1100 having a second speed less than the first speed. For example, the spring 1318 of the spring-loaded axle 1316 may be configured and/or implemented to have a spring constant that causes the spring 1318 to generate a restoring force sufficient to move the first fence 1108 to, and/or sufficient to maintain the first fence 1108 in, the deployed position shown in FIGS. 17-20 when the aircraft 1100 is traveling at a speed less than a speed threshold (e.g., less than a cruise speed). When the aircraft 1100 is traveling at a speed above or equal to the speed threshold, the restoring force generated by the spring 1318 of the spring-loaded axle 1316 is overcome via a deflecting force, and the first fence 1108 accordingly moves from the deployed position shown in FIGS. 17-20 to the stowed position shown in FIGS. 13-16.

While FIGS. 13-20 and the descriptions thereof provided above are directed to the actuator of the first fence 1108 being implemented as a spring-loaded axle (e.g., spring-loaded axle 1316) configured to bias and/or move the first fence 1108 from the stowed position shown in FIGS. 13-16 to the deployed position shown in FIGS. 17-20, the actuator of the first fence 1108 can be implemented in other forms including, for example, electrical, hydraulic, pneumatic, motor-driven, and/or shape memory alloy actuators. Furthermore, while FIGS. 13-20 and the descriptions thereof provided above are directed to the first fence 1108 of FIGS. 11 and 12 that is rotatably coupled to the first wing 1104 of FIGS. 11 and 12, the informed reader will recognize that the second fence 1110 of FIGS. 11 and 12 that is rotatably coupled to the second wing 1106 of FIGS. 11 and 12 can be similarly implemented (e.g., in a manner that is mirrored about the longitudinal axis 1112 of the aircraft 1100). Moreover, while FIGS. 13-20 and the descriptions thereof provided above are directed to the first fence 1108 of FIGS. 11 and 12 that is rotatably coupled to the first wing 1104 of FIGS. 11 and 12, the informed reader will recognize that any number of additional fences can be similarly implemented on the first wing 1104.

Figure 21:
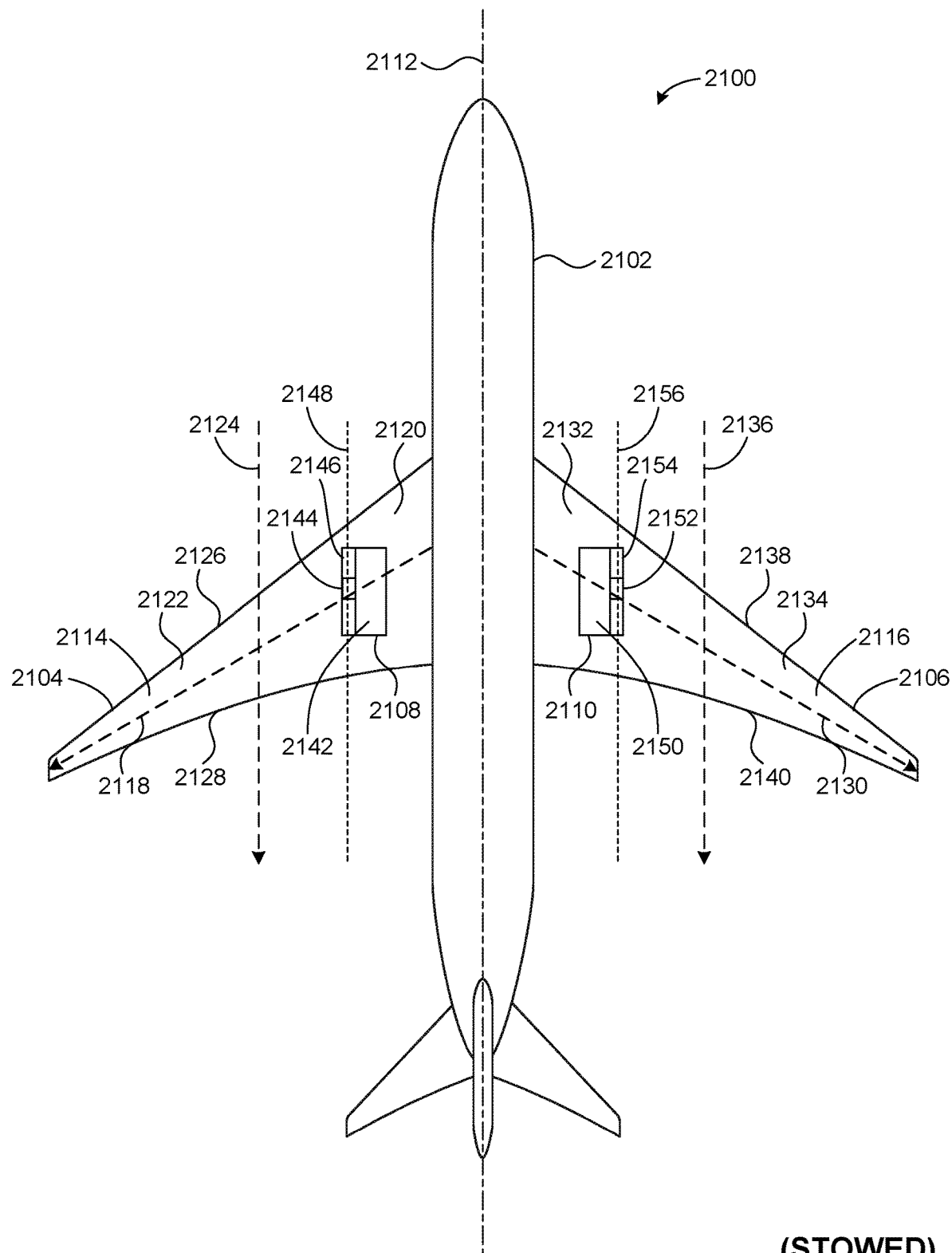
FIG. 21 illustrates another example aircraft in which example airflow-dependent deployable fences can be implemented in accordance with teachings of this disclosure.
Figure 22:
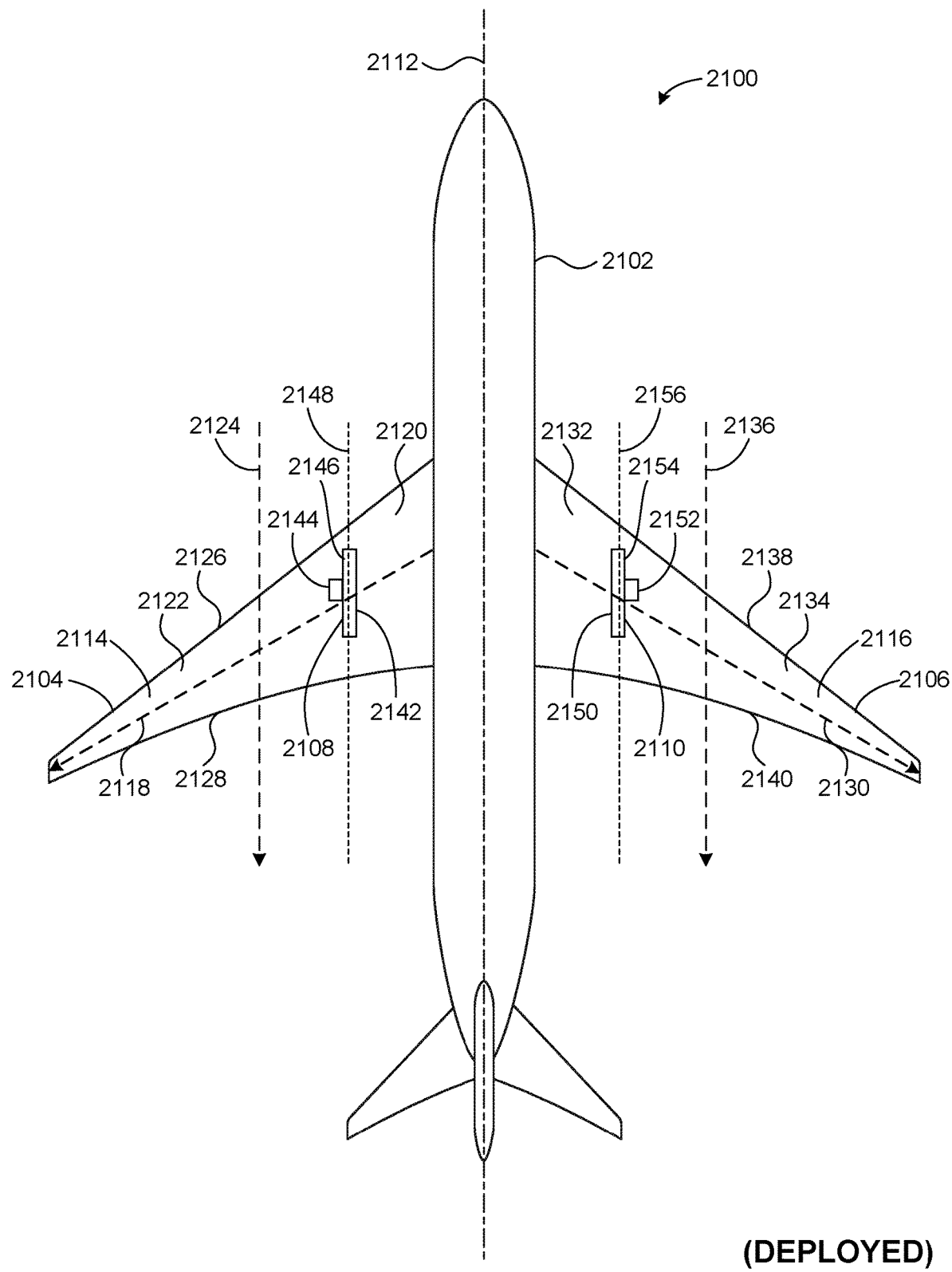
FIG. 22 illustrates the example aircraft of FIG. 21 with the example airflow-dependent deployable fences of FIG. 21 deployed.

FIG. 21 illustrates another example aircraft 2100 in which example airflow-dependent deployable fences can be implemented in accordance with teachings of this disclosure. FIG. 21 illustrates the example aircraft 2100 of FIG. 21 with the example airflow-dependent deployable fences of FIG. 21 stowed. FIG. 22 illustrates the example aircraft 2100 of FIG. 21 with the example airflow-dependent deployable fences of FIG. 21 deployed. The aircraft 2200 can be any form and/or type of aircraft including, for example, a civil (e.g., business or commercial) aircraft, a military aircraft, a manned (e.g., piloted) aircraft, an unmanned aircraft (e.g., a drone), etc. In the illustrated example of FIGS. 21 and 22, the aircraft 2100 includes an example fuselage 2102, a first example wing 2104 (e.g., a left-side wing), a second example wing 2106 (e.g., a right-side wing), a first example fence 2108 (e.g., a left-side fence), and a second example fence 2110 (e.g., a right-side fence). Although the illustrated example of FIGS. 21 and 22 depicts only a single fence located on each wing of the aircraft 2100 (e.g., the first fence 2108 located on the first wing 2104, and the second fence 2110 located on the second wing 2106), other example implementations can include multiple (e.g., 2, 3, 4, etc.) fences located on each wing of the aircraft 2100. In some examples, the location(s), size(s), and/or shape(s) of respective ones of the fences (e.g., the first fence 2108 and the second fence 2110) of the aircraft 2100 can differ relative to the location(s), size(s) and/or shape(s) of the fences shown in FIGS. 21 and 22.

The fuselage 2102 of FIGS. 21 and 22 has a generally cylindrical shape that defines an example longitudinal axis 2112 of the aircraft 2100. The first wing 2104 and the second wing 2106 of FIGS. 21 and 22 are respectively coupled to the fuselage 2102 and swept in a rearward direction of the aircraft 2100. The first wing 2104 includes an example skin 2114 forming (e.g., forming all or part of) an outer surface of the first wing 2104, and the second wing 2106 includes an example skin 2116 forming (e.g., forming all or part of) an outer surface of the second wing 2106.

The first wing 2104 of FIGS. 21 and 22 defines an example spanwise direction 2118 moving from an example inboard portion 2120 (e.g., inboard relative to the spanwise location of the first fence 2108) of the first wing 2104 toward an example outboard portion 2122 (e.g., outboard relative to the spanwise location of the first fence 2108) of the first wing 2104. The spanwise direction 2118 defined by the first wing 2104 is representative of a direction of a spanwise airflow that may occur along the first wing 2104. The first wing 2104 also defines an example chordwise direction 2124 moving from an example leading edge 2126 of the first wing 2104 toward an example trailing edge 2128 of the first wing 2104. The chordwise direction 2124 defined by the first wing 2104 is representative of a direction of a cruise airflow that may occur along the first wing 2104.

The second wing 2106 of FIGS. 21 and 22 defines an example spanwise direction 2130 moving from an example inboard portion 2132 (e.g., inboard relative to the spanwise location of the second fence 2110) of the second wing 2106 toward an example outboard portion 2134 (e.g., outboard relative to the spanwise location of the second fence 2110) of the second wing 2106. The spanwise direction 2130 defined by the second wing 2106 is representative of a direction of a spanwise airflow that may occur along the second wing 2106. The second wing 2106 also defines an example chordwise direction 2136 moving from an example leading edge 2138 of the second wing 2106 toward an example trailing edge 2140 of the second wing 2106. The chordwise direction 2136 defined by the second wing 2106 is representative of a direction of a cruise airflow that may occur along the second wing 2106.

The first fence 2108 of FIGS. 21 and 22 is rotatably coupled to the first wing 2104 such that the first fence 2108 is movable (e.g., rotatable) between the stowed position shown in FIG. 21 and the deployed position shown in FIG. 22. The first fence 2108 includes an example panel 2142. The panel 2142 of the first fence 2108 extends (e.g., in an inboard direction toward the longitudinal axis 2112) along the skin 2114 of the first wing 2104 when the first fence 2108 is in the stowed position shown in FIG. 21. In some examples, the panel 2142 of the first fence 2108 extends along and is positioned over and/or on top of the skin 2114 of the first wing 2104 when the first fence 2108 is in the stowed position shown in FIG. 21. In other examples, the panel 2142 of the first fence 2108 extends along and is recessed (e.g., fully or partially recessed) relative to the skin 2114 of the first wing 2104 when the first fence 2108 is in the stowed position shown in FIG. 21. The panel 2142 of the first fence 2108 extends at an upward angle (e.g., vertically) away from the skin 2114 of the first wing 2104 when the first fence 2108 is in the deployed position shown in FIG. 22. The panel 2142 of the first fence 2108 is configured to impact the airflow around the aircraft 2100 when the first fence 2108 is in the deployed position shown in FIG. 22. For example, the panel 2142 can impede a spanwise airflow occurring along the spanwise direction 2118 of the first wing 2104 when the first fence 2108 is in the deployed position shown in FIG. 22. As another example, the panel 2142 can initiate and/or generate a vortex along the first wing 2104 when the first fence 2108 is in the deployed position shown in FIG. 22.

The first fence 2108 further includes an example deployment vane 2144. In the illustrated example of FIGS. 21 and 22, the deployment vane 2144 of the first fence 2108 is orthogonal to the panel 2142 of the first fence 2108. In other examples, the deployment vane 2144 of the first fence 2108 can be oriented at a non-orthogonal angle relative to the panel 2142 of the first fence 2108. For example, the deployment vane 2144 of the first fence 2108 can be oriented at an angle between forty-five and one hundred thirty-five degrees relative to the panel 2142 of the first fence 2108. The deployment vane 2144 of the first fence 2108 extends (e.g., in an outboard direction away from the longitudinal axis 2112) along the skin 2114 of the first wing 2104 when the first fence 2108 is in the deployed position shown in FIG. 22. In some examples, the deployment vane 2144 of the first fence 2108 extends along and is positioned over and/or on top of the skin 2114 of the first wing 2104 when the first fence 2108 is in the deployed position shown in FIG. 22. In other examples, the deployment vane 2144 of the first fence 2108 extends along and is recessed (e.g., fully or partially recessed) relative to the skin 2114 of the first wing 2104 when the first fence 2108 is in the deployed position shown in FIG. 22. The deployment vane 2144 of the first fence 2108 extends at an upward angle (e.g., vertically) away from the skin 2114 of the first wing 2104 when the first fence 2108 is in the stowed position shown in FIG. 21. The deployment vane 2144 of the first fence 2108 is configured to catch, receive and/or react to a spanwise airflow occurring along the spanwise direction 2118 of the first wing 2104 when the first fence 2108 is in the stowed position shown in FIG. 21.

The panel 2142 and the deployment vane 2144, and/or, more generally, the first fence 2108 of FIGS. 21 and 22 is/are rotatably coupled to the first wing 2104 of FIGS. 21 and 22 via an example axle 2146 having an example central axis 2148. In the illustrated example of FIGS. 21 and 22, the central axis 2148 of the axle 2146 is parallel to the chordwise direction 2124 of the first wing 2104. In other examples, the central axis 2148 of the axle 2146 can be canted (e.g., at a toe-in angle or a toe-out angle) relative to the chordwise direction 2124 of the first wing 2104. The first fence 2108 of FIGS. 21 and 22 is configured to move from the stowed position shown in FIG. 21 to the deployed position shown in FIG. 22 in response to an aerodynamic force exerted on the deployment vane 2144 of the first fence 2108. In some examples, the aerodynamic force may be generated via a spanwise airflow occurring along the spanwise direction 2118 of the first wing 2104. In some disclosed examples, an actuator operatively coupled to the first fence 2108 biases and/or maintains the first fence 2108 in the stowed position shown in FIG. 21 in response to the aerodynamic force exerted on the deployment vane 2144 of the first fence 2108 being less than a threshold force value (e.g., less than the biasing force generated by the actuator). Example means for implementing the actuator are discussed below in connection with FIGS. 23-28. In some disclosed examples, the first fence 2108 moves from the stowed position shown in FIG. 21 to the deployed position shown in FIG. 22 in response to the aerodynamic force exerted on the deployment vane 2144 of the first fence 2108 being greater than the threshold force value (e.g., greater than the biasing force generated by the actuator).

The second fence 2110 of FIGS. 21 and 22 is rotatably coupled to the second wing 2106 such that the second fence 2110 is movable (e.g., rotatable) between the stowed position shown in FIG. 21 and the deployed position shown in FIG. 22. The second fence 2110 includes an example panel 2150. The panel 2150 of the second fence 2110 extends (e.g., in an inboard direction toward the longitudinal axis 2112) along the skin 2116 of the second wing 2106 when the second fence 2110 is in the stowed position shown in FIG. 21. In some examples, the panel 2150 of the second fence 2110 extends along and is positioned over and/or on top of the skin 2116 of the second wing 2106 when the second fence 2110 is in the stowed position shown in FIG. 21. In other examples, the panel 2150 of the second fence 2110 extends along and is recessed (e.g., fully or partially recessed) relative to the skin 2116 of the second wing 2106 when the second fence 2110 is in the stowed position shown in FIG. 21. The panel 2150 of the second fence 2110 extends at an upward angle (e.g., vertically) away from the skin 2116 of the second wing 2106 when the second fence 2110 is in the deployed position shown in FIG. 22. The panel 2150 of the second fence 2110 is configured to impact the airflow around the aircraft 2100 when the second fence 2110 is in the deployed position shown in FIG. 22. For example, the panel 2150 can impede a spanwise airflow occurring along the spanwise direction 2130 of the second wing 2106 when the second fence 2110 is in the deployed position shown in FIG. 22. As another example, the panel 2150 can initiate and/or generate a vortex along the second wing 2106 when the second fence 2110 is in the deployed position shown in FIG. 22.

The second fence 2110 further includes an example deployment vane 2152. In the illustrated example of FIGS. 21 and 22, the deployment vane 2152 of the second fence 2110 is orthogonal to the panel 2150 of the second fence 2110. In other examples, the deployment vane 2152 of the second fence 2110 can be oriented at a non-orthogonal angle relative to the panel 2150 of the second fence 2110. For example, the deployment vane 2152 of the second fence 2110 can be oriented at an angle between forty-five and one hundred thirty-five degrees relative to the panel 2150 of the second fence 2110. The deployment vane 2152 of the second fence 2110 extends (e.g., in an outboard direction away from the longitudinal axis 2112) along the skin 2116 of the second wing 2106 when the second fence 2110 is in the deployed position shown in FIG. 22. In some examples, the deployment vane 2152 of the second fence 2110 extends along and is positioned over and/or on top of the skin 2116 of the second wing 2106 when the second fence 2110 is in the deployed position shown in FIG. 22. In other examples, the deployment vane 2152 of the second fence 2110 extends along and is recessed (e.g., fully or partially recessed) relative to the skin 2116 of the second wing 2106 when the second fence 2110 is in the deployed position shown in FIG. 22. The deployment vane 2152 of the second fence 2110 extends at an upward angle (e.g., vertically) away from the skin 2116 of the second wing 2106 when the second fence 2110 is in the stowed position shown in FIG. 21. The deployment vane 2152 of the second fence 2110 is configured to catch, receive and/or react to a spanwise airflow occurring along the spanwise direction 2130 of the second wing 2106 when the second fence 2110 is in the stowed position shown in FIG. 21.

The panel 2150 and the deployment vane 2152, and/or, more generally, the second fence 2110 of FIGS. 21 and 22 is/are rotatably coupled to the second wing 2106 of FIGS. 21 and 22 via an example axle 2154 having an example central axis 2156. In the illustrated example of FIGS. 21 and 22, the central axis 2156 of the axle 2154 is parallel to the chordwise direction 2136 of the second wing 2106. In other examples, the central axis 2156 of the axle 2154 can be canted (e.g., at a toe-in angle or a toe-out angle) relative to the chordwise direction 2136 of the second wing 2106. The second fence 2110 of FIGS. 21 and 22 is configured to move from the stowed position shown in FIG. 21 to the deployed position shown in FIG. 22 in response to an aerodynamic force exerted on the deployment vane 2152 of the second fence 2110. In some examples, the aerodynamic force may be generated via a spanwise airflow occurring along the spanwise direction 2130 of the second wing 2106. In some disclosed examples, an actuator operatively coupled to the second fence 2110 biases and/or maintains the second fence 2110 in the stowed position shown in FIG. 21 in response to the aerodynamic force exerted on the deployment vane 2152 of the second fence 2110 being less than a threshold force value (e.g., less than the biasing force generated by the actuator). Example means for implementing the actuator are discussed below in connection with FIGS. 23-28. In some disclosed examples, the second fence 2110 moves from the stowed position shown in FIG. 11 to the deployed position shown in FIG. 22 in response to the aerodynamic force exerted on the deployment vane 2152 of the second fence 2110 being greater than the threshold force value (e.g., greater than the biasing force generated by the actuator).

Figure 23:
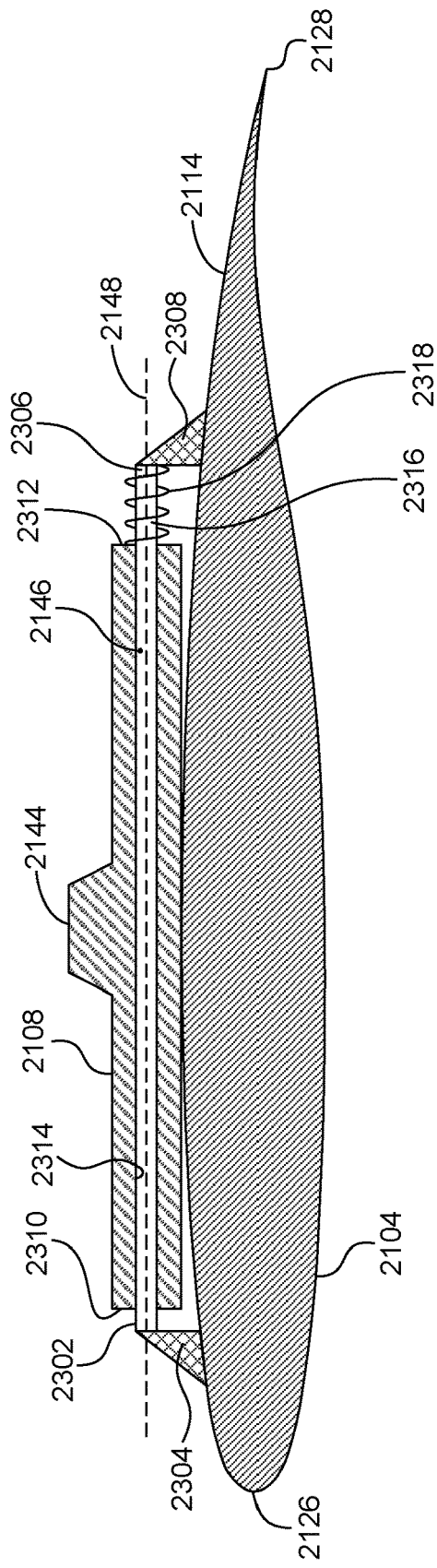
FIG. 23 is a cross-sectional view of the first example fence of FIGS. 21 and 22 looking inboard and taken across the example central axis of the example axle, with the first fence in the example stowed position of FIG. 21.
Figure 24:
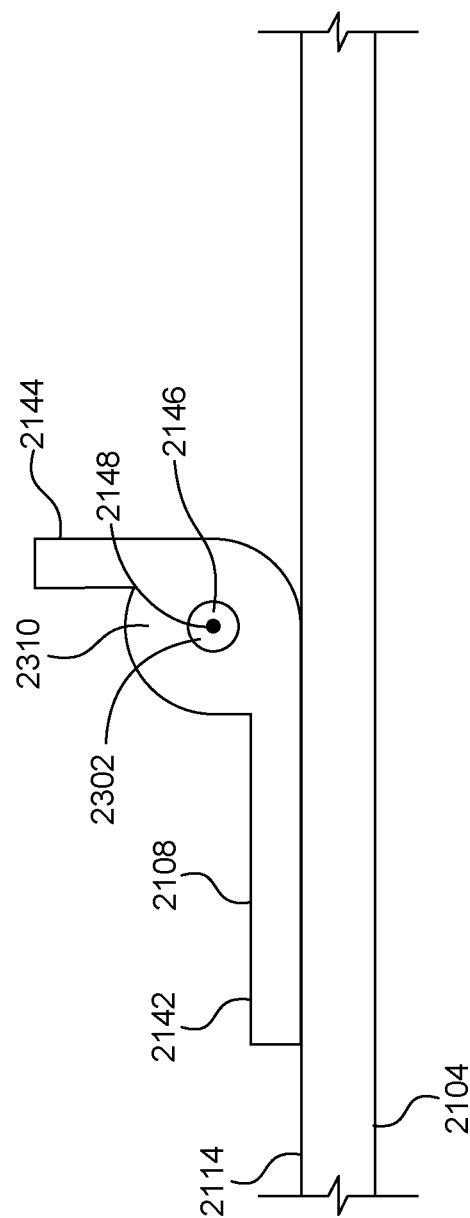
FIG. 24 is a frontal view of the first example fence of FIGS. 21-23 looking rearward along the example central axis of the example axle, with the first fence in the example stowed position of FIGS. 21 and 23.
Figure 25:
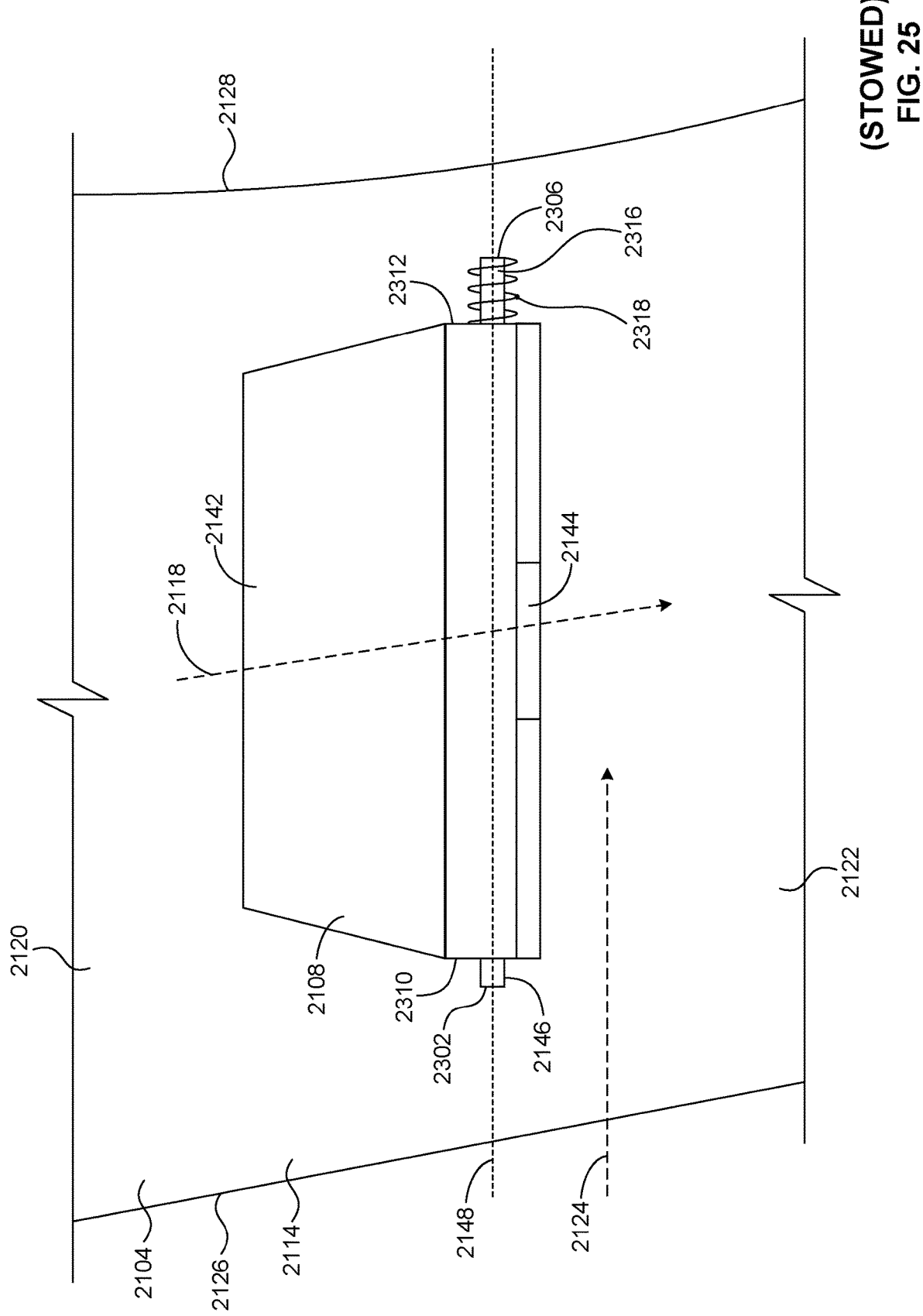
FIG. 25 is a plan view of the first example fence of FIGS. 21-24 in the example stowed position of FIGS. 21, 23 and 24.
Figure 26:
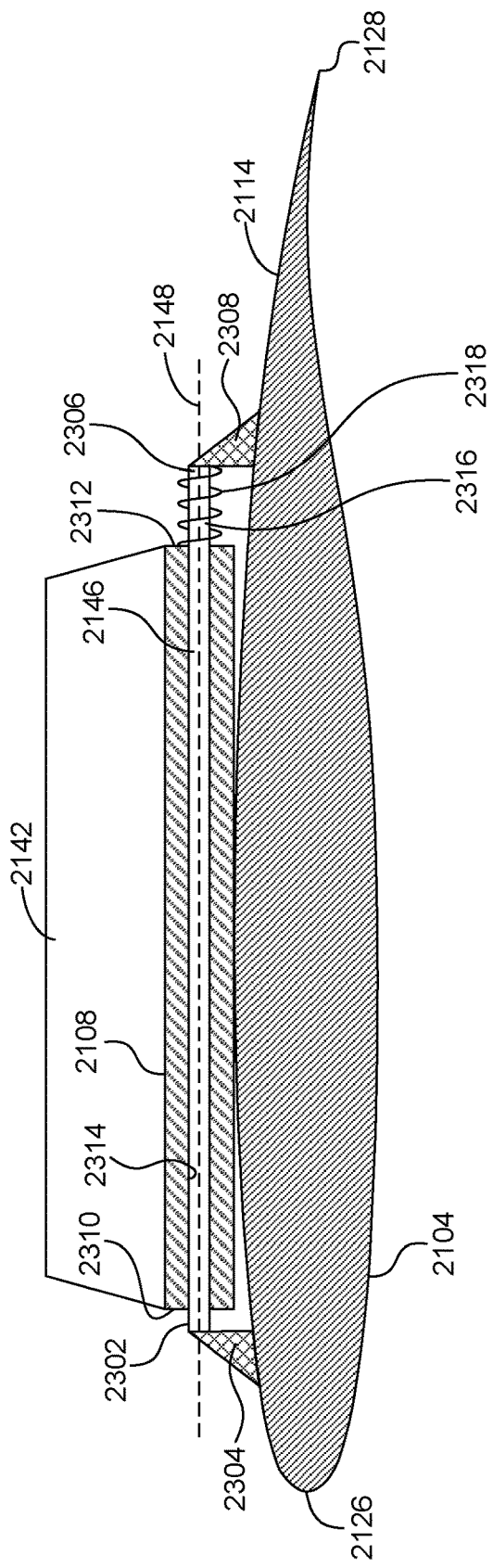
FIG. 26 is a cross-sectional view of the first example fence of FIGS. 21-25 looking inboard and taken across the example central axis of the example axle, with the first fence in the example deployed position of FIG. 22.
Figure 27:
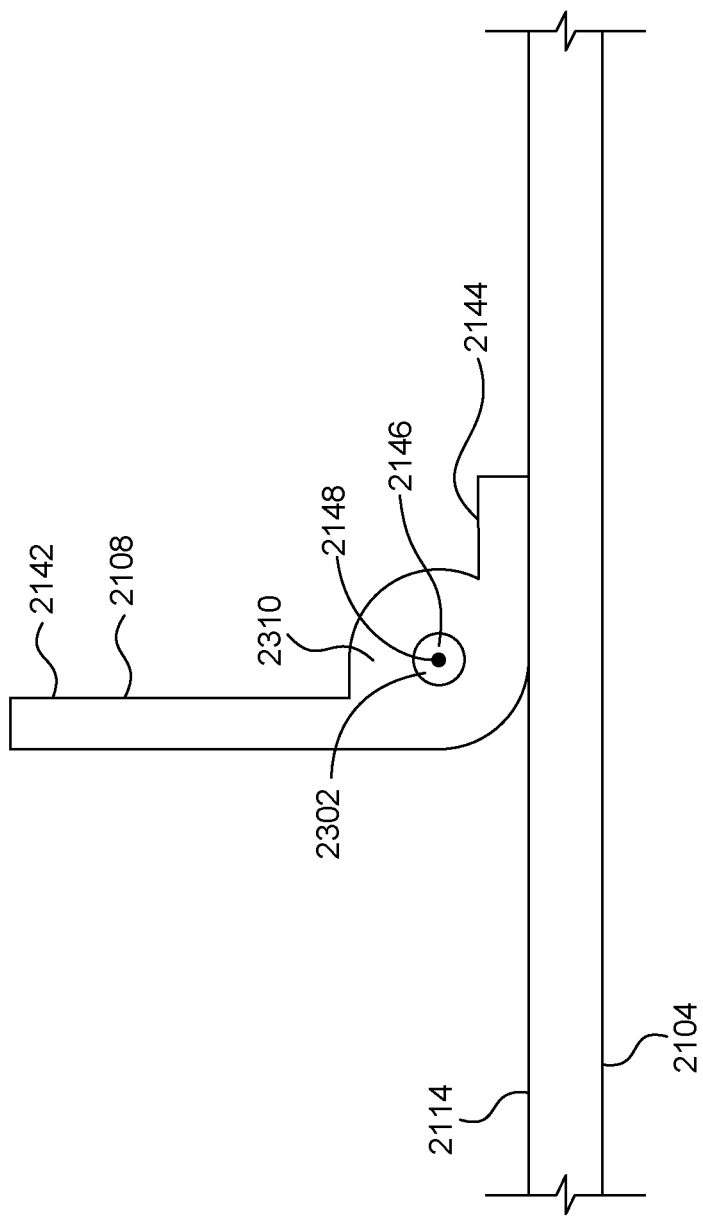
FIG. 27 is a frontal view of the first example fence of FIGS. 21-26 looking rearward along the example central axis of the example axle, with the first fence in the example deployed position of FIGS. 22 and 26.
Figure 28:
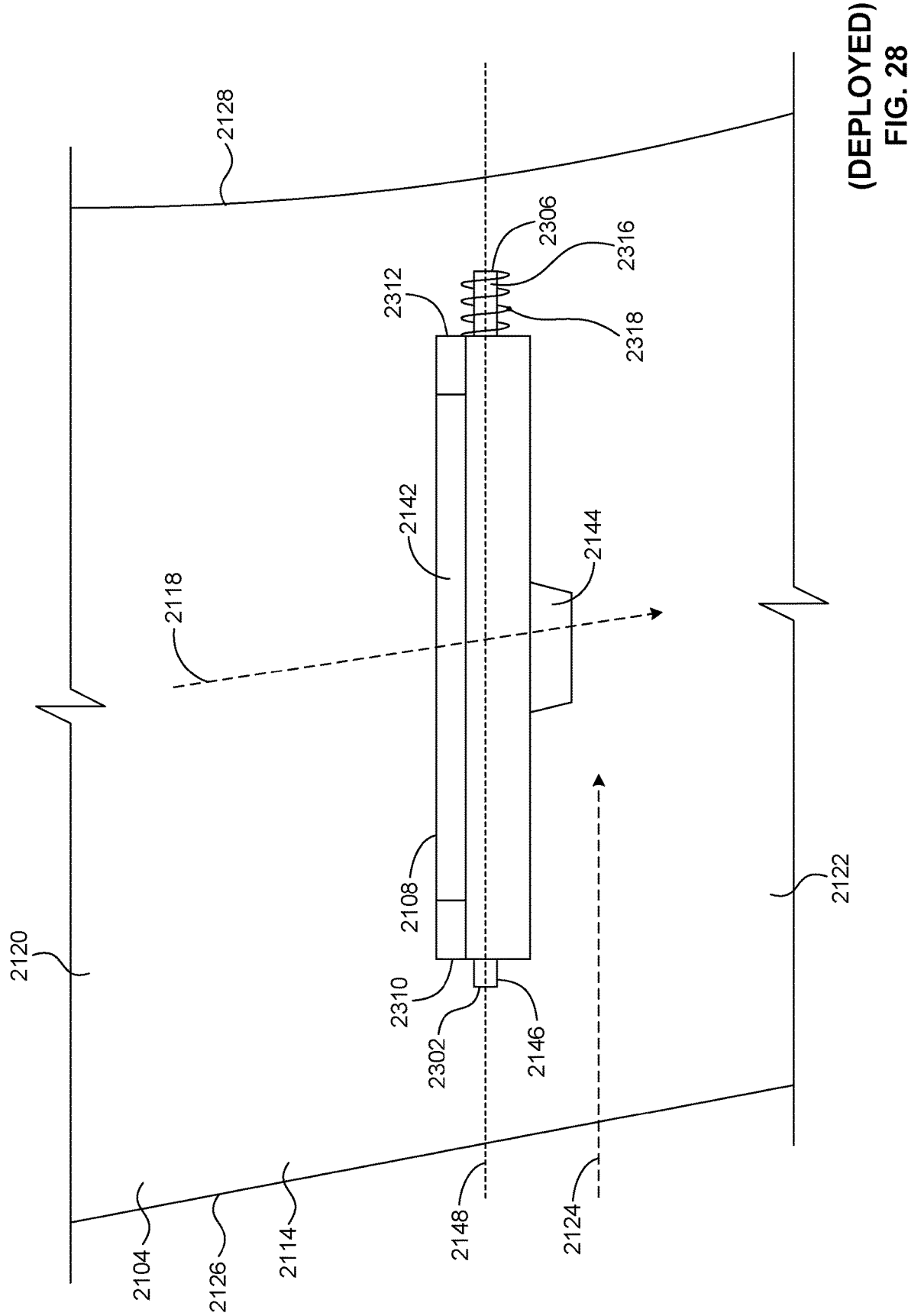
FIG. 28 is a plan view of the first example fence of FIGS. 21-27 in the example deployed position of FIGS. 22, 26 and 27.

FIGS. 23-28 provide additional views of the first example fence 2108 of FIGS. 21 and 22 rotatably coupled to the first example wing 2104 of FIGS. 21 and 22. More specifically, FIG. 23 is a cross-sectional view of the first example fence 2108 of FIGS. 21 and 22 looking inboard and taken across the example central axis 2148 of the example axle 2146, with the first fence 2108 in the example stowed position of FIG. 21. FIG. 14 is a frontal view of the first example fence 2108 of FIGS. 21-23 looking rearward along the example central axis 2148 of the example axle 2146, with the first fence 2108 in the example stowed position of FIGS. 21 and 23. FIG. 25 is a plan view of the first example fence 2108 of FIGS. 21-24 in the example stowed position of FIGS. 21, 23 and 24. FIG. 26 is a cross-sectional view of the first example fence 2108 of FIGS. 21-25 looking inboard and taken across the example central axis 2148 of the example axle 2146, with the first fence 2108 in the example deployed position of FIG. 22. FIG. 27 is a frontal view of the first example fence 2108 of FIGS. 21-26 looking rearward along the example central axis 2148 of the example axle 2146, with the first fence 2108 in the example deployed position of FIGS. 22 and 26. FIG. 28 is a plan view of the first example fence 2108 of FIGS. 21-27 in the example deployed position of FIGS. 22, 26 and 27.

In the illustrated example of FIGS. 23-28, the first fence 2108 is rotatably coupled to the first wing 2104 via the axle 2146. The axle 2146 includes a first example end 2302 coupled to the first wing 2104 via a first example axle mount 2304, and further includes a second example end 2306 located opposite the first end 2302 and coupled to the first wing 2104 via a second example axle mount 2308. The first end 2302 of the axle 2146 is positioned toward the leading edge 2126 of the first wing 2104 and/or toward the first axle mount 2304, and the second end 2306 of the axle 2146 is positioned toward the trailing edge 2128 of the first wing 2104 and/or toward the second axle mount 2308.

The first fence 2108 includes a first example end 2310, a second example end 2312 located opposite the first end 2310, and an example through hole 2314 extending between the first end 2310 and the second end 2312 of the first fence 2108. The first end 2310 of the first fence 2108 is positioned toward the leading edge 2126 of the first wing 2104 and/or toward the first axle mount 2304, and the second end 2312 of the first fence 2108 is positioned toward the trailing edge 2128 of the first wing 2104 and/or toward the second axle mount 2308. The axle 2146 passes and/or extends through the through hole 2314 of the first fence 2108 such that the axle 2146 and the through hole 2314 are parallel and/or coaxially located, and such that the first fence 2108 is secured to the axle 2146 via the first axle mount 2304 and the second axle mount 2308. The first axle mount 2304 and the second axle mount 2308 accordingly secure both the axle 2146 and the first fence 2108 to the first wing 2104. The first fence 2108 is rotatable about the axle 2146, and is also rotatable relative to the first wing 2104. For example, the first fence 2108 is rotatable about the axle 2146 relative to the first wing 2104 between the stowed position shown in FIGS. 21 and 23-25 and the deployed position shown in FIGS. 22 and 26-28.

In the illustrated example of FIGS. 23-28, the panel 2142 of the first fence 2108 extends in an inboard direction (e.g., toward the longitudinal axis 2112 of the aircraft 2100) along the skin 2114 of the first wing 2104 when the first fence 2108 is in the stowed position shown in FIGS. 23-25. As shown in FIGS. 23-25, the panel 2142 of the first fence 2108 extends along and is positioned over and/or on top of the skin 2114 of the first wing 2104 when the first fence 2108 is in the stowed position. In other examples, the panel 2142 of the first fence 2108 can extend along and be recessed (e.g., fully or partially recessed) relative to the skin 2114 of the first wing 2104 when the first fence 2108 is in the stowed position. As shown in FIGS. 26-28, the panel 2142 of the first fence 2108 extends at an upward angle (e.g., vertically) away from the skin 2114 of the first wing 2104 when the first fence 2108 is in the deployed position. The panel 2142 of the first fence 2108 is configured to impact the airflow around the aircraft 2100 when the first fence 2108 is in the deployed position shown in FIGS. 26-28. For example, the panel 2142 can impede a spanwise airflow occurring along the spanwise direction 2118 of the first wing 2104 when the first fence 2108 is in the deployed position shown in FIGS. 26-28. As another example, the panel 2142 can initiate and/or generate a vortex along the first wing 2104 when the first fence 2108 is in the deployed position shown in FIGS. 26-28.

In the illustrated example of FIGS. 23-28, the panel 2142 of the first fence 2108 is planar. In other examples, the panel 2142 of the first fence 2108 can be non-planar. For example, the panel 2142 of the first fence 2108 can have a non-planar (e.g., curved) aerodynamic shape. In some examples, the non-planar aerodynamic shape can be configured to match and/or mimic a non-planar (e.g., curved) aerodynamic shape of the first wing 2104. In the illustrated example of FIGS. 23-28, the panel 2142 of the first fence 2108 has a trapezoidal shape between the first end 2310 of the first fence 2108 and the second end 2312 of the first fence 2108. In other examples, the panel 2142 of the first fence 2108 can have a different (e.g., non-trapezoidal) shape between the first end 2310 of the first fence 2108 and the second end 2312 of the first fence 2108. For example, the panel 2142 of the first fence 2108 can have any of a rectangular shape, a square shape, a triangular shape, a semicircular shape, a circular shape, or an elliptical shape, among others, between the first end 2310 of the first fence 2108 and the second end 2312 of the first fence 2108.

In the illustrated example of FIGS. 23-28, the deployment vane 2144 of the first fence 2108 extends in an outboard direction (e.g., away from the longitudinal axis 2112 of the aircraft 2100) along the skin 2114 of the first wing 2104 when the first fence 2108 is in the deployed position shown in FIGS. 26-28. As shown in FIGS. 26-28, the deployment vane 2144 of the first fence 2108 extends along and is positioned over and/or on top of the skin 2114 of the first wing 2104 when the first fence 2108 is in the deployed position. In other examples, the deployment vane 2144 of the first fence 2108 can extend along and be recessed (e.g., fully or partially recessed) relative to the skin 2114 of the first wing 2104 when the first fence 2108 is in the deployed position. As shown in FIGS. 23-25, the deployment vane 2144 of the first fence 2108 extends at an upward angle (e.g., vertically) away from the skin 2114 of the first wing 2104 when the first fence 2108 is in the stowed position. The deployment vane 2144 of the first fence 2108 is configured to catch, receive, and/or react to a spanwise airflow that may occur along the spanwise direction 2118 of the first wing 2104 when the first fence 2108 is in the stowed position shown in FIGS. 23-25.

In the illustrated example of FIGS. 23-28, the deployment vane 2144 of the first fence 2108 is planar. In other examples, the deployment vane 2144 of the first fence 2108 can be non-planar. For example, the deployment vane 2144 of the first fence 2108 can have a non-planar (e.g., curved) aerodynamic shape. In some examples, the non-planar aerodynamic shape can be configured to match and/or mimic a non-planar (e.g., curved) aerodynamic shape of the first wing 2104. In the illustrated example of FIGS. 23-28, the deployment vane 2144 of the first fence 2108 has a trapezoidal shape between the first end 2310 of the first fence 2108 and the second end 2312 of the first fence 2108. In other examples, the deployment vane 2144 of the first fence 2108 can have a different (e.g., non-trapezoidal) shape between the first end 2310 of the first fence 2108 and the second end 2312 of the first fence 2108. For example, the deployment vane 2144 of the first fence 2108 can have any of a rectangular shape, a square shape, a triangular shape, a semicircular shape, a circular shape, or an elliptical shape, among others, between the first end 2310 of the first fence 2108 and the second end 2312 of the first fence 2108. In the illustrated example of FIGS. 23-28, the size of the deployment vane 2144 of the first fence 2108 is smaller than the size of the panel 2142 of the first fence 2108. In other examples, the deployment vane 2144 of the first fence 2108 can have a size that is less than or equal to the size of the panel 2142 of the first fence 2108.

In the illustrated example of FIGS. 23-28, an example spring-loaded axle 2316 is formed via the axle 2146 and an example spring 2318 coiled around a portion of the axle 2146. As further described below, the spring 2318 and/or, more generally, the spring-loaded axle 2316 function(s) and/or operate(s) as an actuator configured to move the first fence 2108 between the stowed position shown in FIGS. 23-25 and the deployed position shown in FIGS. 26-28, dependent upon the direction and/or strength of airflows caught by and/or received at the deployment vane 2144 of the first fence 2108. In the illustrated example of FIGS. 23-28, the spring 2318 of the spring-loaded axle 2316 is located between the second end 2312 of the first fence 2108 and the second axle mount 2308. The spring 2318 and/or, more generally, the spring-loaded axle 2316 is/are operatively coupled to the first fence 2108 such that the spring 2318 and/or the spring-loaded axle 2316 bias(es) the first fence 2108 to the stowed position shown in FIGS. 23-25. For example, the spring 2318 of the spring-loaded axle 2316 generates a restoring force (e.g., a biasing force) having a restoring force value. In the absence of a deflecting force (e.g., a counter-biasing force, as may be generated via a spanwise airflow) opposing the restoring force and having a deflecting force value that is greater than the restoring force value, the restoring force generated via the spring 2318 moves (e.g., rotates) the first fence 2108 to, and/or maintains the first fence 2108 in, the stowed position shown in FIGS. 23-25.

In the illustrated example of FIGS. 23-28, the spring 2318 is in a relatively more wound state when the first fence 2108 is in the deployed position shown in FIGS. 26-28 compared to when the first fence 2108 is in the stowed position shown in FIGS. 23-25. Conversely, the spring 2318 is in a relatively more unwound state when the first fence 2108 is in the stowed position shown in FIGS. 23-25 compared to when the first fence 2108 is in the deployed position shown in FIGS. 26-28. Stated differently, the spring 2318 winds around the spring-loaded axle 2316 as the first fence 2108 moves from the stowed position shown in FIGS. 23-25 to the deployed position shown in FIGS. 26-28, and the spring 2318 conversely unwinds around the spring-loaded axle 2316 as the first fence 2108 moves from the deployed position shown in FIGS. 26-28 to the stowed position shown in FIGS. 23-25. In the illustrated example of FIGS. 23-28, the spring 2318 is implemented via one or more torsion spring(s). In other examples, the spring 2318 may additionally or alternatively be implemented via one or more (e.g., individually or in combination) suitably arranged leaf spring(s), compression spring(s), and/or tension spring(s).

Movement (e.g., rotation) of the first fence 2108 relative to the first wing 2104 is airflow dependent. For example, as described above in connection with FIGS. 21 and 22 and further shown in FIGS. 23-28, the central axis 2148 of the axle 2146 is parallel to the chordwise direction 2124 of the first wing 2104. Positioning and/or orienting the central axis 2148 of the axle 2146 in this manner causes the panel 2142 and the deployment vane 2144 of the first fence 2108 to be positioned and/or oriented in a similar manner. The deployment vane 2144 of the first fence 2108 is orthogonal relative to the panel 2142 of the first fence 2108. When the first fence 2108 is in the stowed position shown in FIGS. 23-25 (e.g., as may be caused by the restoring force generated by the spring 2318 of the spring-loaded axle 2316), the deployment vane 2144 of the first fence 2108 is positioned to catch, receive and/or react to a spanwise airflow occurring along the spanwise direction 2118 of the first wing 2104. The spanwise airflow occurring along the spanwise direction 2118 of the first wing 2104 carries a deflecting force component that counteracts (e.g., opposes) the restoring force generated by the spring 2318 of the spring-loaded axle 2316.

If the deflecting force component of the spanwise airflow received at, applied to, and/or exerted on the deployment vane 2144 of the first fence 2108 is greater than the restoring force generated by the spring 2318 of the spring-loaded axle 2316, the spanwise airflow moves the first fence 2108 from the stowed position shown in FIGS. 23-25 to the deployed position shown in FIGS. 26-28. If the deflecting force component of the spanwise airflow received at, applied to, and/or exerted on the deployment vane 2144 of the first fence 2108 is instead less than the restoring force generated by the spring 2318 of the spring-loaded axle 2316, the spring 2318 maintains the first fence 2108 in the stowed position shown in FIGS. 23-25, and/or moves the first fence 2108 from the deployed position shown in FIGS. 26-28 to the stowed position shown in FIGS. 23-25. Movement of the first fence 2108 relative to the first wing 2104 is accordingly dependent on the presence or absence of the spanwise airflow, and on the relative strength (e.g., force) of such airflow.

While FIGS. 23-28 and the descriptions thereof provided above are directed to the actuator of the first fence 2108 being implemented as a spring-loaded axle (e.g., spring-loaded axle 2316) configured to bias and/or move the first fence 2108 from the deployed position shown in FIGS. 26-28 to the stowed position shown in FIGS. 23-25. The actuator of the first fence 2108 can be implemented in other forms including, for example, electrical, hydraulic, pneumatic, motor-driven, and/or shape memory alloy actuators. Furthermore, while FIGS. 23-28 and the descriptions thereof provided above are directed to the first fence 2108 of FIGS. 21 and 22 that is rotatably coupled to the first wing 2104 of FIGS. 21 and 22, the informed reader will recognize that the second fence 2110 of FIGS. 21 and 22 that is rotatably coupled to the second wing 2106 of FIGS. 21 and 22 can be similarly implemented (e.g., in a manner that is mirrored about the longitudinal axis 2112 of the aircraft 2100). Moreover, while FIGS. 23-28 and the descriptions thereof provided above are directed to the first fence 2108 of FIGS. 21 and 22 that is rotatably coupled to the first wing 2104 of FIGS. 21 and 22, the informed reader will recognize that any number of additional fences can be similarly implemented on the first wing 2104.

Figure 29:
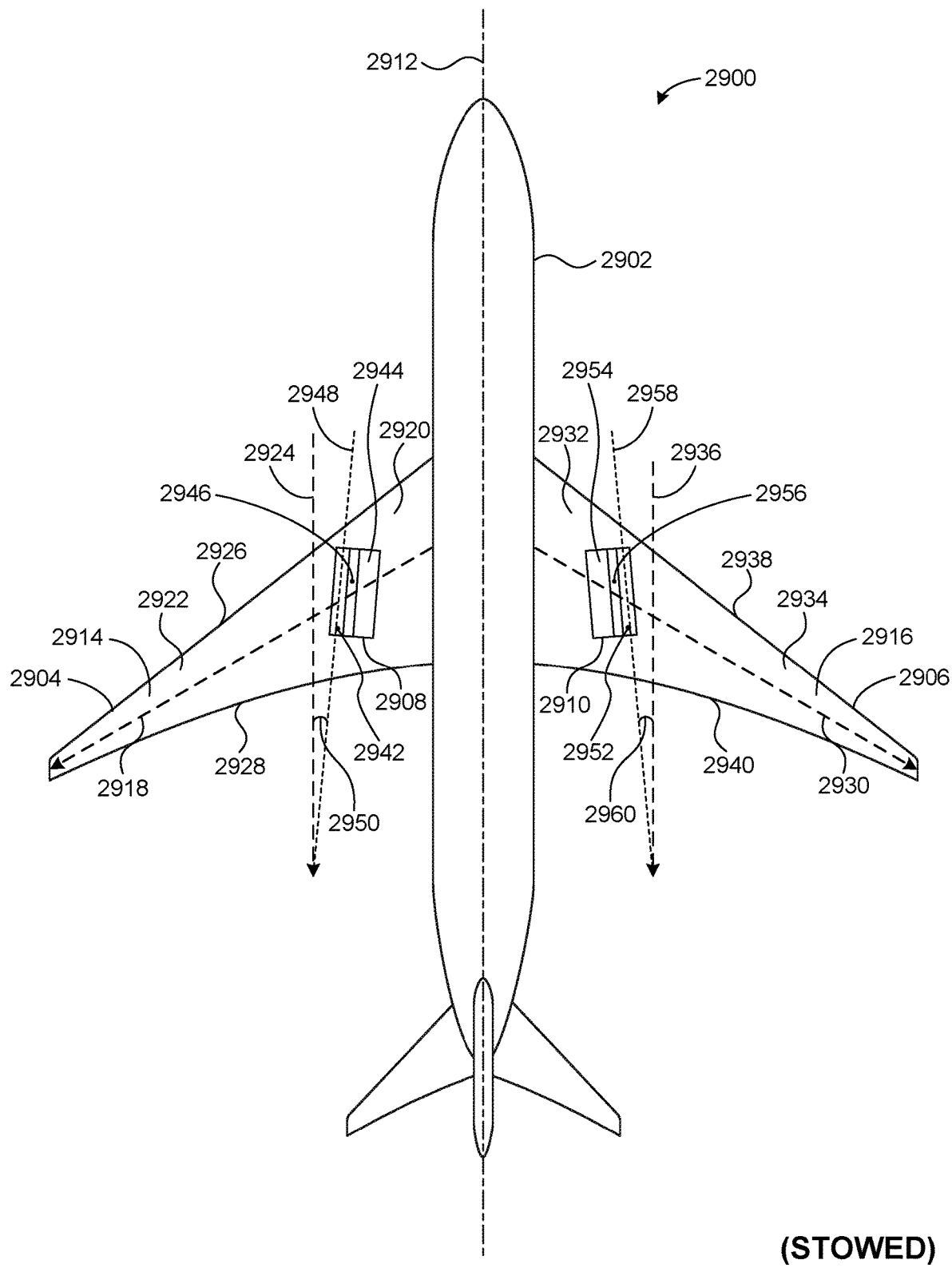
FIG. 29 illustrates another example aircraft in which example airflow-dependent deployable fences can be implemented in accordance with teachings of this disclosure.
Figure 30:
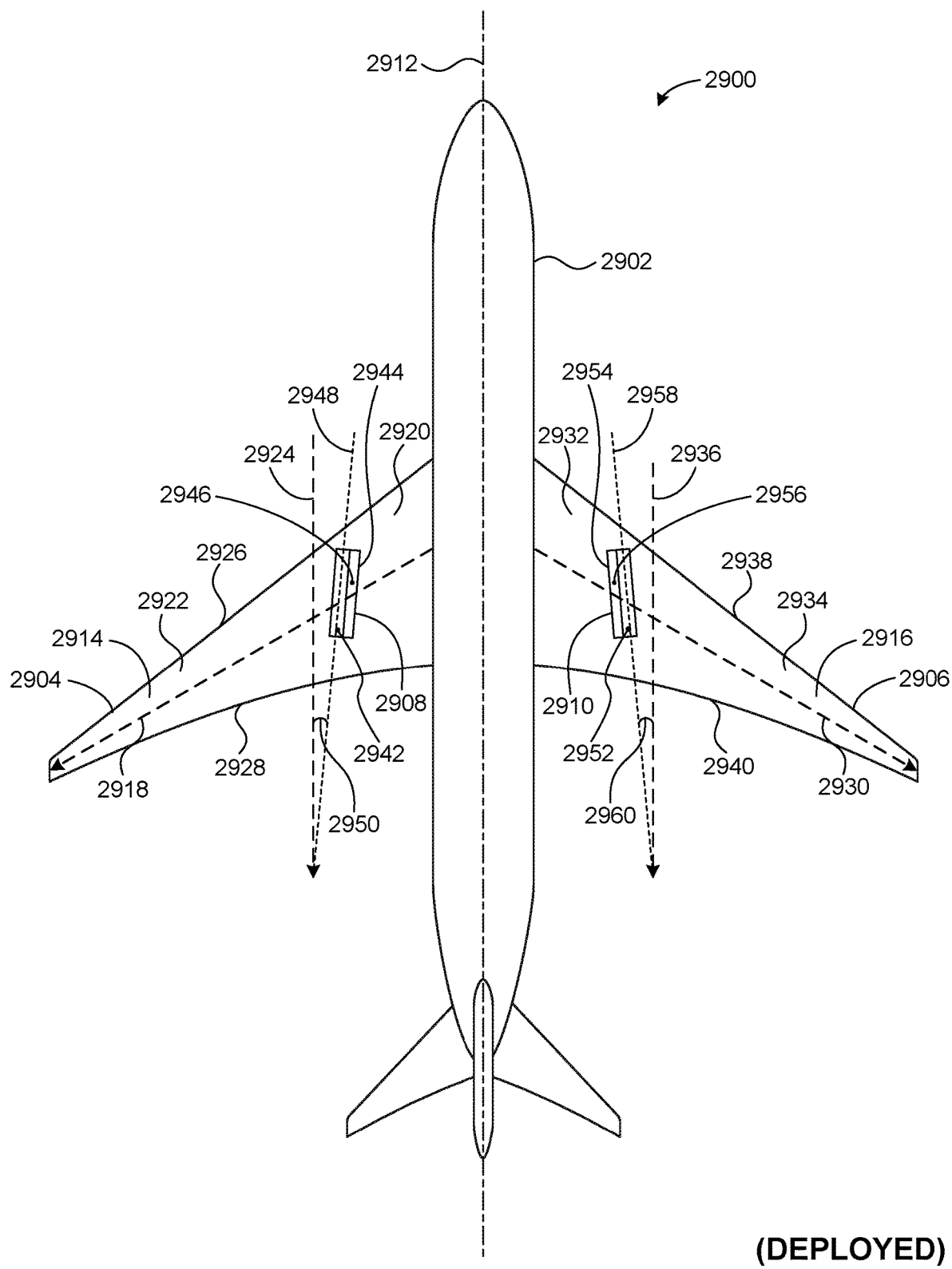
FIG. 30 illustrates the example aircraft of FIG. 29 with the example airflow-dependent deployable fences of FIG. 29 deployed.

In some examples, two or more of the above-described components (e.g., the first fence 108, the axle 144, the first axle mount 304, the second axle mount 308, and/or the spring 318 of FIGS. 1-10, the first fence 1108, the axle 1144, the first axle mount 1304, the second axle mount 1308, and/or the spring 1318 of FIGS. 11-20, the first fence 2108, the axle 2146, the first axle mount 2304, the second axle mount 2308, and/or the spring 2318 of FIGS. 21-28, etc.) may be manufactured or fabricated as a single piece, formed of an elastic material such as a carbon fiber composite or a 3D-printed plastic, and structured or configured to create an elastic restoring force. For example, FIG. 29 illustrates another example aircraft 2900 in which example airflow-dependent deployable fences can be implemented in accordance with teachings of this disclosure. FIG. 29 illustrates the example aircraft 2900 of FIG. 29 with the example airflow-dependent deployable fences of FIG. 29 stowed. FIG. 30 illustrates the example aircraft 2900 of FIG. 29 with the example airflow-dependent deployable fences of FIG. 29 deployed. The aircraft 2900 can be any form and/or type of aircraft including, for example, a civil (e.g., business or commercial) aircraft, a military aircraft, a manned (e.g., piloted) aircraft, an unmanned aircraft (e.g., a drone), etc. In the illustrated example of FIGS. 29 and 30, the aircraft 2900 includes an example fuselage 2902, a first example wing 2904 (e.g., a left-side wing), a second example wing 2906 (e.g., a right-side wing), a first example fence 2908 (e.g., a left-side fence), and a second example fence 2910 (e.g., a right-side fence). Although the illustrated example of FIGS. 29 and 30 depicts only a single fence located on each wing of the aircraft 2900 (e.g., the first fence 2908 located on the first wing 2904, and the second fence 2910 located on the second wing 2906), other example implementations can include multiple (e.g., 2, 3, 4, etc.) fences located on each wing of the aircraft 2900. In some examples, the location(s), size(s), and/or shape(s) of respective ones of the fences (e.g., the first fence 2908 and the second fence 2910) of the aircraft 2900 can differ relative to the location(s), size(s) and/or shape(s) of the fences shown in FIGS. 29 and 30.

The fuselage 2902 of FIGS. 29 and 30 has a generally cylindrical shape that defines an example longitudinal axis 2912 of the aircraft 2900. The first wing 2904 and the second wing 2906 of FIGS. 29 and 30 are respectively coupled to the fuselage 2902 and swept in a rearward direction of the aircraft 2900. The first wing 2904 includes an example skin 2914 forming (e.g., forming all or part of) an outer surface of the first wing 2904, and the second wing 2906 includes an example skin 2916 forming (e.g., forming all or part of) an outer surface of the second wing 2906.

The first wing 2904 of FIGS. 29 and 30 defines an example spanwise direction 2918 moving from an example inboard portion 2920 (e.g., inboard relative to the spanwise location of the first fence 2908) of the first wing 2904 toward an example outboard portion 2922 (e.g., outboard relative to the spanwise location of the first fence 2908) of the first wing 2904. The spanwise direction 2918 defined by the first wing 2904 is representative of a direction of a spanwise airflow that may occur along the first wing 2904. The first wing 2904 also defines an example chordwise direction 2924 moving from an example leading edge 2926 of the first wing 2904 toward an example trailing edge 2928 of the first wing 2904. The chordwise direction 2924 defined by the first wing 2904 is representative of a direction of a chordwise airflow (e.g., a cruise airflow) that may occur along the first wing 2904.

The second wing 2906 of FIGS. 29 and 30 defines an example spanwise direction 2930 moving from an example inboard portion 2932 (e.g., inboard relative to the spanwise location of the second fence 2910) of the second wing 2906 toward an example outboard portion 2934 (e.g., outboard relative to the spanwise location of the second fence 2910) of the second wing 2906. The spanwise direction 2930 defined by the second wing 2906 is representative of a direction of a spanwise airflow that may occur along the second wing 2906. The second wing 2906 also defines an example chordwise direction 2936 moving from an example leading edge 2938 of the second wing 2906 toward an example trailing edge 2940 of the second wing 2906. The chordwise direction 2936 defined by the second wing 2906 is representative of a direction of a chordwise airflow (e.g., a cruise airflow) that may occur along the second wing 2906.

The first fence 2908 of FIGS. 29 and 30 includes an example base 2942, an example panel 2944, and an example living hinge 2946 extending between the base 2942 and the panel 2944. The base 2942 of the first fence 2908 is coupled (e.g., fixedly or non-movably coupled) to the first wing 2904 of the aircraft 2900. The base 2942 has an example central axis 2948. In the illustrated example of FIGS. 29 and 30, the central axis 2948 of the base 2942 is canted (e.g., oriented at an angle) relative to the chordwise direction 2924 of the first wing 2904. For example, as shown in FIGS. 29 and 30, the central axis 2948 of the base 2942 is canted at an example toe-in angle 2950 relative to the chordwise direction 2924 of the first wing 2904 such that a first end of the base 2942 positioned toward the leading edge 2926 of the first wing 2904 is located closer to the longitudinal axis 2912 of the aircraft 2900 than is a second end of the base 2942 positioned toward the trailing edge 2928 of the first wing 2904. The example toe-in angle 2950 shown in FIGS. 29 and 30 is exaggerated for clarity. When implemented, the toe-in angle 2950 preferably has a value ranging from one to fifteen degrees.

The panel 2944 of the first fence 2908 is coupled to the base 2942 of the first fence 2908 via the living hinge 2946 of the first fence 2908 such that the panel 2944 is movable (e.g., rotatable) relative to the base 2942 and/or relative to the first wing 2904 between the stowed position shown in FIG. 29 and the deployed position shown in FIG. 30. The panel 2944 of the first fence 2908 extends (e.g., in an inboard direction toward the longitudinal axis 2912) along the skin 2914 of the first wing 2904 when the first fence 2908 is in the stowed position shown in FIG. 29. In some examples, the panel 2944 of the first fence 2908 extends along and is positioned over and/or on top of the skin 2914 of the first wing 2904 when the first fence 2908 is in the stowed position shown in FIG. 29. In other examples, the panel 2944 of the first fence 2908 extends along and is recessed (e.g., fully or partially recessed) relative to the skin 2914 of the first wing 2904 when the first fence 2908 is in the stowed position shown in FIG. 29.

The panel 2944 of the first fence 2908 extends at an upward angle (e.g., vertically) away from the skin 2914 of the first wing 2904 when the first fence 2908 is in the deployed position shown in FIG. 30. The panel 2944 of the first fence 2908 is configured to impact the airflow around the aircraft 2900 when the first fence 2908 is in the deployed position shown in FIG. 30. For example, the panel 2944 can impede a spanwise airflow occurring along the spanwise direction 2918 of the first wing 2904 when the first fence 2908 is in the deployed position shown in FIG. 30. As another example, the panel 2944 can initiate and/or generate a vortex along the first wing 2904 when the first fence 2908 is in the deployed position shown in FIG. 30.

The living hinge 2946 of the first fence 2908 extends between the base 2942 of the first fence 2908 and the panel 2944 of the first fence 2908. In some examples, the living hinge 2946 has a thickness that is less than a thickness of the base 2942, and/or less than a thickness of the panel 2944. The living hinge 2946 of the first fence 2908 is flexible, and enables and/or causes the panel 2944 of the first fence 2908 of FIGS. 29 and 30 to move between the stowed position shown in FIG. 29 and the deployed position shown in FIG. 30. In the illustrated example of FIGS. 29 and 30, the living hinge 2946 of the first fence 2908 biases the panel 2944 of the first fence 2908 to the deployed position shown in FIG. 30.

The panel 2944 of the first fence 2908 of FIGS. 29 and 30 is configured to move from the deployed position shown in FIG. 30 to the stowed position shown in FIG. 29 in response to an aerodynamic force exerted on the panel 2944 of the first fence 2908. In some examples, the aerodynamic force may be generated via a chordwise airflow (e.g., a cruise airflow) occurring along the chordwise direction 2924 of the first wing 2904. In some examples, the living hinge 2946 of the first fence 2908 biases and/or maintains the panel 2944 of the first fence 2908 in the deployed position shown in FIG. 30 in response to the aerodynamic force exerted on the panel 2944 of the first fence 2908 being less than a threshold force value (e.g., less than the biasing force generated by the living hinge 2946). In some disclosed examples, the panel 2944 of the first fence 2908 moves from the deployed position shown in FIG. 30 to the stowed position shown in FIG. 29 in response to the aerodynamic force exerted on the panel 2944 of the first fence 2908 being greater than the threshold force value (e.g., greater than the biasing force generated by the living hinge 2946).

In some disclosed examples, the panel 2944 of the first fence 2908 is configured to move from the deployed position shown in FIG. 30 to the stowed position shown in FIG. 29 during a cruise operation of the aircraft 2900 having a first speed, and the panel 2944 of the first fence 2908 is further configured to move from the stowed position shown in FIG. 29 to the deployed position shown in FIG. 30 during a reduced speed operation (e.g., a takeoff or landing operation) of the aircraft 2900 having a second speed less than the first speed.

The second fence 2910 of FIGS. 29 and 30 includes an example base 2952, an example panel 2954, and an example living hinge 2956 extending between the base 2952 and the panel 2954. The base 2952 of the second fence 2910 is coupled (e.g., fixedly or non-movably coupled) to the second wing 2906 of the aircraft 2900. The base 2952 has an example central axis 2958. In the illustrated example of FIGS. 29 and 30, the central axis 2958 of the base 2952 is canted (e.g., oriented at an angle) relative to the chordwise direction 2936 of the second wing 2906. For example, as shown in FIGS. 29 and 30, the central axis 2958 of the base 2952 is canted at an example toe-in angle 2960 relative to the chordwise direction 2936 of the second wing 2906 such that a first end of the base 2952 positioned toward the leading edge 2938 of the second wing 2906 is located closer to the longitudinal axis 2912 of the aircraft 2900 than is a second end of the base 2952 positioned toward the trailing edge 2940 of the second wing 2906. The example toe-in angle 2960 shown in FIGS. 29 and 30 is exaggerated for clarity. When implemented, the toe-in angle 2960 preferably has a value ranging from one to fifteen degrees.

The panel 2954 of the second fence 2910 is coupled to the base 2952 of the second fence 2910 via the living hinge 2956 of the second fence 2910 such that the panel 2954 is movable (e.g., rotatable) relative to the base 2952 and/or relative to the second wing 2906 between the stowed position shown in FIG. 29 and the deployed position shown in FIG. 30. The panel 2954 of the second fence 2910 extends (e.g., in an inboard direction toward the longitudinal axis 2912) along the skin 2916 of the second wing 2906 when the second fence 2910 is in the stowed position shown in FIG. 29. In some examples, the panel 2954 of the second fence 2910 extends along and is positioned over and/or on top of the skin 2916 of the second wing 2906 when the second fence 2910 is in the stowed position shown in FIG. 29. In other examples, the panel 2954 of the second fence 2910 extends along and is recessed (e.g., fully or partially recessed) relative to the skin 2916 of the second wing 2906 when the second fence 2910 is in the stowed position shown in FIG. 29.

The panel 2954 of the second fence 2910 extends at an upward angle (e.g., vertically) away from the skin 2916 of the second wing 2906 when the second fence 2910 is in the deployed position shown in FIG. 30. The panel 2954 of the second fence 2910 is configured to impact the airflow around the aircraft 2900 when the second fence 2910 is in the deployed position shown in FIG. 30. For example, the panel 2954 can impede a spanwise airflow occurring along the spanwise direction 2930 of the second wing 2906 when the second fence 2910 is in the deployed position shown in FIG. 30. As another example, the panel 2954 can initiate and/or generate a vortex along the second wing 2906 when the second fence 2910 is in the deployed position shown in FIG. 30.

The living hinge 2956 of the second fence 2910 extends between the base 2952 of the second fence 2910 and the panel 2954 of the second fence 2910. In some examples, the living hinge 2956 has a thickness that is less than a thickness of the base 2952, and/or less than a thickness of the panel 2954. The living hinge 2956 of the second fence 2910 is flexible, and enables and/or causes the panel 2954 of the second fence 2910 of FIGS. 29 and 30 to move between the stowed position shown in FIG. 29 and the deployed position shown in FIG. 30. In the illustrated example of FIGS. 29 and 30, the living hinge 2946 of the second fence 2910 biases the panel 2954 of the second fence 2910 to the deployed position shown in FIG. 30.

The panel 2954 of the second fence 2910 of FIGS. 29 and 30 is configured to move from the deployed position shown in FIG. 30 to the stowed position shown in FIG. 29 in response to an aerodynamic force exerted on the panel 2954 of the second fence 2910. In some examples, the aerodynamic force may be generated via a chordwise airflow (e.g., a cruise airflow) occurring along the chordwise direction 2936 of the second wing 2906. In some examples, the living hinge 2956 of the second fence 2910 biases and/or maintains the panel 2954 of the second fence 2910 in the deployed position shown in FIG. 30 in response to the aerodynamic force exerted on the panel 2954 of the second fence 2910 being less than a threshold force value (e.g., less than the biasing force generated by the living hinge 2956). In some disclosed examples, the panel 2954 of the second fence 2910 moves from the deployed position shown in FIG. 30 to the stowed position shown in FIG. 29 in response to the aerodynamic force exerted on the panel 2954 of the second fence 2910 being greater than the threshold force value (e.g., greater than the biasing force generated by the living hinge 2956).

In some disclosed examples, the panel 2954 of the second fence 2910 is configured to move from the deployed position shown in FIG. 30 to the stowed position shown in FIG. 29 during a cruise operation of the aircraft 2900 having a first speed, and the panel 2954 of the second fence 2910 is further configured to move from the stowed position shown in FIG. 29 to the deployed position shown in FIG. 30 during a reduced speed operation (e.g., a takeoff or landing operation) of the aircraft 2900 having a second speed less than the first speed.

Figure 31:
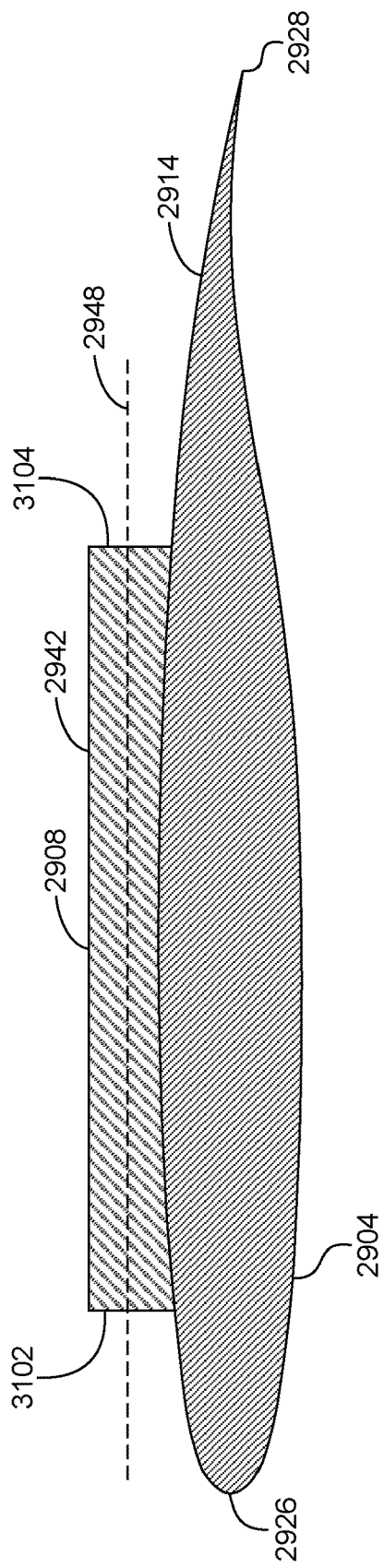
FIG. 31 is a cross-sectional view of the first example fence of FIGS. 29 and 30 looking inboard and taken across the example central axis of the example base, with the first fence in the example stowed position of FIG. 29.
Figure 32:
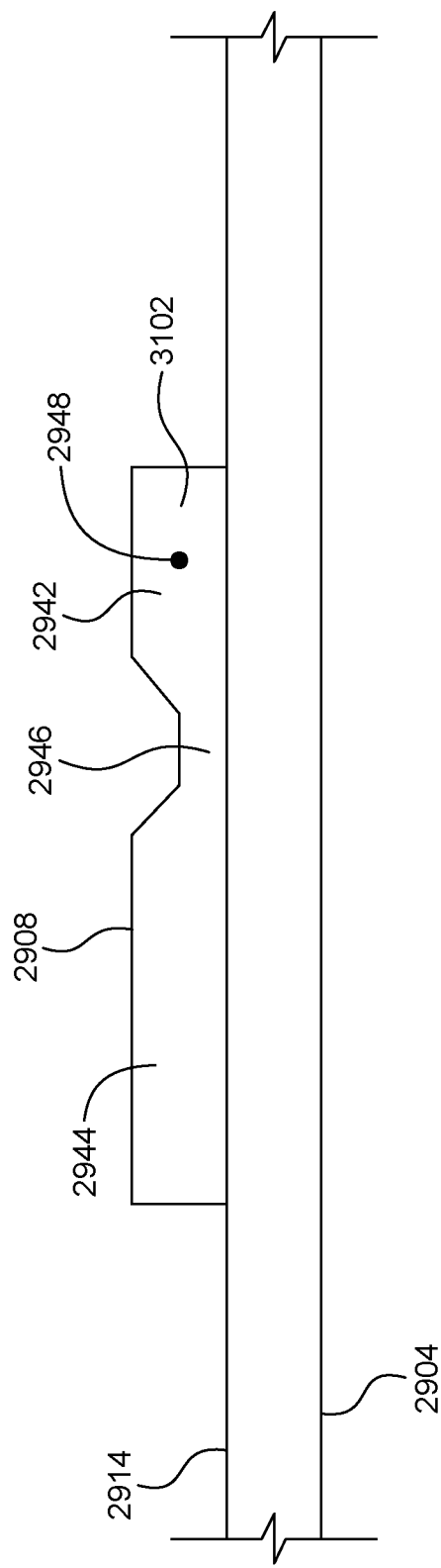
FIG. 32 is a frontal view of the first example fence of FIGS. 29-31 looking rearward along the example central axis of the example base, with the first fence in the example stowed position of FIGS. 29 and 31.
Figure 33:
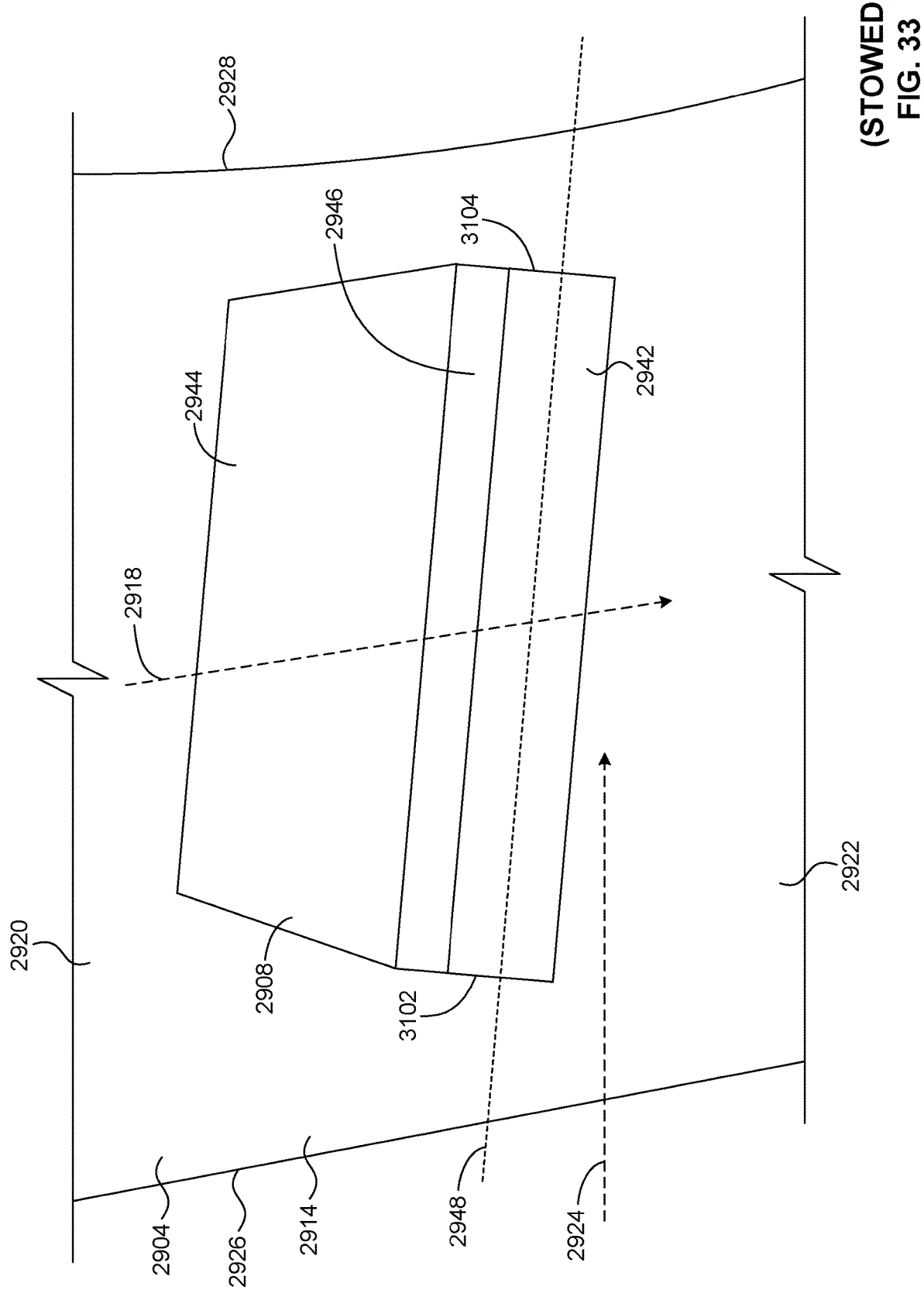
FIG. 33 is a plan view of the first example fence of FIGS. 29-32 in the example stowed position of FIGS. 29, 31 and 32.
Figure 34:
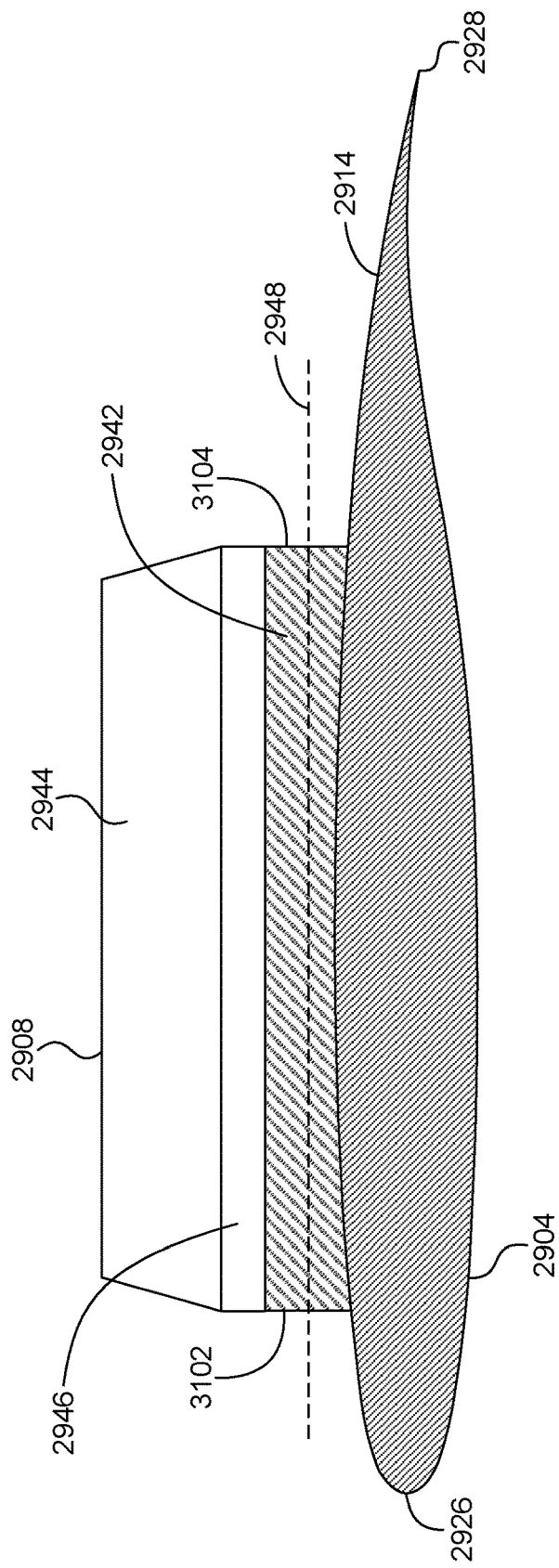
FIG. 34 is a cross-sectional view of the first example fence of FIGS. 29-33 looking inboard and taken across the example central axis of the example base, with the first fence in the example deployed position of FIG. 30.
Figure 35:
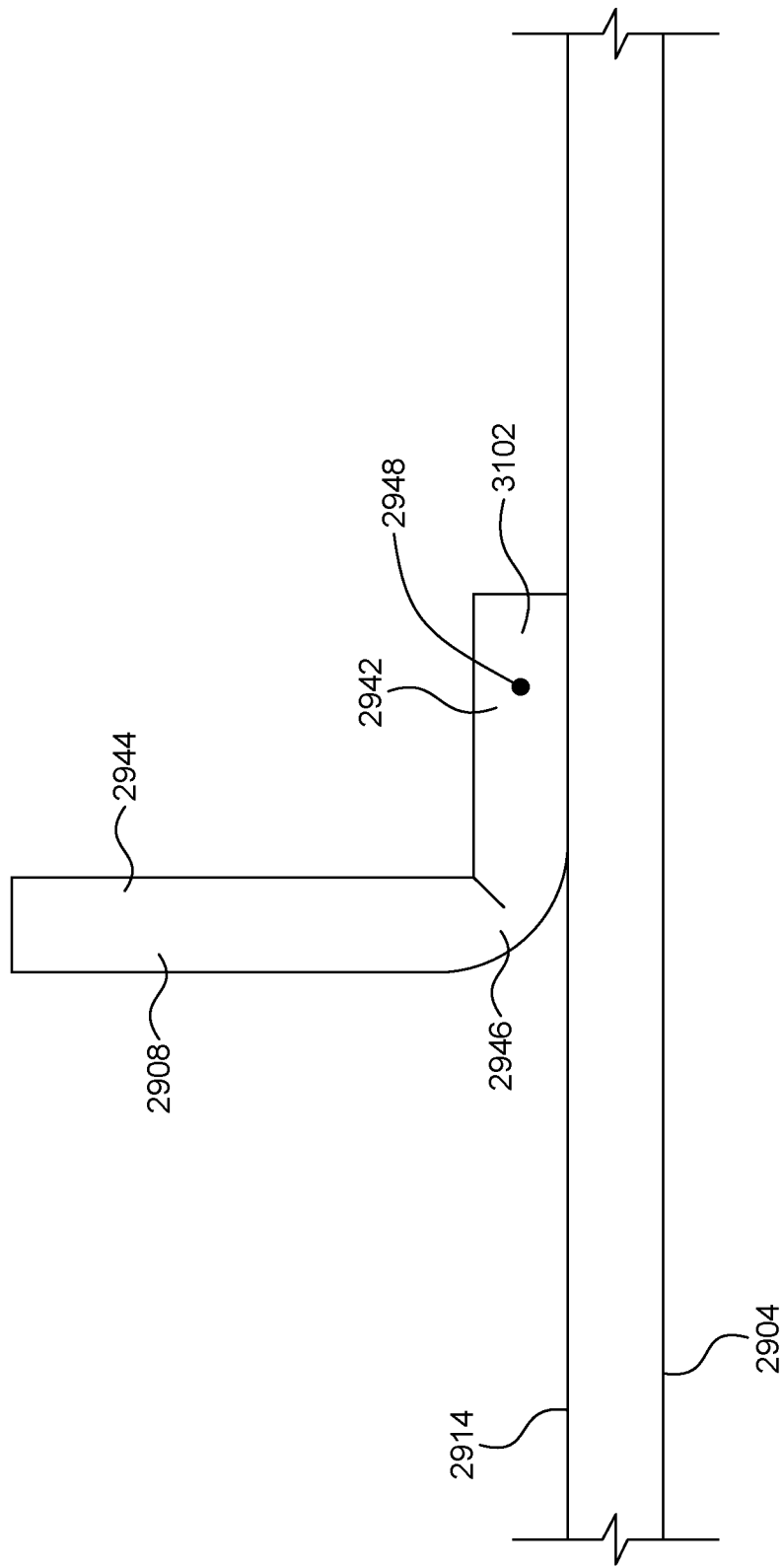
FIG. 35 is a frontal view of the first example fence of FIGS. 29-34 looking rearward along the example central axis of the example base, with the first fence in the example deployed position of FIGS. 30 and 34.
Figure 36:
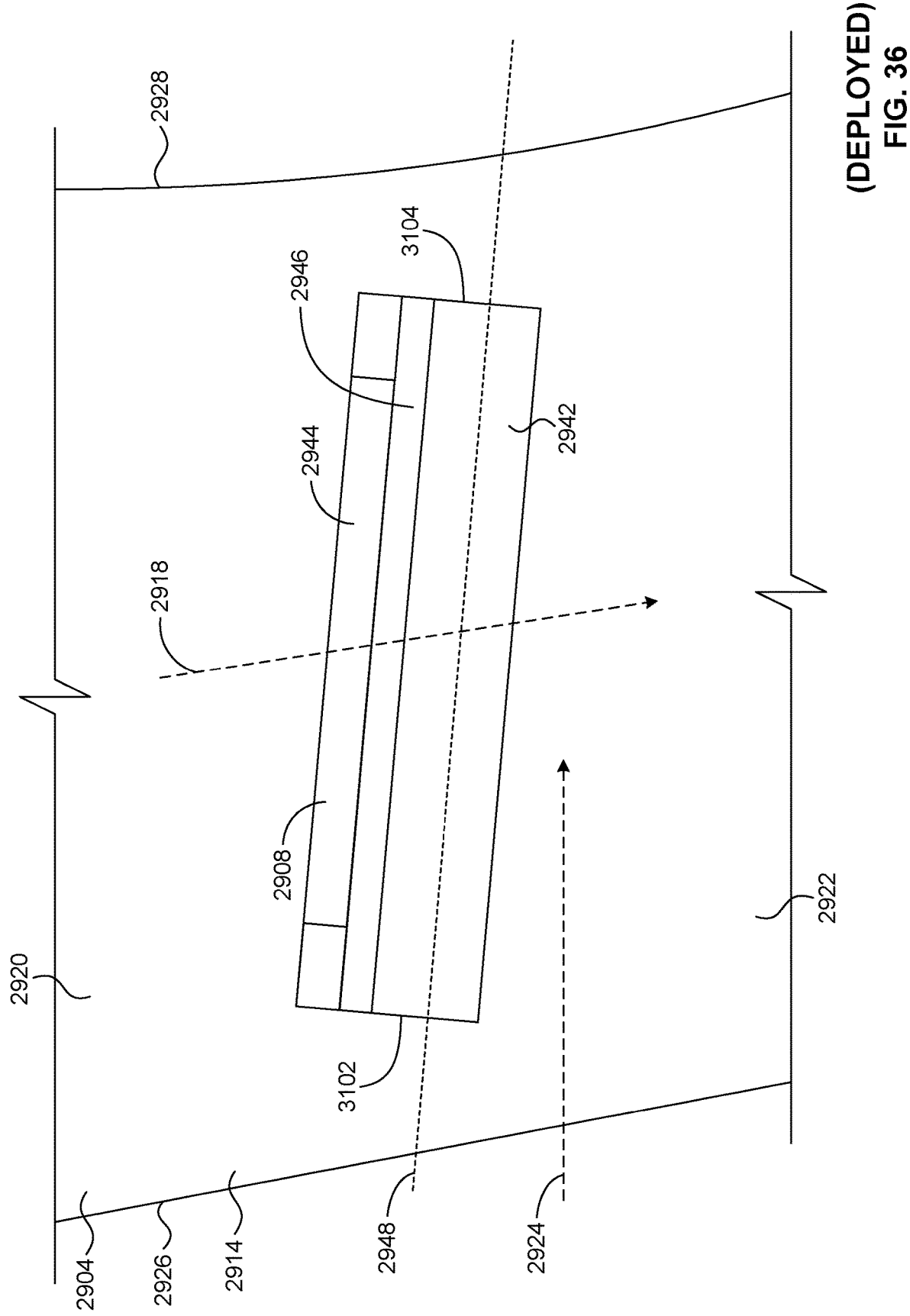
FIG. 36 is a plan view of the first example fence of FIGS. 29-35 in the example deployed position of FIGS. 30, 34 and 35.

FIGS. 31-36 provide additional views of the first example fence 2908 of FIGS. 29 and 30 coupled to the first example wing 2904 of FIGS. 29 and 30. More specifically, FIG. 31 is a cross-sectional view of the first example fence 2908 of FIGS. 29 and 30 looking inboard and taken across the example central axis 2948 of the example base 2942, with the first fence 2908 in the example stowed position of FIG. 29. FIG. 32 is a frontal view of the first example fence 2908 of FIGS. 29-31 looking rearward along the example central axis 2948 of the example base 2942, with the first fence 2908 in the example stowed position of FIGS. 29 and 31. FIG. 33 is a plan view of the first example fence 2908 of FIGS. 29-32 in the example stowed position of FIGS. 29, 31 and 32. FIG. 34 is a cross-sectional view of the first example fence 2908 of FIGS. 29-33 looking inboard and taken across the example central axis 2948 of the example base 2942, with the first fence 2908 in the example deployed position of FIG. 30. FIG. 35 is a frontal view of the first example fence 2908 of FIGS. 29-34 looking rearward along the example central axis 2948 of the example base 2942, with the first fence 2908 in the example deployed position of FIGS. 30 and 34. FIG. 36 is a plan view of the first example fence 2908 of FIGS. 29-35 in the example deployed position of FIGS. 30, 34 and 35.

In the illustrated example of FIGS. 31-36, the base 2942 of the first fence 2908 is coupled (e.g., fixedly or non-movably coupled) to the first wing 2904 of the aircraft 2900. For example, the base 2942 of the first fence 2908 can be coupled to the first wing 2904 via one or more fastener(s) that can include one or more mechanical fastener(s) (e.g., rivet(s), screw(s), bolt(s), pin(s), etc.) and/or one or more chemical fastener(s) (e.g., glue(s), epox(ies), bonding agent(s), etc.), and/or any combination thereof. The base 2942 of the first fence 2908 includes a first example end 3102, and further includes a second example end 3104 located opposite the first end 3102. The first end 3102 of the base 2942 is positioned toward the leading edge 2926 of the first wing 2904, and the second end 3104 of the base 2942 is positioned toward the trailing edge 2928 of the first wing 2904.

In the illustrated example of FIGS. 31-36, the panel 2944 of the first fence 2908 extends in an inboard direction (e.g., toward the longitudinal axis 2912 of the aircraft 2900) along the skin 2914 of the first wing 2904 when the first fence 2908 is in the stowed position shown in FIGS. 31-33. As shown in FIGS. 31-33, the panel 2944 of the first fence 2908 extends along and is positioned over and/or on top of the skin 2914 of the first wing 2904 when the first fence 2908 is in the stowed position. In other examples, the panel 2944 of the first fence 2908 can extend along and be recessed (e.g., fully or partially recessed) relative to the skin 2914 of the first wing 2904 when the first fence 2908 is in the stowed position. As shown in FIGS. 34-36, the panel 2944 of the first fence 2908 extends at an upward angle (e.g., vertically) away from the skin 2914 of the first wing 2904 when the first fence 2908 is in the deployed position. The panel 2944 of the first fence 2908 is configured to impact the airflow around the aircraft 2900 when the first fence 2908 is in the deployed position shown in FIGS. 34-36. For example, the panel 2944 can impede a spanwise airflow occurring along the spanwise direction 2918 of the first wing 2904 when the first fence 2908 is in the deployed position shown in FIGS. 34-36. As another example, the panel 2944 can initiate and/or generate a vortex along the first wing 2904 when the first fence 2908 is in the deployed position shown in FIGS. 34-36.

In the illustrated example of FIGS. 31-36, the panel 2944 of the first fence 2908 is planar. In other examples, the panel 2944 of the first fence 2908 can be non-planar. For example, the panel 2944 of the first fence 2908 can have a non-planar (e.g., curved) aerodynamic shape. In some examples, the non-planar aerodynamic shape can be configured to match and/or mimic a non-planar (e.g., curved) aerodynamic shape of the first wing 2904. In the illustrated example of FIGS. 31-36, the panel 2944 of the first fence 2908 has a trapezoidal shape between the first end 3102 of the base 2942 and the second end 3104 of the base 2942. In other examples, the panel 2944 of the first fence 2908 can have a different (e.g., non-trapezoidal) shape between the first end 3102 of the base 2942 and the second end 3104 of the base 2942. For example, the panel 2944 of the first fence 2908 can have any of a rectangular shape, a square shape, a triangular shape, a semicircular shape, a circular shape, or an elliptical shape, among others, between the first end 3102 of the base 2942 and the second end 3104 of the base 2942.

In the illustrated example of FIGS. 31-36, the living hinge 2946 of the first fence 2908 function(s) and/or operate(s) as an actuator configured to move the panel 2944 of the first fence 2908 between the stowed position shown in FIGS. 31-33 and the deployed position shown in FIGS. 34-36, dependent upon the direction and/or strength of airflows caught by and/or received at the panel 2944 of the first fence 2908. The living hinge 2946 of the first fence 2908 extends between the base 2942 of the first fence 2908 and the panel 2944 of the first fence 2908. As shown in FIGS. 32 and 35, the living hinge 2946 has a thickness that is less than a thickness of the base 2942, and less than a thickness of the panel 2944. The living hinge 2946 of the first fence 2908 is flexible, and enables and/or causes the panel 2944 of the first fence 2908 to move between the stowed position shown in FIGS. 31-33 and the deployed position shown in FIGS. 34-36.

In the illustrated example of FIGS. 31-36, the living hinge 2946 of the first fence 2908 biases the panel 2944 of the first fence 2908 to the deployed position shown in FIGS. 34-36. For example, the living hinge 2946 generates a restoring force (e.g., a biasing force) having a restoring force value. In the absence of a deflecting force (e.g., a counter-biasing force, as may be generated via a chordwise and/or cruise airflow) opposing the restoring force and having a deflecting force value that is greater than the restoring force value, the restoring force generated via the living hinge 2946 moves (e.g., rotates) the panel 2944 of the first fence 2908 to, and/or maintains the panel 2944 of the first fence 2908 in, the deployed position shown in FIGS. 34-36.

In the illustrated example of FIGS. 31-36, the living hinge 2946 is in a relatively less flexed and/or curved state when the panel 2944 of the first fence 2908 is in the stowed position shown in FIGS. 31-33 compared to when the panel 2944 of the first fence 2908 is in the deployed position shown in FIGS. 34-36. Conversely, the living hinge 2946 is in a relatively more flexed and/or curved state when the panel 2944 of the first fence 2908 is in the deployed position shown in FIGS. 34-36 compared to when the panel 2944 of the first fence 2908 is in the stowed position shown in FIGS. 31-33. Stated differently, the living hinge 2946 flexes, bends and/or curls away from the skin 2914 of the first wing 2904 as the panel 2944 of the first fence 2908 moves from the stowed position shown in FIGS. 31-33 to the deployed position shown in FIGS. 34-36, and the living hinge 2946 conversely unflexes, unbends and/or uncurls toward the skin 2914 of the first wing 2904 as the panel 2944 of the first fence 2908 moves from the deployed position shown in FIGS. 34-36 to the stowed position shown in FIGS. 31-33.

Movement (e.g., rotation) of the panel 2944 of the first fence 2908 relative to the base 2942 of the first fence 2908 via the living hinge 2946 of the first fence 2908 (e.g., which also results in movement of the panel 2944 relative to the first wing 2904) is airflow dependent. For example, as described above in connection with FIGS. 29 and 30 and further shown in FIGS. 31-360, the central axis 2948 of the base 2942 of the first fence 2908 is canted at the toe-in angle 2950 relative to the chordwise direction 2924 of the first wing 2904. Positioning and/or orienting the central axis 2948 of the base 2942 at the toe-in angle 2950 causes the panel 2944 of the first fence 2908 to be positioned and/or oriented in a similar manner. When the panel 2944 of the first fence 2908 is in the deployed position shown in FIGS. 34-36 (e.g., as may be caused by the restoring force generated by the living hinge 2946 of the first fence 2908), the panel 2944 of the first fence 2908 is positioned to catch, receive and/or react to a chordwise airflow (e.g., a cruise airflow) occurring along the chordwise direction 2924 of the first wing 2904. As a result of the toe-in angle 2950 at which the central axis 2948 of the base 2942 is canted, the chordwise airflow occurring along the chordwise direction 2924 of the first wing 2904 carries a deflecting force component that counteracts (e.g., opposes) the restoring force generated by the living hinge 2946 of the first fence 2908.

If the deflecting force component of the chordwise airflow received at, applied to, and/or exerted on the panel 2944 of the first fence 2908 is greater than the restoring force generated by the living hinge 2946 of the first fence 2908, the chordwise airflow moves the panel 2944 of the first fence 2908 from the deployed position shown in FIGS. 34-36 to the stowed position shown in FIGS. 31-33. If the deflecting force component of the chordwise airflow received at, applied to, and/or exerted on the panel 2944 of the first fence 2908 is instead less than the restoring force generated by the living hinge 2946 of the first fence 2908, the living hinge 2946 maintains the panel 2944 of the first fence 2908 in the deployed position shown in FIGS. 34-36, and/or moves the panel 2944 of the first fence 2908 from the stowed position shown in FIGS. 31-33 to the deployed position shown in FIGS. 34-36. Movement of the panel 2944 of the first fence 2908 relative to the base 2942 of the first fence 2908, and/or relative to the first wing 2904, is accordingly dependent on the presence or absence of the chordwise airflow, and on the relative strength (e.g., force) of such airflow.

In some examples, the panel 2944 of the first fence 2908 is configured to move from the deployed position shown in FIGS. 34-36 to the stowed position shown in FIGS. 31-33 during a cruise operation of the aircraft 2900 having a first speed, and the panel 2944 of the first fence 2908 is further configured to move from the stowed position of FIGS. 31-33 to the deployed position of FIGS. 34-36 during a reduced speed operation (e.g., a takeoff or landing operation) of the aircraft 2900 having a second speed less than the first speed. For example, the living hinge 2946 of the first fence 2908 may be configured and/or implemented to have a flexing, bending and/or curling moment that causes the living hinge 2946 to generate a restoring force sufficient to move the panel 2944 of the first fence 2908 to, and/or sufficient to maintain the panel 2944 of the first fence 2908 in, the deployed position shown in FIGS. 34-36 when the aircraft 2900 is traveling at a speed less than a speed threshold (e.g., less than a cruise speed). When the aircraft 2900 is traveling at a speed above or equal to the speed threshold, the restoring force generated by the living hinge 2946 of the first fence 2908 is overcome via a deflecting force, and the panel 2944 of the first fence 2908 accordingly moves from the deployed position shown in FIGS. 34-36 to the stowed position shown in FIGS. 31-33.

While FIGS. 31-36 and the descriptions thereof provided above are directed to the actuator of the first fence 2908 being implemented as a living hinge (e.g., living hinge 2946) configured to bias and/or move the panel 2944 of the first fence 2908 from the stowed position shown in FIGS. 31-33 to the deployed position shown in FIGS. 34-36, the actuator of the first fence 2908 can be implemented in other forms including, for example, electrical, hydraulic, pneumatic, motor-driven, and/or shape memory alloy actuators. Furthermore, while FIGS. 31-36 and the descriptions thereof provided above are directed to the first fence 2908 of FIGS. 29 and 30 that is coupled to the first wing 2904 of FIGS. 29 and 30, the informed reader will recognize that the second fence 2910 of FIGS. 29 and 30 that is coupled to the second wing 2906 of FIGS. 29 and 30 can be similarly implemented (e.g., in a manner that is mirrored about the longitudinal axis 2912 of the aircraft 2900). Moreover, while FIGS. 31-36 and the descriptions thereof provided above are directed to the first fence 2908 of FIGS. 29 and 30 that is coupled to the first wing 2904 of FIGS. 29 and 30, the informed reader will recognize that any number of additional fences can be similarly implemented on the first wing 2904. Moreover, while FIGS. 29-36 and the descriptions thereof provided above disclose the first fence 2908 of FIGS. 29-36 being implemented and/or configured in a manner that generally conforms and/or corresponds to the structures(s) and/or orientation(s) associated with the first fence 108 of FIGS. 1-10, the informed reader will further recognize that the first fence 2908 of FIGS. 29-36 can alternatively be implemented and/or configured in a manner that conforms and/or corresponds to the structure(s) and/or orientations(s) associated with the first fence 1108 of FIGS. 11-20, or the first fence 2108 of FIGS. 21-28.

Figure 37:
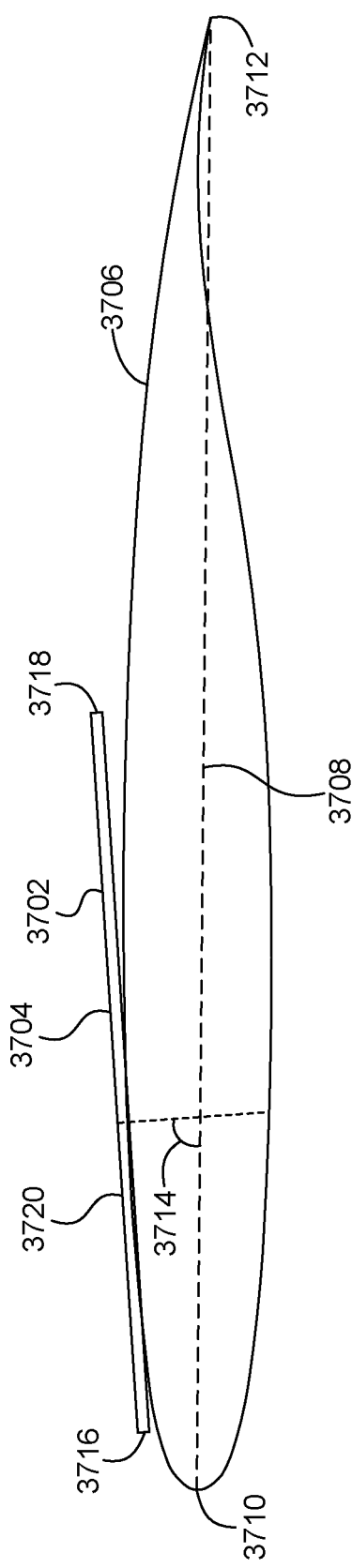
FIG. 37 is a cross-sectional view of an example fence having a single example planar panel positioned in an example stowed position relative to an example curved wing.

In some examples, implementing any of the above-described fences (e.g., the first fence 108 of FIGS. 1-10, the first fence 1108 of FIGS. 11-20, the first fence 2108 of FIGS. 21-28, the first fence 2908 of FIGS. 29-36, etc.) as a fence having a single, planar panel may in some instances become problematic with regard to stowing the fence along the skin of the wing of the aircraft, particularly when the wing is a curved wing having a substantial degree of curvature. For example, FIG. 37 is a cross-sectional view of an example fence 3702 having a single example planar panel 3704 positioned in an example stowed position relative to an example curved wing 3706. The curved wing 3706 has an example chord 3708 extending from an example leading edge 3710 of the curved wing 3706 to an example trailing edge 3712 of the curved wing 3706. The planar panel 3704 is oriented at an example angle 3714 relative to the chord 3708. The planar panel 3704 includes a first example end 3716 positioned toward the leading edge 3710 of the curved wing 3706, a second example end 3718 located opposite the first end 3716 and positioned toward the trailing edge 3712 of the curved wing 3706, and an example middle portion 3720 located between the first and second ends 3716, 3718 of the planar panel 3704.

As shown in FIG. 37, although the middle portion 3720 of the planar panel 3704 is adjacent the curved wing 3706 when the fence 3702 is in the stowed position, the curvature of the curved wing 3706 prevents the first and second ends 3716, 3718 of the planar panel 3704 from being adjacent the curved wing 3706. The illustrated spacing and/or separation between the first and second ends 3716, 3718 of the planar panel 3704 and the curved wing 3706 of FIG. 37 can result in undesirable aerodynamic performance penalties (e.g., drag) when the fence 3702 is in the stowed position. In some examples, such undesirable aerodynamic performance penalties can advantageously be reduced by alternatively implementing the fence 3702 of FIG. 37 as a fence having a plurality of planar panels.

Figure 38:
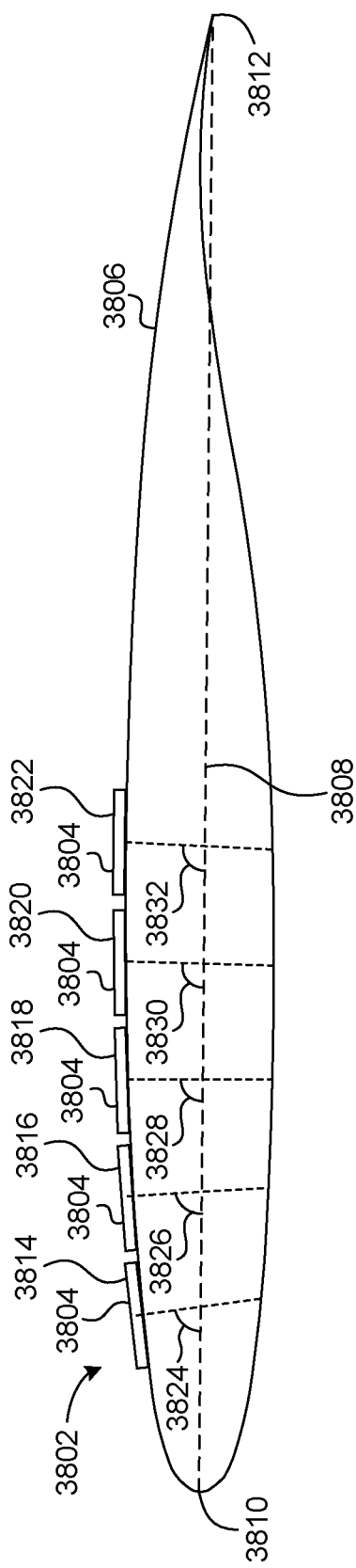
FIG. 38 is a cross-sectional view of an example fence having a plurality of example planar panels respectively positioned in corresponding example stowed positions relative to an example curved wing.

For example, FIG. 38 is a cross-sectional view of an example fence 3802 having a plurality of example planar panels 3804 respectively positioned in corresponding example stowed positions relative to an example curved wing 3806. The curved wing 3806 has an example chord 3808 extending from an example leading edge 3810 of the curved wing 3806 to an example trailing edge 3812 of the curved wing 3806. In the illustrated example of FIG. 38, the planar panels 3804 of the fence 3802 include a first example planar panel 3814, a second example planar panel 3816, a third example planar panel 3818, a fourth example planar panel 3820, and a fifth example planar panel 3822. In other examples, the fence 3802 can include a different number of planar panels (e.g., 2, 3, 4, 6, 8, 10, etc.).

The first planar panel 3814 of FIG. 38 is oriented at a first example angle 3824 relative to the chord 3808. The second planar panel 3816 of FIG. 38 is located aft of the first planar panel 3814 and is oriented at a second example angle 3826 relative to the chord 3808. The third planar panel 3818 of FIG. 38 is located aft of the second planar panel 3816 and is oriented at a third example angle 3828 relative to the chord 3808. The fourth planar panel 3820 of FIG. 38 is located aft of the third planar panel 3818 and is oriented at a fourth example angle 3830 relative to the chord 3808. The fifth planar panel 3822 of FIG. 38 is located aft of the fourth planar panel 3820 and is oriented at a fifth example angle 3832 relative to the chord 3808.

In the illustrated example of FIG. 38, some or all of the first, second, third, fourth and fifth angles 3824, 3826, 3828, 3830, 3832 differ from one another, with the differing angles corresponding to and/or being determined based on the respective local curvatures of the skin of the curved wing 3806 adjacent the respective locations of the first, second, third, fourth and fifth planar panels 3814, 3816, 3818, 3820, 3822. As a result, the first, second, third, fourth and fifth planar panels 3814, 3816, 3818, 3820, 3822 collectively match and or mimic the overall curvature of the curved wing 3806 when the first, second, third, fourth and fifth planar panels 3814, 3816, 3818, 3820, 3822 are in their respective stowed positions. For example, respective ones of the first, second, third, fourth and fifth planar panels 3814, 3816, 3818, 3820, 3822 of FIG. 38 demonstrate less separation from the curved wing 3806 compared to the separation demonstrated by the single planar panel 3704 relative to the curved wing 3706 of FIG. 37 described above. Such decreased separation in turn reduces the undesirable aerodynamic performance penalties that can be associated with implementing a fence having a single planar panel.

Figure 39:
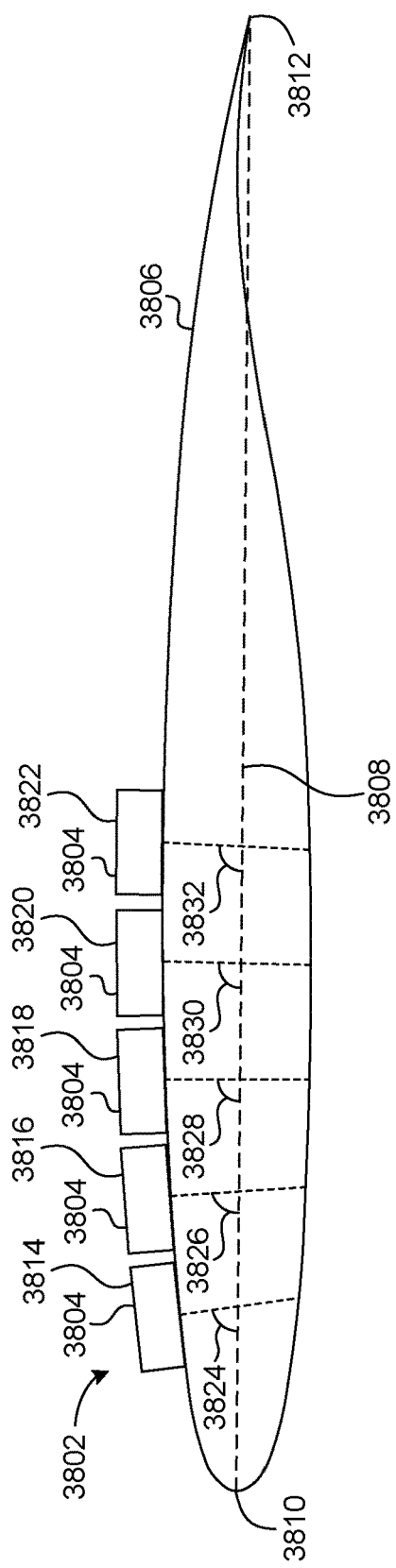
FIG. 39 is a cross-sectional view of the example fence of FIG. 38 having the plurality of example planar panels respectively positioned in corresponding example deployed positions relative to the example curved wing of FIG. 38.

FIG. 39 is a cross-sectional view of the example fence 3802 of FIG. 38 having the plurality of example planar panels 3804 (e.g., the first, second, third, fourth and fifth planar panels 3814, 3816, 3818, 3820, 3822) respectively positioned in corresponding example deployed positions relative to the example curved wing 3806 of FIG. 38. The first, second, third, fourth and fifth planar panels 3814, 3816, 3818, 3820, 3822 of the fence 3802 are individually and collectively configured to impede a spanwise airflow along the curved wing 3806 when the fence 3802 is in the deployed position of FIG. 39. In the illustrated example of FIGS. 38 and 39, each of the first, second, third, fourth and fifth planar panels 3814, 3816, 3818, 3820, 3822 of the fence 3802 may be individually movable and/or actuatable. For example, each of the first, second, third, fourth and fifth planar panels 3814, 3816, 3818, 3820, 3822 of the fence 3802 can be operatively coupled to a separate corresponding spring-loaded axle. The informed reader will recognize that respective ones of the corresponding spring-loaded axles may be implemented using any of the above-described spring-loaded axles (e.g., the spring-loaded axle 316 of FIGS. 3-10, the spring-loaded axle 1316 of FIGS. 13-20, the spring-loaded axle 2316 of FIGS. 23-28, etc.). As another example, each of the first, second, third, fourth and fifth planar panels 3814, 3816, 3818, 3820, 3822 of the fence 3802 can be operatively coupled to a separate corresponding living hinge and/or base. The informed reader will recognize that respective ones of the corresponding living hinges and/or bases may be implemented using the above-described living hinge 2946 and/or base 2942 of FIGS. 29-36.

Figure 40:
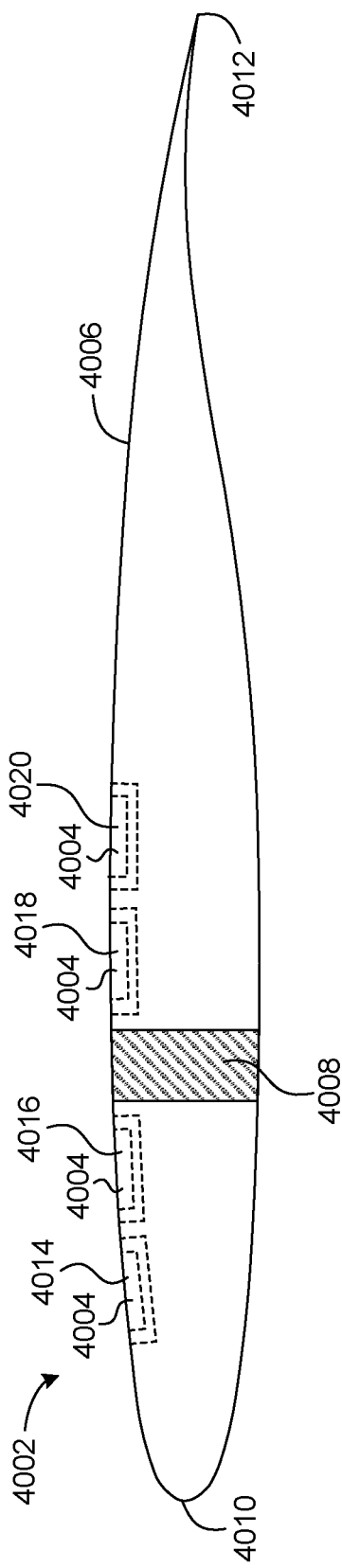
FIG. 40 is a cross-sectional view of an example fence having an example plurality of panels respectively positioned in corresponding example recessed stowed positions relative to an example curved wing.

In some examples, any of the above-described panel(s) and/or, more generally, any of the above-described fences (e.g., the first fence 108 of FIGS. 1-10, the first fence 1108 of FIGS. 11-20, the first fence 2108 of FIGS. 21-28, the first fence 2908 of FIGS. 29-36, the fence 3802 of FIGS. 38 and 39, etc.) can be implemented such that the panel and/or fence extends along and is recessed (e.g., fully or partially recessed) relative to the surrounding skin of the wing when the fence is in its stowed position. For example, FIG. 40 is a cross-sectional view of an example fence 4002 having a plurality of example panels 4004 respectively positioned in corresponding example recessed stowed positions relative to an example wing 4006. The wing 4006 includes an example supporting structure 4008 (e.g., a spar) located between an example leading edge 4010 and an example trailing edge 4012 of the wing 4006. In the illustrated example of FIG. 40, the panels 4004 of the fence 4002 include a first example panel 4014, a second example panel 4016, a third example panel 4018, and a fourth example panel 4020. The first panel 4014 is located forward of the supporting structure 4008. The second panel 4016 is located aft of the first panel 4014 and forward of the supporting structure 4008. The third panel 4018 is located aft of the second panel 4016 and aft of the supporting structure 4008. The fourth panel 4020 is located aft of the third panel 4018 and aft of the supporting structure 4008. In other examples, the fence 4002 can include a different number of panels (e.g., 2, 3, 5, 6, 8, 10, etc.), and the panels may be arranged at different locations relative to the supporting structure 4008.

As shown in FIG. 40, each of the first, second, third and fourth panels 4014, 4016, 4018, 4020 has a respective stowed position in which the panel of the fence 4002 is recessed within the wing 4006 (e.g., recessed relative to the skin of the wing 4006). In some examples, each of the first, second, third and fourth panels 4014, 4016, 4018, 4020 can respectively be recessed within the wing 4006 such that the panel, as well as any axle(s), axle mount(s), spring(s), living hinge(s) and/or base(s) coupled to the panel and/or, more generally, coupled to the fence 4002, is/are recessed (e.g., fully or partially recessed) relative to the surrounding skin of the wing 4006 when the fence 4002 is in its stowed position. Recessing such components within the wing 4006 can further reduce drag associated with the fence 4002 when the fence 4002 is stowed.

Figure 41:
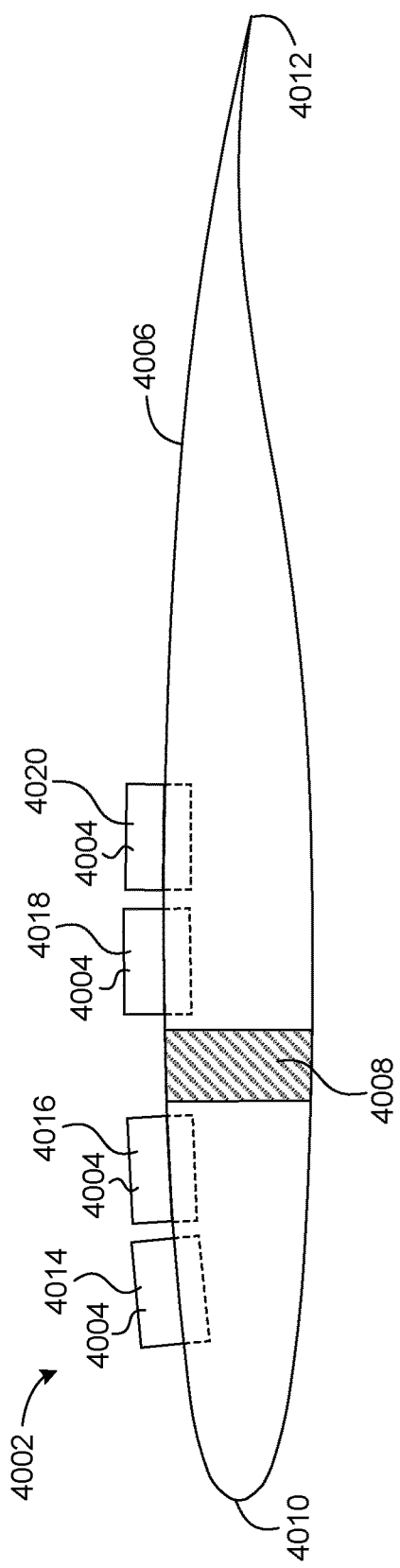
FIG. 41 is a cross-sectional view of the example fence of FIG. 40 having the example plurality of panels respectively positioned in corresponding example deployed positions relative to the example curved wing of FIG. 40.

FIG. 41 is a cross-sectional view of the example fence 4002 of FIG. 40 having the plurality of example panels 4004 respectively positioned in corresponding example deployed positions relative to the example wing 4006 of FIG. 40. As shown in FIG. 41, each of the first, second, third and fourth panels 4014, 4016, 4018, 4020 has a respective deployed position in which the panel of the fence 4002 extends upwardly from the wing 4006 (e.g., extends upwardly relative to the skin of the wing 4006). In some examples, the fence 4002 of FIGS. 40 and 41 can further include a non-recessed panel positioned over the supporting structure 4008 of the wing 4006. In still other examples, the fence 4002 of FIGS. 40 and 41 can additionally or alternatively include one or more non-recessed panel(s) located at the leading edge 4010 and/or at the trailing edge 4012 of the wing 4006.

From the foregoing, it will be appreciated that example airflow-dependent deployable fences for aircraft wings have been disclosed. Unlike the conventional fences and/or other countermeasures described above, the example deployable fences disclosed herein are aerodynamically activated and/or airflow dependent. In some disclosed examples, a deployable fence is coupled (e.g., rotatably coupled) to a wing of an aircraft such that the fence is advantageously movable relative to the wing between a stowed position in which a panel of the fence extends along a skin of the wing, and a deployed position in which the panel extends at an upward angle away from the skin. The panel is configured to impact the airflow around the aircraft when the fence is in the deployed position. For example, the panel can impede a spanwise airflow along the wing when the fence is in the deployed position. As another example, the panel can initiate and/or generate a vortex along the wing when the fence is in the deployed position. The fence is advantageously configured to move between the stowed position and the deployed position in response to an aerodynamic force exerted on the fence. In some disclosed examples, the fence is configured to move from the deployed position to the stowed position in response to an aerodynamic force exerted on the panel. In other disclosed examples, the fence is configured to move from the stowed position to the deployed position in response to an aerodynamic force exerted on a deployment vane of the fence.

The example airflow-dependent deployable fences disclosed herein provide numerous advantages over the conventional fences described above. For example, the movability (e.g., movement from a deployed position to a stowed position) of the airflow-dependent deployable fences disclosed herein advantageously reduces undesirable aerodynamic performance penalties (e.g., drag) during high-speed operation of the aircraft (e.g., during cruise). As another example, the airflow-dependent deployable fences disclosed herein provide a stowed position for the fence whereby the fence extends along the skin of the wing (as opposed to vertically within the wing), thereby advantageously increasing the amount of unused space within the wing relative to the amount of space that may otherwise be consumed by the in-wing mechanical linkages associated with the above-described vertically-deployable conventional fences. As yet another example, the airflow-dependent deployable fences disclosed herein facilitate pilot-free operation (e.g., deployment and retraction) of the fences, which advantageously ensures that the fences are deployed and/or retracted at the appropriate time(s) and/or under the appropriate flight condition(s).

In some examples, an apparatus is disclosed. In some disclosed examples, the apparatus comprises a fence coupled to a wing of an aircraft. In some disclosed examples, the fence is movable relative to the wing between a stowed position in which a panel of the fence extends along a skin of the wing, and a deployed position in which the panel extends at an upward angle away from the skin. In some disclosed examples, the panel is configured to impede a spanwise airflow along the wing when the fence is in the deployed position. In some disclosed examples, the fence is configured to move from the deployed position to the stowed position in response to an aerodynamic force exerted on the panel.

In some disclosed examples, the panel is further configured to generate a vortex along the wing when the fence is in the deployed position.

In some disclosed examples, the apparatus further comprises an actuator configured to move the fence from the stowed position to the deployed position.

In some disclosed examples, the actuator is configured to move the fence from the stowed position to the deployed position in response to the aerodynamic force being less than a threshold force value.

In some disclosed examples, the fence is configured to move from the deployed position to the stowed position during a cruise operation of the aircraft having a first speed. In some disclosed examples, the fence is further configured to move from the stowed position to the deployed position during a reduced speed operation of the aircraft having a second speed less than the first speed.

In some disclosed examples, the actuator includes a spring-loaded axle operatively coupled to the fence and mounted to the wing. In some disclosed examples, the spring-loaded axle includes an axle and a spring coiled around the axle.

In some disclosed examples, the spring is configured to wind around the axle in response to the aerodynamic force being greater than the threshold force value. In some disclosed examples, the spring is further configured to unwind around the axle in response to the aerodynamic force being less than the threshold force value.

In some disclosed examples, the axle has a central axis that is canted relative to a chordwise direction of the wing.

In some disclosed examples, the central axis is canted at a toe-in angle relative to the chordwise direction of the wing. In some disclosed examples, the panel extends in an inboard direction away from the central axis when the fence is in the stowed position.

In some disclosed examples, the central axis is canted at a toe-out angle relative to the chordwise direction of the wing. In some disclosed examples, the panel extends in an outboard direction away from the central axis when the fence is in the stowed position.

In some disclosed examples, the panel is recessed within the wing when the fence is in the stowed position.

In some disclosed examples, the panel includes a first panel located adjacent a first portion of the skin. In some disclosed examples, the first portion of the skin has a first orientation relative to a chord of the wing. In some disclosed examples, the first panel is configured to be oriented along the first portion of the skin when the fence is in the stowed position. In some disclosed examples, the panel further includes a second panel located aft of the first panel and adjacent a second portion of the skin located aft of the first portion. In some disclosed examples, the second portion of the skin has a second orientation relative to the chord of the wing that differs from the first orientation. In some disclosed examples, the second panel is configured to be oriented along the second portion of the skin when the fence is in the stowed position. In some disclosed examples, the first panel and the second panel are configured to impede the spanwise airflow along the wing when the fence is in the deployed position.

In some examples, a method for moving a fence coupled to a wing of an aircraft is disclosed. In some disclosed examples, the method comprises moving the fence between a stowed position in which a panel of the fence extends along a skin of the wing, and a deployed position in which the panel extends at an upward angle away from the skin. In some disclosed examples, the panel impedes a spanwise airflow along the wing when the fence is in the deployed position. In some disclosed examples, the moving includes moving the fence from the deployed position to the stowed position in response to an aerodynamic force exerted on the panel.

In some disclosed examples, the panel generates a vortex along the wing when the fence is in the deployed position.

In some disclosed examples, the aerodynamic force is generated via a substantially chordwise airflow along a chordwise direction of the wing.

In some disclosed examples, the fence is rotatably coupled to the wing via an axle having a central axis that is canted relative to the chordwise direction of the wing.

In some disclosed examples, the central axis is canted at a toe-in angle relative to the chordwise direction of the wing. In some disclosed examples, the panel extends in an inboard direction away from the central axis when the fence is in the stowed position.

In some disclosed examples, the central axis is canted at a toe-out angle relative to the chordwise direction of the wing. In some disclosed examples, the panel extends in an outboard direction away from the central axis when the fence is in the stowed position.

In some examples, an apparatus is disclosed. In some disclosed examples, the apparatus comprises a fence coupled to a wing of an aircraft. In some disclosed examples, the fence is movable relative to the wing between a stowed position in which a panel of the fence extends along a skin of the wing, and a deployed position in which the panel extends at an upward angle away from the skin. In some disclosed examples, the panel is configured to impede a spanwise airflow along the wing when the fence is in the deployed position. In some disclosed examples, the fence is configured to move from the stowed position to the deployed position in response to an aerodynamic force exerted on a deployment vane of the fence.

In some disclosed examples, the deployment vane is substantially orthogonal to the panel.

In some disclosed examples, the panel is further configured to generate a vortex along the wing when the fence is in the deployed position.

In some disclosed examples, the apparatus further comprises an actuator configured to move the fence from the deployed position to the stowed position.

In some disclosed examples, the actuator is configured to move the fence from the deployed position to the stowed position in response to the aerodynamic force being less than a threshold force value.

In some disclosed examples, the actuator includes a spring-loaded axle operatively coupled to the fence and mounted to the wing. In some disclosed examples, the spring-loaded axle includes an axle and a spring coiled around the axle.

In some disclosed examples, the spring is configured to wind around the axle in response to the aerodynamic force being greater than the threshold force value. In some disclosed examples, the spring is further configured to unwind around the axle in response to the aerodynamic force being less than the threshold force value.

In some disclosed examples, the axle has a central axis that is substantially parallel to a chordwise direction of the wing.

In some disclosed examples, the panel extends in an inboard direction away from the central axis when the fence is in the stowed position.

In some disclosed examples, the deployment vane extends in an outboard direction away from the central axis when the fence is in the deployed position.

In some disclosed examples, the panel is recessed within the wing when the fence is in the stowed position.

In some disclosed examples, the panel includes a first panel located adjacent a first portion of the skin. In some disclosed examples, the first portion of the skin has a first orientation relative to a chord of the wing. In some disclosed examples, the first panel is configured to be oriented along the first portion of the skin when the fence is in the stowed position. In some disclosed examples, the panel further includes a second panel located aft of the first panel and adjacent a second portion of the skin located aft of the first portion. In some disclosed examples, the second portion of the skin has a second orientation relative to the chord of the wing that differs from the first orientation. In some disclosed examples, the second panel is configured to be oriented along the second portion of the skin when the fence is in the stowed position. In some disclosed examples, the first panel and the second panel are configured to impede the spanwise airflow along the wing when the fence is in the deployed position.

In some examples, a method for moving a fence coupled to a wing of an aircraft is disclosed. In some disclosed examples, the method comprises moving the fence between a stowed position in which a panel of the fence extends along a skin of the wing, and a deployed position in which the panel extends at an upward angle away from the skin. In some disclosed examples, the panel impedes a spanwise airflow along the wing when the fence is in the deployed position. In some disclosed examples, the moving includes moving the fence from the stowed position to the deployed position in response to an aerodynamic force exerted on a deployment vane of the fence.

In some disclosed examples, the deployment vane is substantially orthogonal to the panel.

In some disclosed examples, the panel generates a vortex along the wing when the fence is in the deployed position.

In some disclosed examples, the aerodynamic force is generated via a substantially spanwise airflow along a spanwise direction of the wing.

In some disclosed examples, the fence is rotatably coupled to the wing via an axle having a central axis.

In some disclosed examples, the central axis is substantially parallel to a chordwise direction of the wing.

In some disclosed examples, the panel extends in an inboard direction away from the central axis when the fence is in the stowed position.

In some disclosed examples, the deployment vane extends in an outboard direction away from the central axis when the fence is in the deployed position.

In some examples, an apparatus is disclosed. In some disclosed examples, the apparatus comprises a fence of a wing of an aircraft. In some disclosed examples, the fence includes a base that is coupled to the wing and a panel that is movable relative to the base and the wing between a stowed position in which the panel extends along a skin of the wing, and a deployed position in which the panel extends at an upward angle away from the skin. In some disclosed examples, the panel is configured to impede a spanwise airflow along the wing when the panel is in the deployed position. In some disclosed examples, the panel is configured to move from the deployed position to the stowed position in response to an aerodynamic force exerted on the panel.

In some disclosed examples, the panel is further configured to generate a vortex along the wing when the panel is in the deployed position.

In some disclosed examples, the apparatus further comprises a living hinge extending between the panel and the base. In some disclosed examples, the living hinge is configured to move the panel from the stowed position to the deployed position.

In some disclosed examples, the living hinge is configured to move the panel from the stowed position to the deployed position in response to the aerodynamic force being less than a threshold force value.

In some disclosed examples, the panel is configured to move from the deployed position to the stowed position during a cruise operation of the aircraft having a first speed. In some disclosed examples, the panel is further configured to move from the stowed position to the deployed position during a reduced speed operation of the aircraft having a second speed less than the first speed.

In some disclosed examples, the living hinge is configured to bend away from the skin of the wing as the panel is moved from the stowed position to the deployed position. In some disclosed examples, the living hinge is further configured to unbend toward the skin of the wing as the panel is moved from the deployed position to the stowed position.

In some disclosed examples, the living hinge is configured to bend away from the skin of the wing in response to the aerodynamic force being less than the threshold force value. In some disclosed examples, the living hinge is further configured to unbend toward the skin of the wing in response to the aerodynamic force being greater than the threshold force value.

In some disclosed examples, the base has a central axis that is canted relative to a chordwise direction of the wing.

In some disclosed examples, the central axis is canted at a toe-in angle relative to the chordwise direction of the wing.

In some disclosed examples, the panel extends in an inboard direction away from the central axis when the panel is in the stowed position.

In some disclosed examples, the central axis is canted at a toe-out angle relative to the chordwise direction of the wing. In some disclosed examples, the panel extends in an outboard direction away from the central axis when the panel is in the stowed position.

In some disclosed examples, the panel is recessed within the wing when the panel is in the stowed position.

In some disclosed examples, the panel includes a first panel located adjacent a first portion of the skin. In some disclosed examples, the first portion of the skin has a first orientation relative to a chord of the wing. In some disclosed examples, the first panel is configured to be oriented along the first portion of the skin when the panel is in the stowed position. In some disclosed examples, the panel further includes a second panel located aft of the first panel and adjacent a second portion of the skin located aft of the first portion. In some disclosed examples, the second portion of the skin has a second orientation relative to the chord of the wing that differs from the first orientation. In some disclosed examples, the second panel is configured to be oriented along the second portion of the skin when the panel is in the stowed position. In some disclosed examples, the first panel and the second panel are configured to impede the spanwise airflow along the wing when the panel is in the deployed position.

In some examples, a method for moving a panel of a fence of a wing of an aircraft relative to the wing and relative to a base of the fence coupled to the wing is disclosed. In some disclosed examples, the method comprises moving the panel between a stowed position in which the panel extends along a skin of the wing, and a deployed position in which the panel extends at an upward angle away from the skin. In some disclosed examples, the panel impedes a spanwise airflow along the wing when the panel is in the deployed position. In some disclosed examples, the moving includes moving the panel from the deployed position to the stowed position in response to an aerodynamic force exerted on the panel.

In some disclosed examples, the panel generates a vortex along the wing when the panel is in the deployed position.

In some disclosed examples, the aerodynamic force is generated via a substantially chordwise airflow along a chordwise direction of the wing.

In some disclosed examples, the fence further includes a living hinge extending between the base and the panel. In some disclosed examples, the base has a central axis that is canted relative to the chordwise direction of the wing.

In some disclosed examples, the central axis is canted at a toe-in angle relative to the chordwise direction of the wing. In some disclosed examples, the panel extends in an inboard direction away from the central axis when the panel is in the stowed position.

In some disclosed examples, the central axis is canted at a toe-out angle relative to the chordwise direction of the wing. In some disclosed examples, the panel extends in an outboard direction away from the central axis when the panel is in the stowed position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a fence coupled to a wing of an aircraft, the fence having a leading end oriented toward a leading edge of the wing and a trailing end oriented toward a trailing edge of the wing, the fence being movable relative to the wing between a stowed position in which a panel of the fence extends along a skin of the wing, and a deployed position in which the panel extends at an upward angle away from the skin, the panel configured to impede a spanwise airflow along the wing when the fence is in the deployed position, the fence configured to move from the deployed position to the stowed position in response to an aerodynamic force exerted on the panel; and
an actuator configured to move the fence from the stowed position to the deployed position in response to the aerodynamic force being less than a threshold force value, the actuator including a forward axle mount coupled to the wing, an aft axle mount coupled to the wing and spaced apart from the forward axle mount, and a spring-loaded axle coupled to and extending between the forward and aft axle mounts, the spring-loaded axle operatively coupled to the fence, the spring-loaded axle including an axle and a spring coiled around the axle, the axle extending through a hole formed in the fence, the spring located between the trailing end of the fence and the aft axle mount.

2. The apparatus of claim 1, wherein the panel is further configured to generate a vortex along the wing when the fence is in the deployed position.

3. The apparatus of claim 1, wherein the fence is configured to move from the deployed position to the stowed position during a cruise operation of the aircraft having a first speed, and wherein the fence is further configured to move from the stowed position to the deployed position during a reduced speed operation of the aircraft having a second speed less than the first speed.

4. The apparatus of claim 1, wherein the spring is configured to wind around the axle in response to the aerodynamic force being greater than the threshold force value, and the spring is further configured to unwind around the axle in response to the aerodynamic force being less than the threshold force value.

5. The apparatus of claim 1, wherein the axle has a central axis that is canted relative to a chordwise direction of the wing.

6. The apparatus of claim 5, wherein the central axis is canted at a toe-in angle relative to the chordwise direction of the wing.

7. The apparatus of claim 6, wherein the panel extends in an inboard direction away from the central axis when the fence is in the stowed position.

8. The apparatus of claim 5, wherein the central axis is canted at a toe-out angle relative to the chordwise direction of the wing.

9. The apparatus of claim 8, wherein the panel extends in an outboard direction away from the central axis when the fence is in the stowed position.

10. The apparatus of claim 1, wherein the panel is recessed within the wing when the fence is in the stowed position.

11. The apparatus of claim 1, wherein the panel is a first panel of the fence, the first panel having a first orientation relative to a chord of the wing when the fence is in the stowed position, the fence further including a second panel located aft of the first panel, the second panel having a second orientation relative to the chord of the wing when the fence is in the stowed position, the second orientation differing from the first orientation, the first panel and the second panel configured to extend along the skin of the wing when the fence is in the stowed position, the first panel and the second panel configured to impede the spanwise airflow along the wing when the fence is in the deployed position.

12. The apparatus of claim 1, wherein the panel has a trapezoidal shape between the leading end and the trailing end of the fence.

13. The apparatus of claim 1, wherein the panel is planar.

14. The apparatus of claim 13, wherein the panel is parallel to and offset from a central axis of the axle.

15. A method for moving a fence coupled to a wing of an aircraft, the method comprising:
moving the fence between a stowed position in which a panel of the fence extends along a skin of the wing, and a deployed position in which the panel extends at an upward angle away from the skin, the fence having a leading end oriented toward a leading edge of the wing and a trailing end oriented toward a trailing edge of the wing, the panel impeding a spanwise airflow along the wing when the fence is in the deployed position, the moving including:
rotating the fence from the deployed position to the stowed position in response to an aerodynamic force exerted on the panel being greater than a threshold force value; and
rotating the fence from the stowed position to the deployed position via an actuator in response to the aerodynamic force being less than the threshold force value, the actuator including a forward axle mount coupled to the wing, an aft axle mount coupled to the wing and spaced apart from the forward axle mount, and a spring-loaded axle coupled to and extending between the forward and aft axle mounts, the spring-loaded axle operatively coupled to the fence, the spring-loaded axle including an axle and a spring coiled around the axle, the axle extending through a hole formed in the fence, the spring located between the trailing end of the fence and the aft axle mount, the spring biasing the fence toward the deployed position.

16. The method of claim 15, wherein the panel generates a vortex along the wing when the fence is in the deployed position.

17. The method of claim 15, wherein the aerodynamic force is generated via a substantially chordwise airflow along a chordwise direction of the wing.

18. The method of claim 17, wherein a central axis of the axle is canted relative to the chordwise direction of the wing.

19. The method of claim 18, wherein the central axis is canted at a toe-in angle relative to the chordwise direction of the wing, and wherein the panel extends in an inboard direction away from the central axis when the fence is in the stowed position.

20. The method of claim 18, wherein the central axis is canted at a toe-out angle relative to the chordwise direction of the wing, and wherein the panel extends in an outboard direction away from the central axis when the fence is in the stowed position.

* * * * *